US006177152B1

(12) United States Patent
Terada et al.

(10) Patent No.: US 6,177,152 B1
(45) Date of Patent: *Jan. 23, 2001

(54) LIQUID CRYSTAL DEVICE AND LIQUID CRYSTAL APPARATUS

(75) Inventors: Masahiro Terada, Hadano; Kenji Shinjo, Atsugi; Koichi Sato, Atsugi; Syuji Yamada, Atsugi, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/733,771

(22) Filed: Oct. 18, 1996

(30) Foreign Application Priority Data

Oct. 20, 1995 (JP) ..................... 7-295962
Oct. 20, 1995 (JP) ..................... 7-296025

(51) Int. Cl.[7] ..................... C09K 19/00; C09K 19/52; C09K 19/06; G02F 1/133

(52) U.S. Cl. ..................... 428/1.1; 252/299.01; 252/299.6; 349/123; 349/182; 428/1.26

(58) Field of Search ..................... 252/299.01, 299.6; 428/1.1, 1.26; 349/182, 123

(56) References Cited

U.S. PATENT DOCUMENTS

| | | | |
|---|---|---|---|
| 4,367,924 | 1/1983 | Clark et al. | 359/56 |
| 4,655,561 | 4/1987 | Kanbe et al. | 359/56 |

(List continued on next page.)

FOREIGN PATENT DOCUMENTS

| | | |
|---|---|---|
| 0646636 | 4/1995 | (EP) . |
| 0682098 | 11/1995 | (EP) . |
| 59-193426 | 11/1984 | (JP) . |
| 59-193427 | 11/1984 | (JP) . |
| 60-156047 | 8/1985 | (JP) . |
| 02142753 | 5/1990 | (JP) . |
| 60156046 | 8/1995 | (JP) . |
| WO93 22396 | 11/1993 | (WO) . |

OTHER PUBLICATIONS

A. Fukuda (ed.), Future Liquid Crystal Display and is Materials, 1992, pp. 37–72.

(List continued on next page.)

*Primary Examiner*—C. H. Kelly
(74) *Attorney, Agent, or Firm*—Fitzpatrick, Cella, Harper & Scinto

(57) ABSTRACT

A liquid crystal device having a pair of electrode substrates, and a liquid crystal composition disposed between the substrates. At least one of the substrates is provided with an alignment control layer having a thickness of at most 200 Å and having been subjected to a rubbing uniaxial aligning treatment. The liquid crystal composition contains at least 30 wt. % of (i) at least one species of a fluorine-containing mesomorphic compound (B) represented by a formula (II) having smectic C phase and providing a tilt angle below 30 degrees at a temperature 15° C. below an upper limit temperature of said smectic C phase Formula (II):

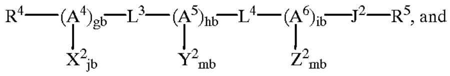

and (ii) at least one species of compound (C) in an amount at least 5 wt. % represented by the formula (II) having a smectic C phase and which provides a tilt angle of at least 30 degrees at a temperature 15° C. below an upper limit temperature of said smectic C phase.

22 Claims, 9 Drawing Sheets

U.S. PATENT DOCUMENTS

| | | | | |
|---|---|---|---|---|
| 5,082,587 | | 1/1992 | Janulis | 252/299.01 |
| 5,092,665 | | 3/1992 | Kanbe et al. | 359/56 |
| 5,093,737 | | 3/1992 | Kanbe et al. | 359/56 |
| 5,262,082 | | 11/1993 | Janulis et al. | 252/299.01 |
| 5,381,254 | | 1/1995 | Kanbe et al. | 359/54 |
| 5,417,883 | | 5/1995 | Epstein et al. | 252/299.01 |
| 5,418,634 | | 5/1995 | Kanbe et al. | 359/56 |
| 5,437,812 | * | 8/1995 | Janulis et al. | 252/299.01 |
| 5,641,427 | * | 6/1997 | Shinjo et al. | 252/299.01 |

OTHER PUBLICATIONS

A. Fukuda et al., Structures and Properties of Ferroelectric Liquid Crystals, 1990, pp. 344–357.

M.D. Radcliffe et al., Smectic A and Smectic C Materials with Large Negative Thermal Expansion Coeffecients, 1993, p. 46.

Yukio Ouchi et al, Smectic C* Chevron Layer Structure Studied by X–Ray Diffraction, (Apr. 18, 1988) pp. L725–L728.

A.D.L. Chandani et al, Tristable Switching in Surface Ferroelectric Liquid Crystals with a Large Spontaneous Polarization, (Apr. 18, 1988) pp. L729–L732.

N.A. Clark et al, Structures and Applications of SSFLC Devices, Sep.30 to Oct. 2, 1986, pp. 456–458.

M. Schadt et al., Voltage–Dependent Optical Activity of a Twisted Nematic Liquid Crystal, (Feb. 15, 1977) pp. 127–128.

* cited by examiner

LIQUID CRYSTAL DEVICE AND LIQUID CRYSTAL APPARATUS

FIELD OF THE INVENTION AND RELATED ART

The present invention relates to a liquid crystal device including a liquid crystal composition used as a light-valve for flat-panel displays, projection displays, printers, etc. The present invention also relates to a liquid crystal apparatus using the liquid crystal device.

There has been known a cathode ray tube (CRT) as a display device. The CRT has widely been used as a display terminal for outputting motion pictures of a television receiver or a video tape recording (VTR) apparatus or used as a monitor for a personal computer. However, the CRT encounters problems when outputs still images, in view of its characteristics, such that recognizability is liable to be lowered due to flickering and scanning fringes caused by an insufficient resolution and that degradation or deterioration of a fluorescent substance due to burning is caused to occur in some cases. In recent years, it has been found that an electromagnetic wave generated by the CRT adversely affects human body. As a result, the CRT can break health of video display terminal (VDT) operators in some cases. In addition, the CRT has a structure including a large volume behind a picture area (display portion), whereby space-saving utilization of an office or a house in which the CRT is used is hindered and there is a possibility that the CRT fails to sufficiently play a part in displays in an advanced information-oriented society.

Liquid crystal devices have been used as a display device having solved the above-mentioned problems of the CRT. For instance, there have been known liquid crystal devices using use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

One of the above-mentioned TN-type liquid crystal devices is a simple matrix-type liquid crystal device having the advantage of inexpensive production costs. When the liquid crystal device is driven by using an electrode matrix structure with an improved pixel density in accordance with a multiplex driving scheme, the liquid crystal device is liable to encounter a problem of occurrence of crosstalk, so that the number of pixels is restricted. Further, the uses of the device as a display device is also limited since the response speed is too slow, i.e., on the order of at least several ten milli-seconds.

In recent years, there have been proposed liquid crystal devices using a thin film transistor (TFT). These liquid crystal devices can control a display state pixel by pixel since each pixel is provided with a transistor, whereby the devices solve problems of crosstalk and response speed. However, as these devices have a larger picture area, it is industrially more difficult to prepare a liquid crystal device with no defective pixels. Even if it is possible to prepare such a liquid crystal device, the device is more expensive.

To overcome the above-mentioned drawbacks of such conventional liquid crystal devices, the use of liquid crystal devices using a liquid crystal material having bistability has been proposed by Clark and Lagerwall (e.g. Japanese Laid-Open Patent Appln. (JP-A) No. 56-107216; U.S. Pat. No. 4,367,924, etc.). In this instance, as the liquid crystal material having bistability, a ferroelectric liquid crystal having chiral smectic C-phase (SmC*) or H-phase (SmH*) is generally used. The ferroelectric liquid crystal can effect inversion switching due to its spontaneous polarization, thus showing a very high response speed. Further, the ferroelectric liquid crystal shows at least two stable states including bistable states providing a memory characteristic and is excellent in view angle characteristics, so that a liquid crystal device using a ferroelectric liquid crystal is considered suitable for a display device or light-valve having properties including high-speed responsiveness, high resolution and a large picture area. In recent years, there has been proposed an anti-ferroelectric chiral smectic liquid crystal device assuming three stable states, as described in "Japanese Journal of Applied Physics" vol. 27, p. L729 (1988) by Chanani and Takezoe et al.

Such a liquid crystal device using a chiral smectic liquid crystal, however, encounters a problem such that a contrast ratio is lowered by occurrence of zig-zag alignment defects in some cases, as described in "Structures and Properties of Ferroelectric Liquid Crystals" (1990) by Atsuo Fukuda and Hideo Takezoe issued by Corona Publishing Co. Ltd. (Tokyo Japan). The reason why the zigzag defect occurs may be attributable to the fact that a layer of a chiral smectic liquid crystal disposed between a pair of substrates constituting a cell structure includes two kinds of chevron layer structures.

On the other hand there has been the recent trend in layer structure of a (chiral smectic) liquid crystal wherein a high contrast ratio is intended to be realized by suppressing a chevron layer structure resulting in a low contrast ratio and providing the liquid crystal with a bookshelf layer structure (hereinafter referred to as "bookshelf structure") in which boundaries of each liquid crystal layer are disposed in parallel with each other or with a structure closer to the bookshelf structure (e.g., Atsuo Fukuda (Editor)) "Future Liquid Crystal Display and Its Materials" (1992), issued by K. K. CMC (Tokyo Japan). One of methods for realizing a bookshelf structure is a method of using a naphthalene-based liquid crystal material having a particular structure. In this method, however, the resultant liquid crystal device has a tilt angle of about 10 degrees, which is considerably smaller than an ideal tilt angle of 22.5 degrees providing a maximum transmittance, thus resulting in a low transmittance or a low contrast. In addition, such a liquid crystal material fails to exhibit a bookshelf structure reversibly with respect to temperature in many cases. Another method for giving a bookshelf structure may include one inducing a bookshelf structure by externally applying an electric field to a liquid crystal device. Such a method, however, involves a problem of unstability against external stimuli such as temperature. In addition, various other problems to be solved are presumably present in order to put a liquid crystal material exhibiting a bookshelf structure into practical use since such a material has quite recently been discovered or proposed.

Further, in quite recent years, there have been proposed a mesomorphic (liquid crystal) compound having a perfluoroether terminal portion (U.S. Pat. Nos. 5,082,587 and 5,262,082 and International Publication No. WO93/22396) and a liquid crystal composition (Marc D. Radcliffe et al: The 4th International Ferroelectric Liquid Crystal Conference, P-46 (1993)) as materials exhibiting a bookshelf structure or a structure closer thereto. By using these liquid crystal materials, it is possible to provide a bookshelf structure or a structure showing a small layer inclination angle closer to the bookshelf structure without using external fields such as an external electric field. Accordingly, these liquid crystal materials are suitable for a liquid crystal device and display apparatus providing high speed responsiveness, high definition and large picture area.

However, these liquid crystal materials (compounds and compositions) still leave room for improvement in several characteristics, such as response speed, alignment characteristic, contrast and driving stability, singly or in combination thereof for the purpose of providing a high performance liquid crystal device or apparatus.

SUMMARY OF THE INVENTION

An object of the present invention is to provide a liquid crystal device using a chiral smectic liquid crystal composition showing an alignment state exhibiting a bookshelf structure or a structure, having a small layer inclination angle, closer to the bookshelf structure with respect to a smectic layer structure, in order to realize a large-area liquid crystal device having improved properties such as high responsiveness, high contrast, high definition, high brightness and high reliability, and capable of retaining the above structure (alignment state) and these properties in a wider temperature range.

Another object of the present invention is to provide a liquid crystal apparatus using the liquid crystal device.

According to the present invention, there is provided a liquid crystal device, comprising: a pair of substrates each having thereon at least an electrode, and a liquid crystal composition disposed between the substrates so as to assume at least two optically stable states, wherein at least one of the substrates is provided with an alignment control layer having a thickness of at most 200 Å, and the liquid crystal composition comprises at least one species of a fluorine-containing mesomorphic compound (A) in an amount of at least 70 wt. % comprising a fluorocarbon terminal portion and a hydrocarbon terminal portion, the terminal portions being connected with a central core, and having smectic mesophase or latent smectic mesophase, wherein the fluorine-containing mesomorphic compound (A) comprises at least one species of a compound (B) having a fluorocarbon terminal portion containing at least one catenary ether oxygen atom in an amount of at least 30 wt. % based on the liquid crystal composition, and the compound (B) comprises at least one species of a compound (C) having a smectic C phase and providing a tilt angle of at least 30 degrees at a temperature below an upper limit temperature of said smectic C phase by 15° C. in an amount of at least 5 wt. % based on the liquid crystal composition.

The present invention also provides a liquid crystal device, comprising: a pair of substrates each having thereon at least an electrode, and a liquid crystal composition disposed between the substrates so as to assume at least two optically stable states, wherein at least one of the substrates is provided with an alignment control layer comprising a polyimide film, and the liquid crystal composition comprises at least one species of a fluorine-containing mesomorphic compound (A) in an amount of at least 70 wt. % comprising a fluorocarbon terminal portion and a hydrocarbon terminal portion, the terminal portions being connected with a central core, and having smectic mesophase or latent smectic mesophase, wherein the fluorine-containing mesomorphic compound (A) comprises at least one species of a compound (B) having a fluorocarbon terminal portion containing at least one catenary ether oxygen atom in an amount of at least 30 wt. % based on the liquid crystal composition, and the compound (B) comprises at least one species of a compound (C) having a smectic C phase and providing a tilt angle of at least 30 degrees at a temperature below an upper limit temperature of said smectic C phase by 15° C. in an amount of at least 5 wt. % based on the liquid crystal composition.

The present invention further provides liquid crystal apparatus including the above-mentioned liquid crystal devices, respectively.

These and other objects, features and advantages of the present invention will become more apparent upon a consideration of the following description of the preferred embodiments of the present invention taken in conjunction with the accompanying drawings.

DETAILED DESCRIPTION OF THE INVENTION

The liquid crystal device according to the present invention is characterized by a specific cell structure wherein a liquid crystal composition comprising specific components in particular proportions, respectively, is sandwiched between a pair of electrode plates (substrates having thereon electrodes, respectively) at least one of which is provided with an alignment control layer having a thickness of 200 Å or comprising a polyimide film.

The liquid crystal composition may be a chiral smectic (or ferroelectric) liquid crystal composition.

The liquid crystal composition used in the present invention comprises at least one species of a fluorine-containing mesomorphic compound (A) in an amount of at least 70 wt. %.

The fluorine-containing mesomorphic compound (A) comprises at least one species of a compound (B) having fluorocarbon terminal portion containing at least one catenary ether oxygen atom in an amount of at least 30 wt. %, preferably at least 50 wt. %, based on the liquid crystal composition in order to provide a bookshelf structure or a structure closer thereto having a small layer inclination angle.

The compound (B) comprises at least one species of a compound (C) having a smectic C phase and providing a tilt angle θ of at least 30 degrees, preferably at least 35 degrees, at a temperature (T) lower than an upper limit temperature (Tc) in its smectic C phase-providing temperature region by 15° C. (Tc−T=15° C.). The compound (C) is contained in the liquid crystal composition in an amount of at least 5 wt. %, preferably at least 10 wt. %.

Herein, the term "catenary ether oxygen atom" means an ether oxygen atom present in a perfluoroether chain and located between adjacent carbon atoms.

The fluorine-containing mesomorphic compound (A) contains a fluorocarbon terminal portion, a hydrocarbon terminal portion, and a central core connecting the terminal portions and assumes a smectic (mesomorphic) phase or a latent smectic (mesomorphic) phase. Herein, the compound having a latent smectic mesophase (or latent smectic phase) means a compound not showing (exhibiting) a smectic (meso)phase by itself but showing a smectic (meso)phase when used together with a compound showing a smectic (meso)phase or another compound having a latent smectic (meso)phase under an appropriate condition.

The term "mesomorphic compound" used herein covers not only a compound assuming a mesomorphic phase (mesophase) but also a compound not assuming a mesomorphic phase per se as long as a liquid crystal composition containing such a compound assumes a mesomorphic phase.

Figure 8:
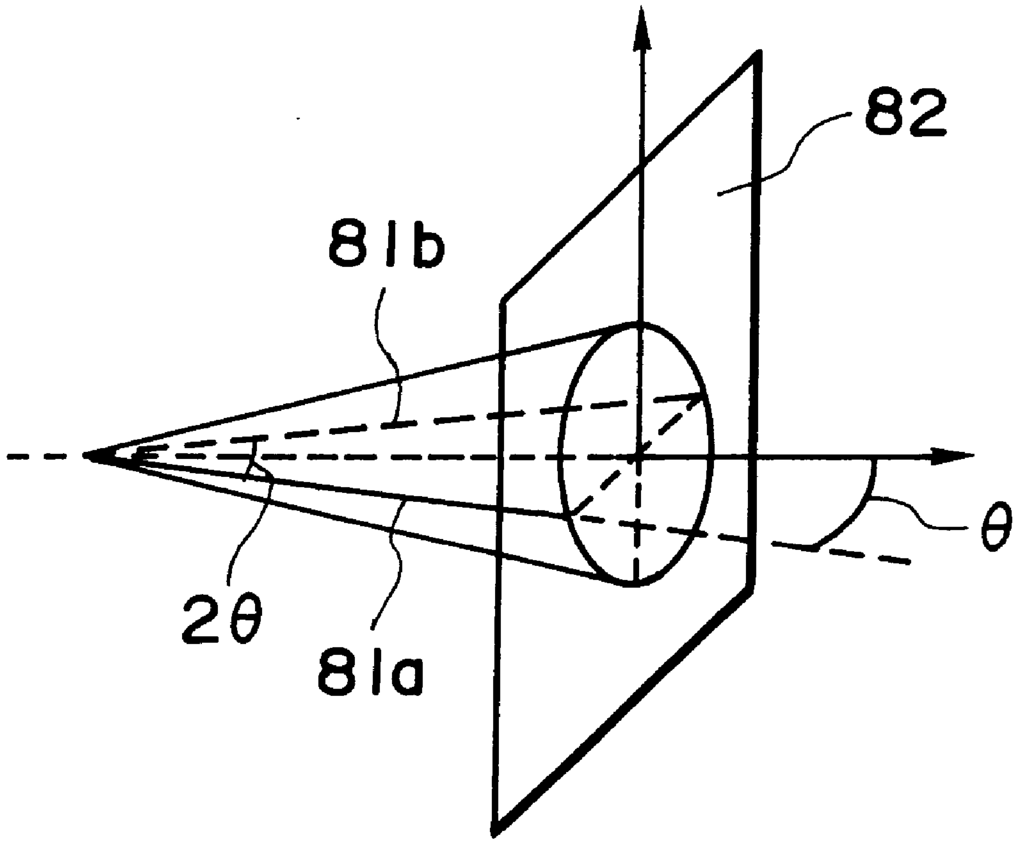
FIG. 8 is a schematic view for illustrating a tilt angle θ referred to in the present invention.

The tilt angle θ referred to herein will be explained with reference to FIG. 8.

In case where the compound (C) described above is a chiral smectic mesomorphic compound (liquid crystal) showing ferroelectricity, liquid crystal molecules form plural smectic liquid crystal layers 82 and each of liquid crystal molecules is placed in at least two states 81*a* and 81*b* by switching under application of an appropriate voltage. A half of an angle (2θ) formed between the above two states 81*a* and 81*b* is defined as a tilt angle θ.

In case where the compound (C) is not chiral compound, the tilt angle θ can be determined in the following manner.

Three chiral liquid crystal compositions are prepared by mixing a sample compound (compound (C)) with a chiral compound of the formula (i) shown below in weight ratios 99:1, 98:2 and 97:3, respectively.

Formula (i):

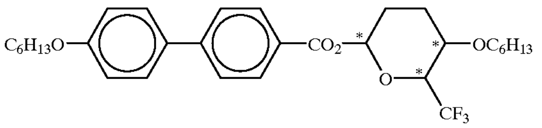

These compositions containing the chiral compound (1 wt. %, 2 wt. % and 3 wt. %, respectively) are subjected to measurement of a tilt angle according to a prescribed method (described hereinafter) to obtain three values of the tilt angle from which a tilt angle of the sample (a chiral) compound is obtained by extrapolation.

Hereinbelow, the liquid crystal device of the present invention will be described specifically with reference to FIG. 1.

Figure 1:
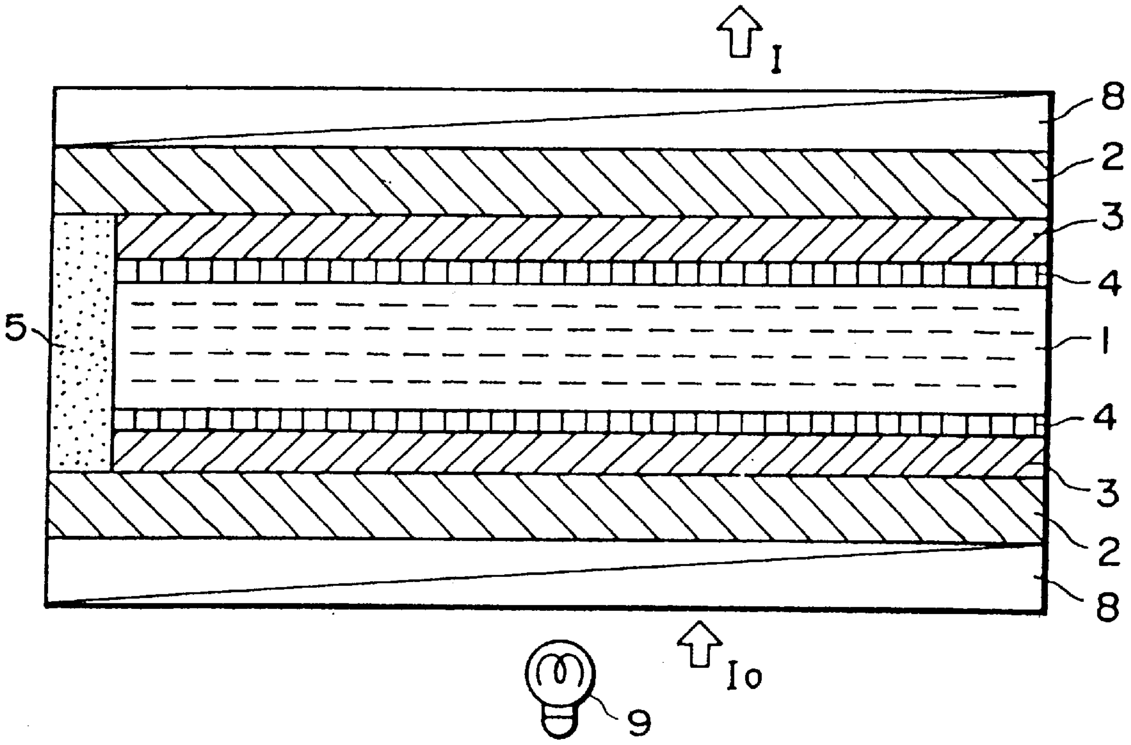
FIG. 1 is a schematic sectional view of an embodiment of a liquid crystal device according to the present invention.

FIG. 1 is a schematic sectional view of an embodiment of the liquid crystal device for explanation of the structure thereof.

Referring to FIG. 1, the liquid crystal device includes a liquid crystal layer 1 comprising a chiral smectic liquid crystal composition containing at least one species of a perfluoroether-type mesomorphic compound (as main components) disposed between a pair of substrates 2 each having thereon a group of transparent electrodes 3 and an alignment control layer 4. In the present invention, however the alignment control layer 4 may be formed on one of the substrates 2. The substrates 2 are placed or arranged opposite each other. The periphery of the substrates 2 is sealed up with a sealing agent 5. Outside the substrates 2, a pair of polarizers 8 are disposed so as to modulate incident light $I_0$ from a light source 9 in cooperation with the liquid crystal 1 to provide modulated light I.

The liquid crystal layer 1 may preferably have a thickness (corresponding to a cell gap) of at most 5 μm, more preferably about 0.5–3 μm, in order to exhibit at least two optically stable states. Each of two substrates 2 comprise glass or plastic and is coated with a transparent electrode 3 having a prescribed pattern (e.g., stripe pattern) and comprising a film of $SnO_2$, $In_2O_3$ or ITO (indium-tin-oxide) to form an electrode plate. On at least one of the substrates 2, the alignment control layer 4 is formed via an insulating layer (not shown), as desired, by applying a solution containing a material for the alignment control layer or by vapor deposition or sputtering of a material for the alignment control layer. Examples of the material for the alignment control layer 4 may include: an inorganic material, such as silicon monoxide, silicon dioxide, aluminum oxide, zirconium oxide, magnesium fluoride, cerium oxide, cerium fluoride, silicon nitride, silicon carbide, or boron nitride; and an organic material, such as polyvinyl alcohol, polyimide, polyamide-imide, polyester, polyamide, polyester-imide, polyparaxylylene, polycarbonate, polyvinyl acetal, polyvinyl chloride, polystyrene, polysiloxane, cellulose resin, melamine resin, urea resin or acrylic resin. The surface of thus prepared alignment control layer 4 is subjected to a prescribed (uniaxial) aligning treatment, as desired, e.g., by rubbing the surface with a fibrous material such as velvet, cloth or paper. The alignment control layer 4 may be formed by an oblique vapor deposition method wherein a film of an oxide such as $SiO_2$ or an nitride is vapor-deposited on the electrode plate(s) from an oblique direction to the electrode plate.

The liquid crystal device of the invention may further comprise a short circuit-preventing layer for the pair of substrates such as an insulating layer, an inorganic material layer and an organic material layer other than those for the above-mentioned alignment control layer. The pair of substrates 2 are held to have a prescribed (but arbitrary) gap (e.g., at most 5 μm, preferably 0.5–3 μm) with a gap-controlling spacer (not shown) of, e.g., silica beads or alumina beads. A voltage is applied to the liquid crystal layer 1 in accordance with a switching signal from a signal power supply (not shown), thus effecting switching. As a result, the liquid crystal device functions as a light valve such a display device. Further, in case where two groups of electrodes are arranged in matrix (so as to intersect with each other, e.g., at right angles) on the pair of substrates, it is possible to perform pattern display and pattern exposure, so that the liquid crystal device is used as a display device for a personal computer, a word processor, etc., or a light valve for a printer.

In the liquid crystal device of the present invention, as described above, the pair of substrates may preferably be subjected to different aligning treatments including no aligning treatment in order to appropriately control an alignment (orientation) state, particularly an initial alignment state, of liquid crystal molecules of the chiral smectic liquid crystal composition containing the fluorine-containing mesomorphic compound. Specifically, for example, one of the substrates is provided with a rubbing-treated alignment control layer and the other substrate is provided with an alignment control film not subjected to rubbing and comprising a material identical to or different from that of the rubbing-treated alignment control layer.

In the present invention, the liquid crystal composition containing the fluorine-containing mesomorphic compound (s) does not assume cholesteric phase in some cases. Particularly, in this instance, the liquid crystal composition causes a phase transition from isotropic phase to mesomorphic (e.g., smectic) phase on temperature decrease. If such a liquid crystal composition is disposed between a pair of electrode plates each provided with an alignment film subjected to mutually different aligning treatments, particularly including one electrode plate having an alignment film subjected to a uniaxial aligning treatment, batonnets (e.g., is islands of smectic phase) are generated from the uniaxial aligning-treated alignment film side and gradually grow toward the other alignment film side smoothly. For this reason, the liquid crystal molecule are finally aligned uniformly between the electrode plates, thus also exhibiting good performances when the resultant liquid crystal device is driven.

The liquid crystal device of the present invention includes at least one alignment control layer having a thickness of at most 200 Å or at least one alignment control layer consisting of a polyimide film.

The former alignment control layer may preferably have a thickness of at most 100 Å, more preferably at most 50 Å, in order to allow good driving characteristics, a high reliability and a driving stability in a wide temperature range.

This may be attributable to, e.g., an improvement in switching characteristic by using a thin alignment control layer since a certain permittivity of the alignment control layer is ensured and an alleviation of reverse electric field due to a spontaneous polarization of the liquid crystal composition used is enhanced. Particularly, when a chiral smectic liquid crystal composition for providing good and high-speed switching characteristic is used, such a liquid crystal composition generally has a spontaneous polarization of at least 10 $nC/cm^2$ in many cases. In addition, the thin alignment control layer can suppress contact charging caused at a boundary between an electrode and the alignment control layer, so that we presume that irregularities in switching and alignment caused by the contact charging are suppressed. This is particularly noticeable in the case of employing the mutually different aligning treatments as described above.

The latter alignment control layer (polyimide alignment control layer) may generally be prepared by applying a polyamic acid (polyimide precursor) solution onto the surface (electrodes) of the substrate(s), heating the applied (coating) layer and subjecting it to the above-described rubbing treatment.

In the present invention, when the polyimide alignment control layer is used in combination with a chiral smectic liquid crystal composition disposed between the pair of substrates subjected to different aligning treatments, it is possible to attain a liquid crystal device providing good driving characteristics, a high reliability and a driving stability in a very wide temperature range. Particularly, by using a polyimide alignment control layer having a small thickness (at most 200 Å) subjected to rubbing treatment formed on one substrate and an alignment control layer consisting of other materials (e.g., a layer of a silane coupling agent) not subjected to rubbing treatment on the other substrate in combination, it is possible to provide a particularly stable alignment control ability and excellent drive characteristics.

In view of ease of formation and a high alignment control ability, the alignment control layer 4 may preferably comprise a polyimide film represented by the following formula (III) as a recurring unit.

Formula (III)

(III)

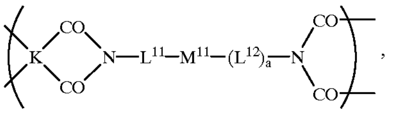

in which

K is

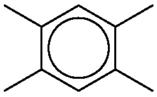

,

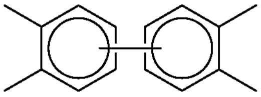

or

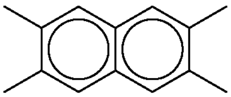

;

$L^{11}$ and $L^{12}$ independently denote

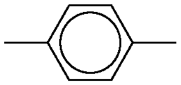

,

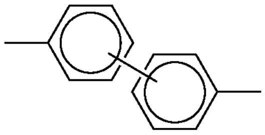

,

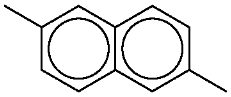

or an alkylene group having 1–20 carbon atoms;

$M^{11}$ is a single bond or —O—; and a is 0, 1 or 2.

Specific examples of the polyimide of the formula (III) include those having the following recurring units shown below.

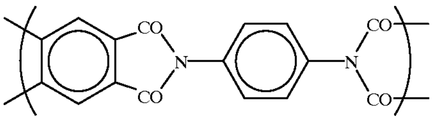

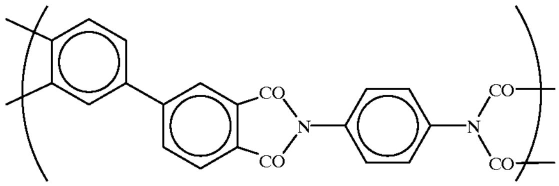

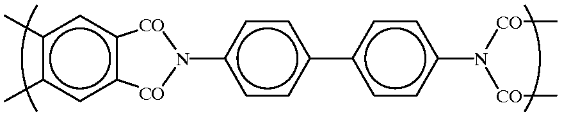

-continued

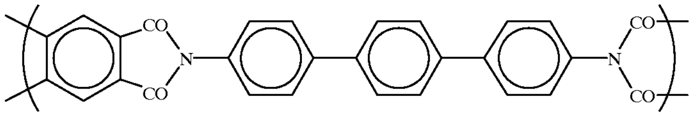

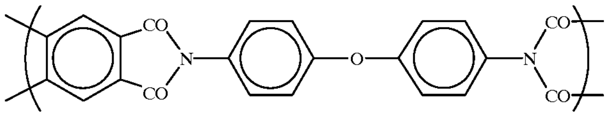

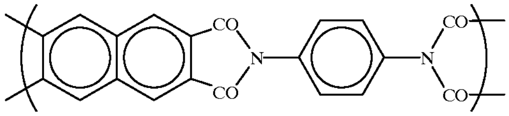

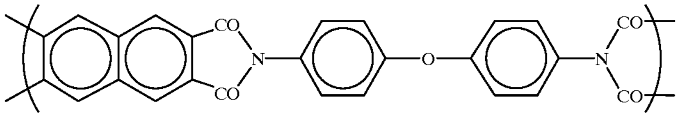

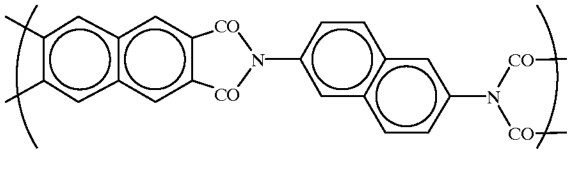

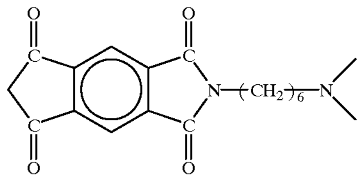

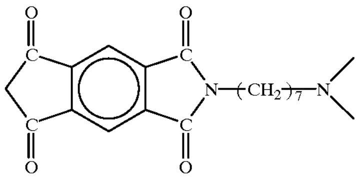

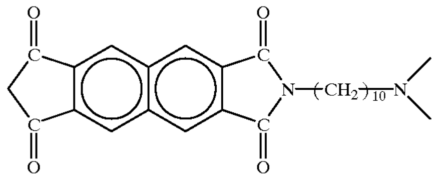

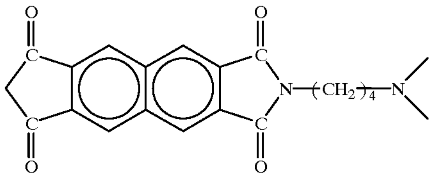

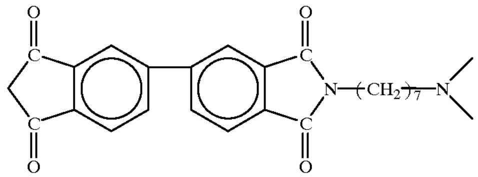

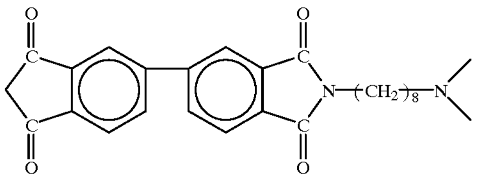

The compound (B) containing a fluorocarbon terminal pattern having at least one catenary ether oxygen atom may include compounds described in U.S. Pat. No. 5,262,082, WO93/22396, and The 4th Int'l FLC conference, P-46 (1993) (Marc D. Radcliffe et al).

The compound (B) may preferably contain a fluorocarbon terminal portion (perfluoroether group) represented by the following structure:

$—D^2—(C_{xb}F_{2xb}—O)_{za}—C_{ya}F_{2ya+1}$, where xb is independently 1–10 for each $(C_{xb}F_{2xb}—O)$; ya is 1–10; za is 1–10; $—D^2—$ is $—CO—O—C_{rc}H_{2rc}$, $—O—C_{rc}H_{2rc}—$, $—C_{rc}H_{2rc}—$, $—O—(C_{sa}H_{2sa}—O)_{ta}—C_{rd}H_{2rd}—$, $—O—SO_2—$, $—SO_2—$, $—SO_2—C_{rc}H_{2rc}—$, $—C_{rc}H_{2rc}—N(C_{pb}H_{2pb+1})—SO_2—$, $—C_{rc}H_{2rc}—N(C_{pb}H_{2pb+1})—CO—$, or a covalent bond where rc and rd are independently 1–20; sa is independently 1–10 for each $(C_{sa}H_{2sa}—O)$; ta is 1–6; and pb is 0–4.

In general, the fluorine-containing mesomorphic compound (A) having the perfluoroether group (particularly by the compound (B)) has a central core comprised of at least two rings independently selected from aromatic, heteroaromatic, cycloaliphatic, or cycloaliphatic rings, connected one with another by a covalent bond or by groups selected from —COO—, —COS—, —NC=N—, —COSe—. Rings may be fused or non-fused. Heteroatoms within the heteroaromatic ring comprise at least one atom selected from N, O, or S. Non-adjacent methylene groups in cycloaliphatic rings may be substituted by O or S atoms.

In this case, the central core may more preferably be one containing a benzene ring and a pyrimidine ring.

The compound (B) may more preferably be represented by the following general formula (II):

Formula (II):

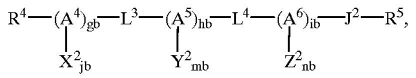

where $A^4$, $A^5$ and $A^6$ are each independently denote

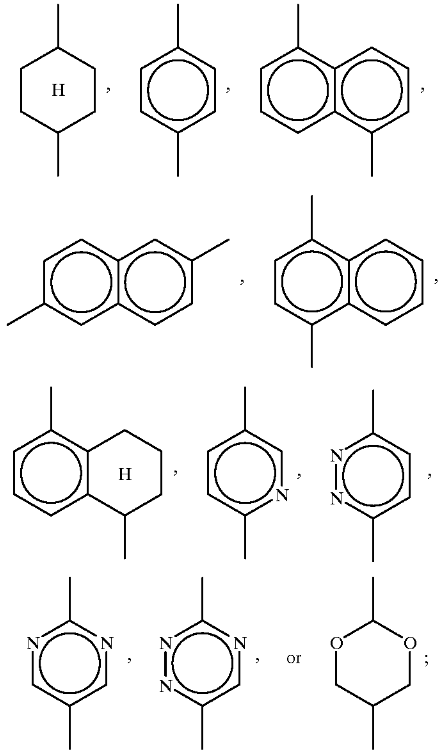

or gb, hb and ib are each independently an integer of 0–3 with the proviso that the sum of gb+hb+ib be at least 2;

each $L^3$ and $L^4$ are independently a single bond, —CO—O—, —O—CO—, —CO—S—, —S—CO—, —CO—Se—, —Se—CO—, —CO—Te—, —Te—CO—, —$(CH_2CH_2)_{ka}$—(ka is 1–4), —CH=CH—, —C≡C—, —CH=N—, —N=CH—, —$CH_2$—O—, —O—$CH_2$—, —CO—or —O—;

$X^2$, $Y^2$ and $Z^2$ are each a substituent of $A^4$, $A^5$ $A^6$, respectively, and each $X_2$, $Y_2$ and $Z_2$ independently —H, —Cl, —F, —Br, —I, —OH, —$OCH_3$, —$CH_3$, —$CF_3$, —O—$CF_3$, —CN or —$NO_2$; each jb, mb and nb are independently an integer of 0–4;

$J^2$ is —CO—O—$C_{rc}H_{2rc}$—, —O—$C_{rc}H_{2rc}$—, —$C_{rc}H_{2rc}$—, —O—$(C_{sa}H_{2sa}$—$O)_{ta}$—$C_{rd}H_{2rd}$—, —O—$SO_2$—, —$SO_2$—, —$SO_2$—$C_{rc}H_{2rc}$—, —$C_{rc}H_{2rc}$—N$(C_{pb}H_{2pb+1})$—$SO_2$—or —$C_{rc}H_{2rc}$—N$(C_{pb}H_{2pb+1})$—CO—where rc and rd are independently 1–20; sa is independently 1–10 for each $(C_{sa}H_{2sa}$—O), ta is 1–6; pb is 0–4;

$R^4$ is —O—$(C_{qc}H_{2qc}$—$O)_{wa}$—$C_{qd}H_{2qd+1}$, —$(C_{qc}H_{2qc}$—$O)_{wa}$—$C_{qd}H_{2qd+1}$, —$C_{qc}H_{2qc}$—$R^6$, —O—$C_{qc}H_{2qc}$—$R^6$, —CO—O—$C_{qc}H_{2qc}$—$R^6$, or O—CO—$C_{qc}H_{2qc}$—$R^6$ which may be either straight chain or branched where $R^6$ is —O—CO—$C_{qd}H_{2qd+1}$; —CO—O—$C_{qd}H_{2qd+1}$, —Cl, —F, —$CF_3$, —$NO_2$, —CN or —H; qc and qd are independently 1–20; wa is 1–10;

$R^5$ is $(C_{xb}F_{2xb}$—$O)_{za}$—$C_{ya}F_{2ya+1}$, wherein xb is independently 1–10 for each $(C_{xb}F_{2xb}$—O); ya is 1–10; and za is 1–10.

The compound (B) represented by the formula (II) may be synthesized through processes similar to those descried in JP-A (Kohyo) 7-506368 and WO93/22396. Specific examples of such compounds of the formula (II) may include those (Example Compound Nos. II-1 to II-45) shown below.

II-1

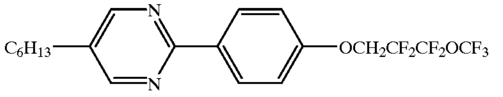

II-2

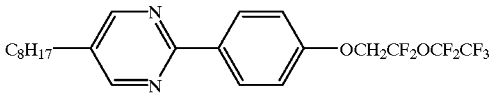

II-3

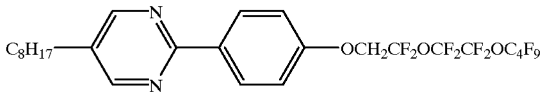

II-4

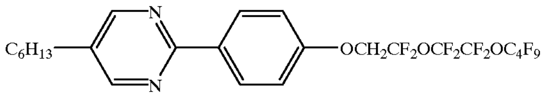

II-5

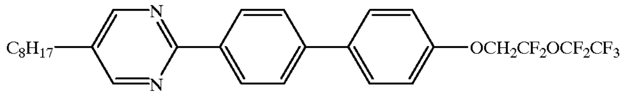

II-6

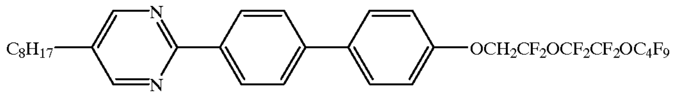

-continued
II-7
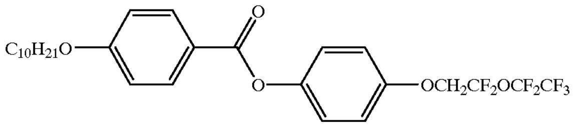
II-8
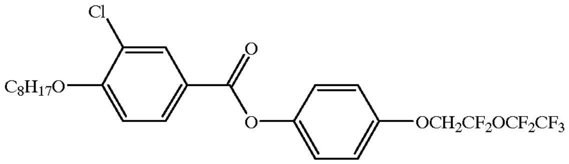
II-9
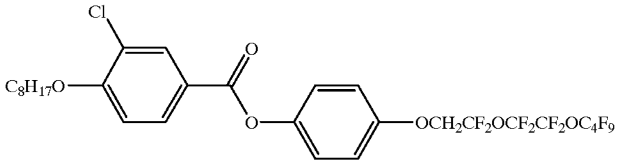
II-10
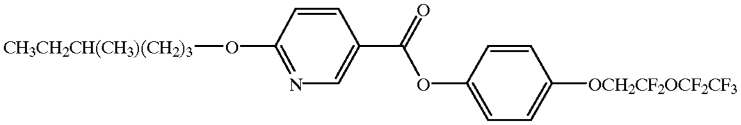
II-11
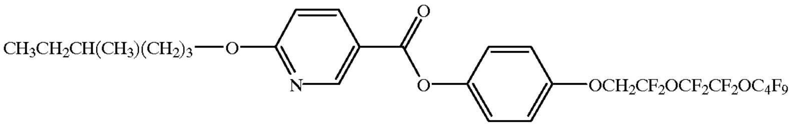
II-12
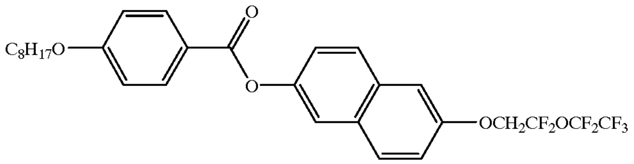
II-13
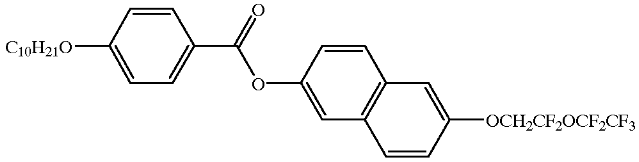
II-14
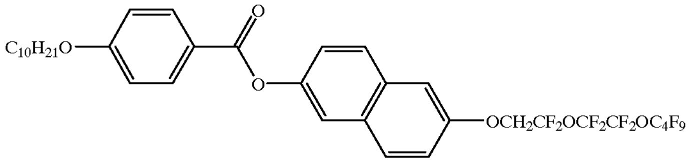
II-15
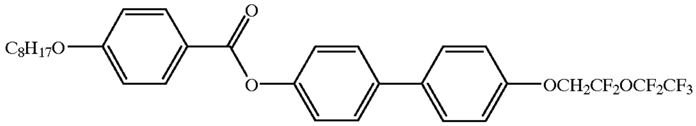
II-16
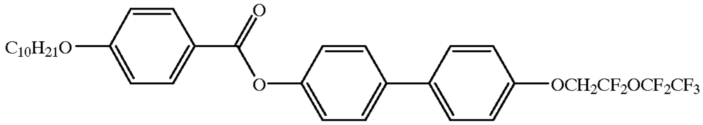

-continued
II-17
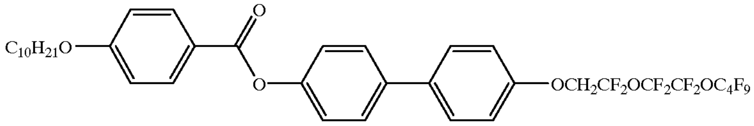
II-18
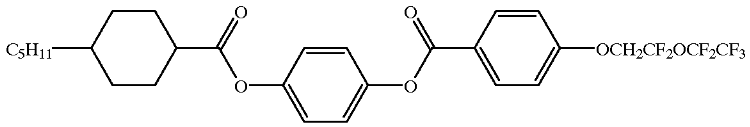
II-19
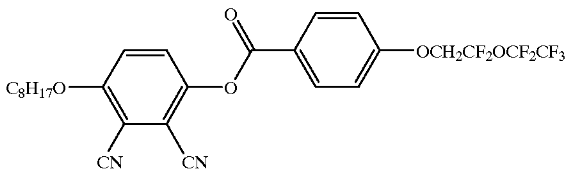
II-20
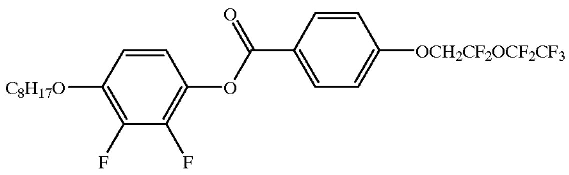
II-21
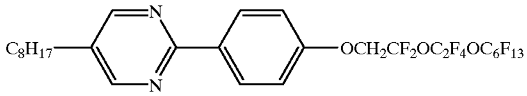
II-22
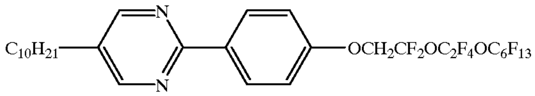
II-23
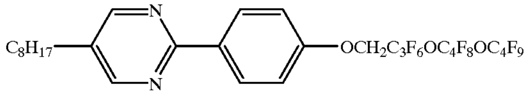
II-24
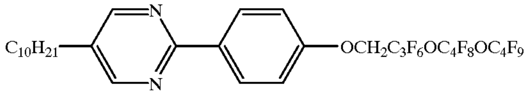
II-25
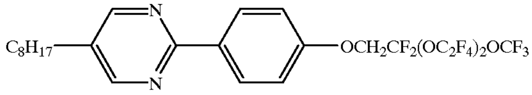
II-26
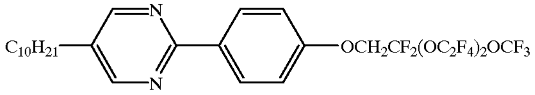
II-27
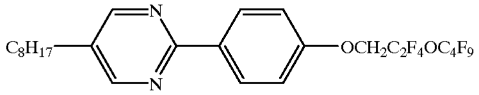
II-28
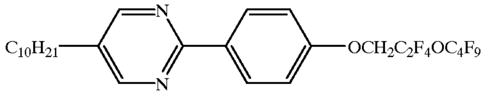
II-29
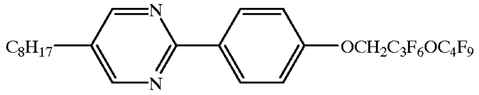
II-30
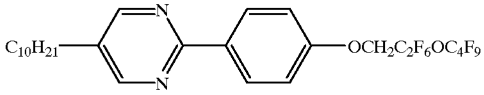
II-31
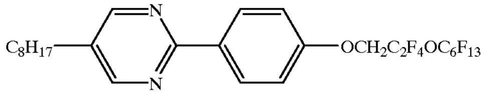
II-32
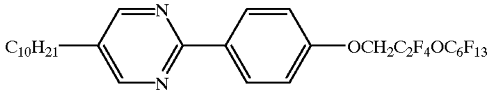
II-33
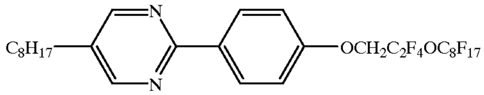
II-34
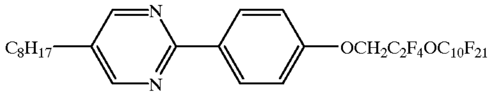
II-35
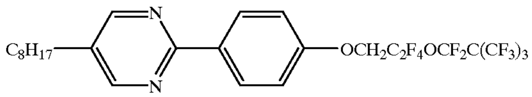
II-36
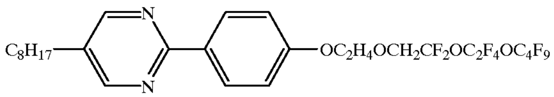
II-37
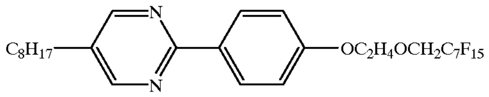
II -38
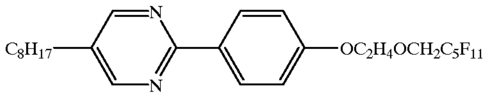

-continued

II-39

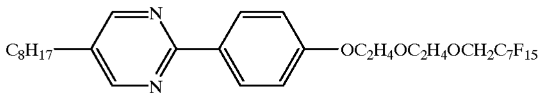

II-40

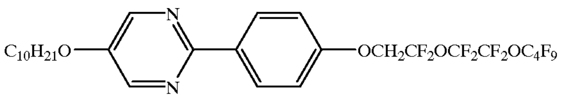

II-41

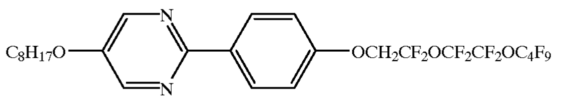

II-42

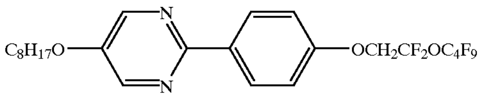

II-43

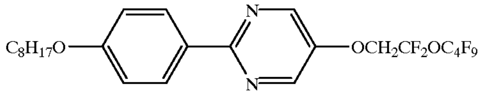

II-44

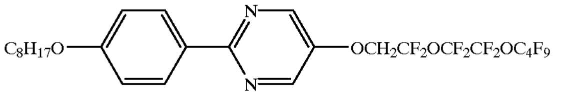

II-45

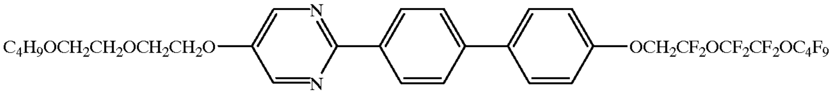

The above-described compound (C) providing a tilt angle θ of at least 30 degrees (preferably 35 degrees) at a temperature T (Tc−T=15° C.) is contained in an amount of at least 5 wt. % (preferably at least 10 wt. %) based on the liquid crystal composition, so that the resultant liquid crystal device is improved in a stability of a layer structure against temperature change to stably maintain a bookshelf structure or a layer structure closer thereto. Further, the liquid crystal device comprising the above liquid crystal composition provides a good alignment characteristic (good bistability) to ensure a high-speed drive, a high brightness, a high contrast and a high reliability.

The compound (C) may preferably be represented by the above-mentioned formula (II). The compound represented by the formula (II) may particularly preferably be those of the formula (II) wherein $R^4$ is $—O—(C_{qc}H_{2qc}—O)_{wa}—C_{qd}H_{2qd+1}$, $—O—C_{qc}H_{2qc}—R^6$ or $—O—CO—C_{qc}H_{2qc}—R^6$ where qc, qd, wa and $R^6$ have the meanings defined above.

Specific examples of the preferred compounds of the compound (C) may include those shown below.

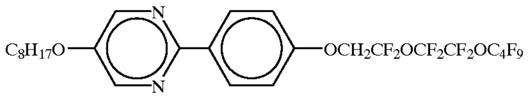

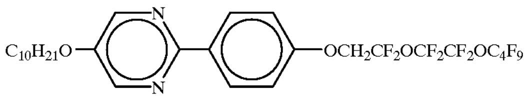

In the liquid crystal composition used in the present invention, the fluorine-containing mesomorphic compound (A) may include a fluorine-containing mesomorphic compound having a perfluoroalkyl group (hereinafter, called "perfluoroalkyl-type mesomorphic compound) in view of a high mutual solubility with the compounds (B) and/or (C).

The perfluoroalkyl-type mesomorphic compound may include compounds described in, e.g., JP-A 2-142753.

The perfluoroalkyl-type mesomorphic compound (as the compound (A)) may preferably comprise a fluorocarbon terminal portion represented by the formula $—D^1—C_{xa}F_{2xa}—X$, where xa is 1–20; X is —H or —F; $—D^1—$ is $—CO—O—(CH_2)_{ra}—$, $—O—(CH_2)_{ra}—$, $—(CH_2)_{ra}—$, $—O—SO_2—$, $—SO_2—$, $—SO_2—(CH_2)_{ra}—$, $—O—(CH_2)_{ra}—O—(CH_2)_{rb}—$, $—(CH_2)_{ra}—N(C_{pa}H_{2pa+1})—SO_2—$ or $—(CH_2)_{ra}—N(C_{pa}H_{2pa+1})—CO—$ where ra and rb are independently 1–20; and pa is 0–4.

In the case of the perfluoroalkyl-type mesomorphic compound, the mesomorphic compound may preferably have a central core comprising at least two aromatic, heteroaromatic, cycloaliphatic, or cycloaliphatic rings. The aromatic or heteroaromatic ring may be selected from fused aromatic, heteroaromatic, or non-fused aromatic or heteroaromatic rings, and the rings may connected one with another by means of functional groups selected from —COO—, —COS—, —HC═N—, —COSe—. Heteroatoms within the heteroaromatic ring comprise at least one atom selected from N, or S.

In this case, the central core may preferably contain a benzene ring and a pyrimidine ring.

The perfluoroalkyl-type mesomorphic compound may more preferably be represented by the following general formula (I):

Formula (I):

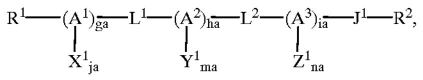

wherein $A^1$, $A^2$ and $A^3$ are each independently

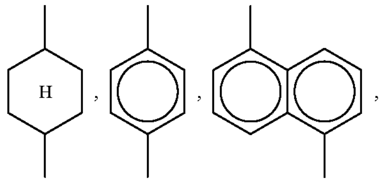
,

-continued

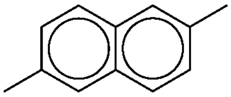
,
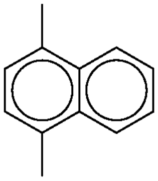

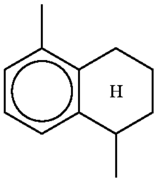
,
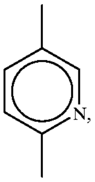
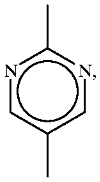
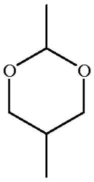
or

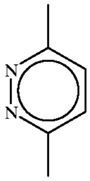
;

ga, ha and ia are independently an integer of 0–3 with the proviso that the sum of ga+ha+ia be at least 2;

$L^1$ and $L^2$ are independently a covalent bond, —CO—O—, —O—CO—, —COS—, —S—CO—, —CO—Se—, —Se—CO—, —CO—Te—, —Te—CO—, $—CH_2CH_2—$, —CH=CH—, —C≡C—, —CH=N—, —N=CH—, $—CH_2—O—$, $—O—CH_2—$, —CO—or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, $—OCH_3$, $—CH_3$, —CN or $—NO_2$;

each ja, ma and na are independently an integer of 0–4;

$J^1$ is $—CO—O—(CH_2)_{ra}—$, $—O—(CH_2)_{ra}—$, $—(CH_2)_{ra}—$, $—O—SO_2—$, $—SO_2—$, $—SO_2—(CH_2)_{ra}—$, $—O—(CH_2)_{ra}—O—(CH_2)_{rb}—$, $—(CH_2)_{ra}—N(C_{pa}H_{2pa+1})—SO_2—$ or $—(CH_2)_{ra}—N(C_{pa}H_{2pa+1})—CO—$where ra and rb are independently 1–20, and pa is 0–4;

$R^1$ is $—O—C_{qa}H_{2qa}—O—C_{qb}H_{2qb+1}$, $—C_{qa}H_{2qa}—O—C_{qb}H_{2qb+1}$, $—C_{qa}H_{2qa}—R^3$, $—O—C_{qa}H_{2qa}—R^3$,$—CO—O—C_{qa}H_{2qa}—R^3$, or $—O—CO—C_{qa}H_{2qa}—R^3$ which may be either straight chain or branched where $R^3$ is $—O—CO—C_{qb}H_{2qb+1}$, $—CO—O—C_{qb}H_{2qb+1}$, —H, —Cl, —F, $—CF_3$, $—NO_2$ or —CN; and qa and qb are independently 1–20;

$R^2$ is $C_{xa}F_{2xa}—X$, wherein X is —H or —F, xa is an integer of 1–20.

The perfluoroalkyl-type mesomorphic compound represented by the formula (I) may be synthesized through processes similar to those described in JP-A (Kokai) 2-142753 and U.S. Pat. No. 5,082,587. Specific examples of such a mesomorphic compound of the formula (I) may include those (Example Compound Nos. I-1 to I-103) shown below.

I-1

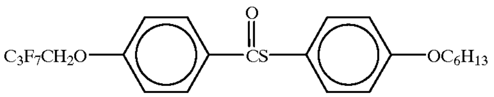

I-2

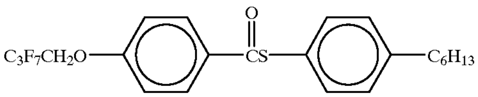

I-3

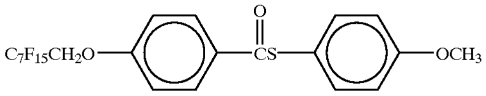

I-4

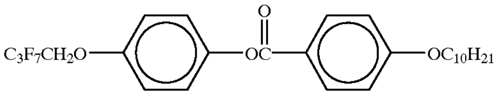

I-5

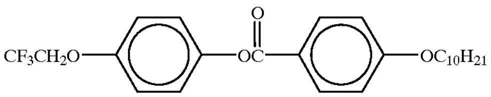

I-6

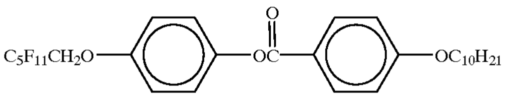

I-7

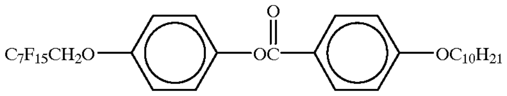

I-8

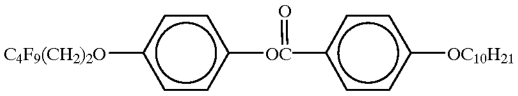

I-9

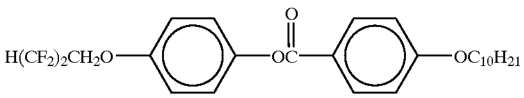

I-10

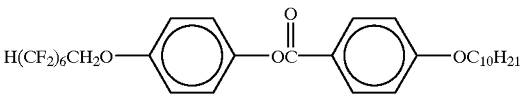

I-11

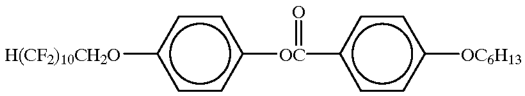

I-12

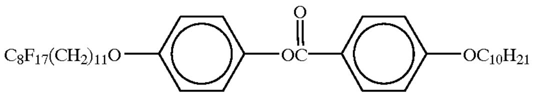

I-13

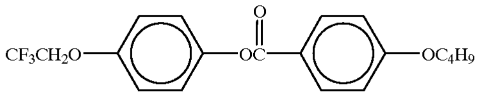

I-14

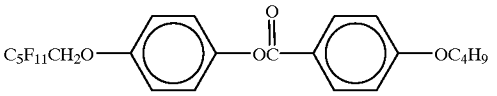

-continued
I-15
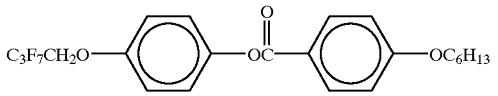
I-16
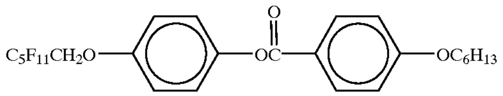
I-17
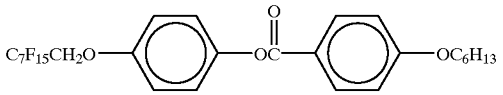
I-18
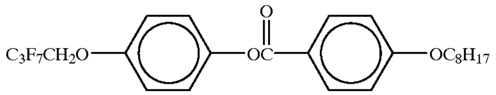
I-19
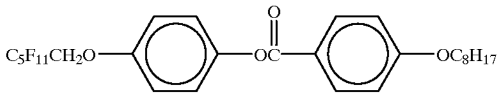
I-20
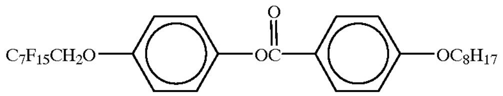
I-21
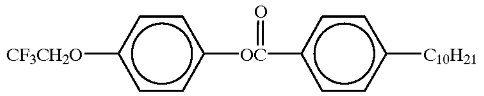
I-22
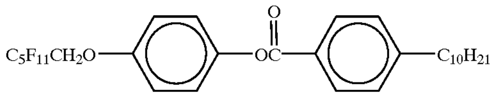
I-23
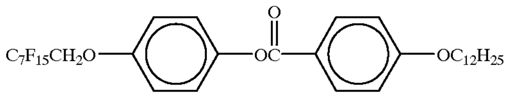
I-24
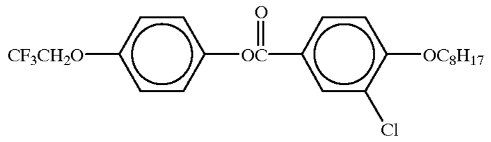
I-25
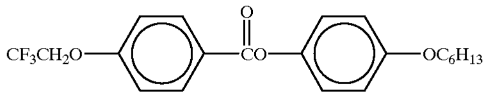
I-26
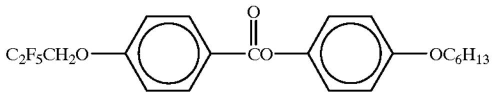
I-27
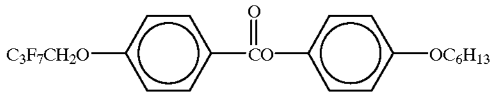
I-28
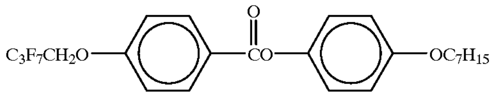
I-29
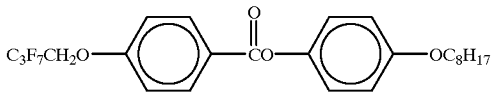
I-30
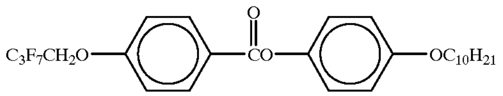
I-31
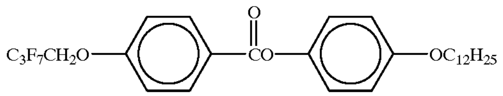
I-32
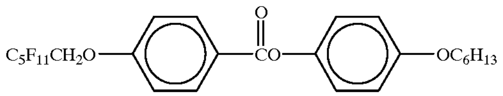
I-33
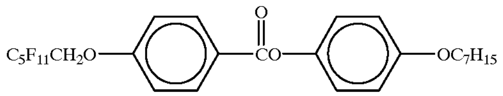
I-34
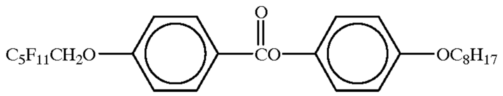
I-35
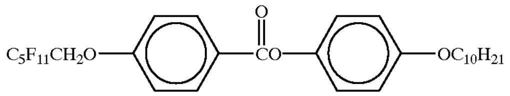
I-36
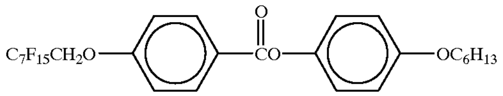
I-37
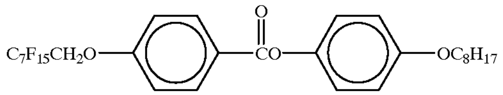
I-38
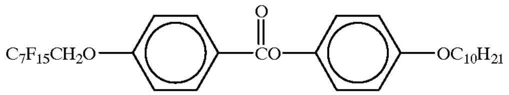
I-39
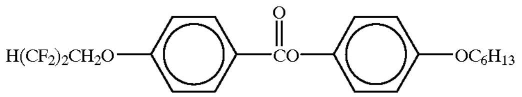
I-40
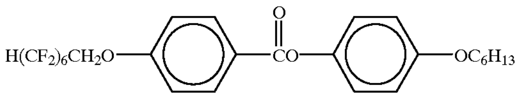

-continued
I-41
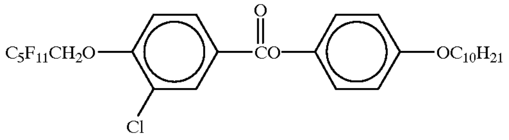
I-42
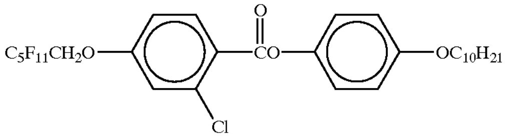
I-43
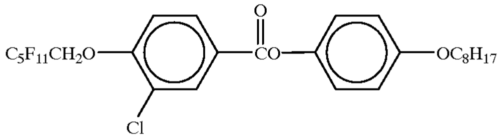
I-44
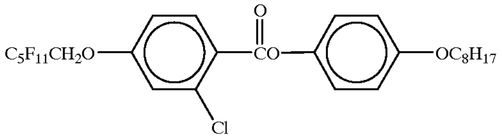
I-45
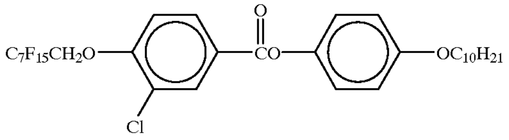
I-46
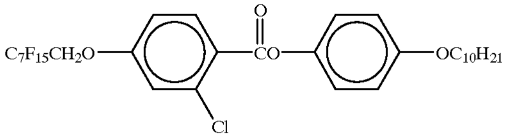
I-47
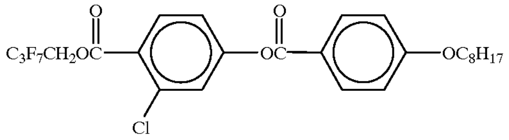
I-48
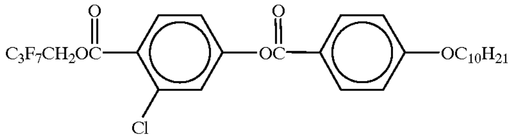
I-49
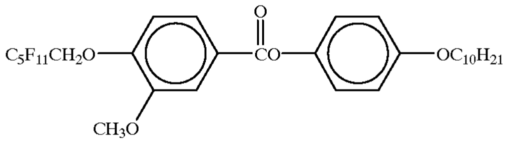
I-50
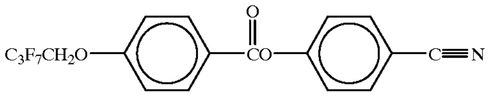
I-51
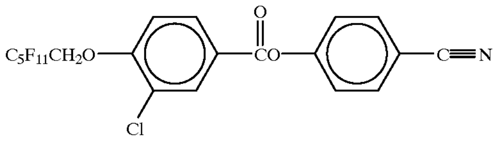
I-52
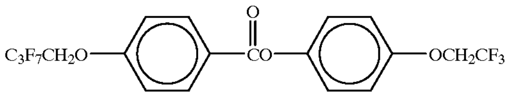
I-53
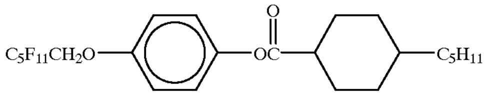
I-54
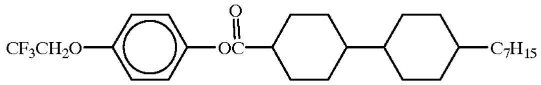
I-55
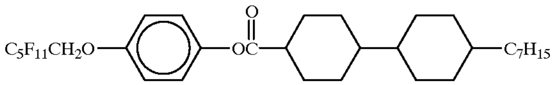
I-56
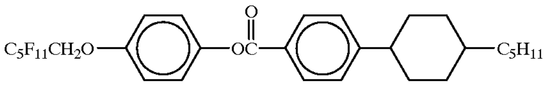
I-57
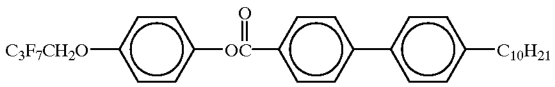
I-58
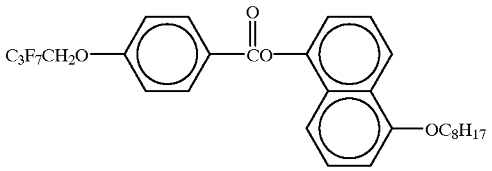
I-59
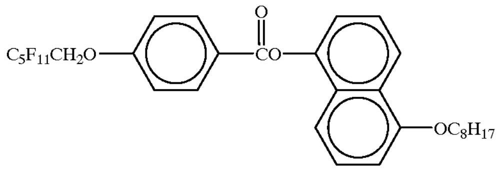
I-60
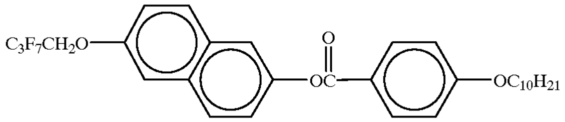

-continued
I-61
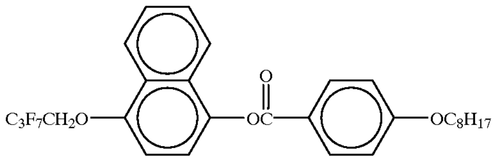
I-62
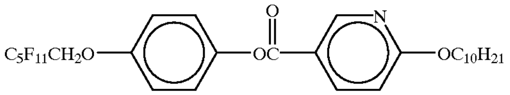
I-63
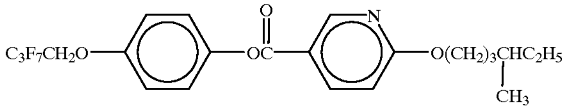
I-64
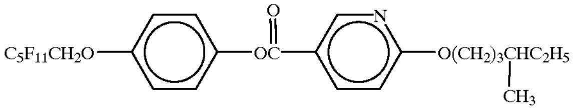
I-65
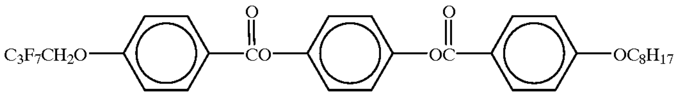
I-66
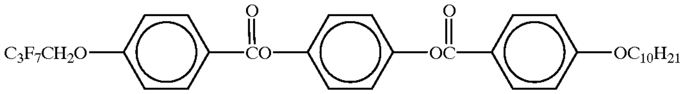
I-67
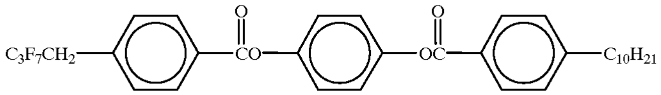
I-68
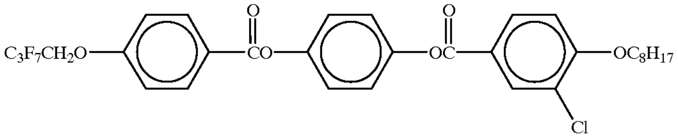
I-69
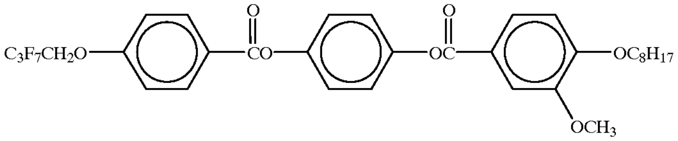
I-70
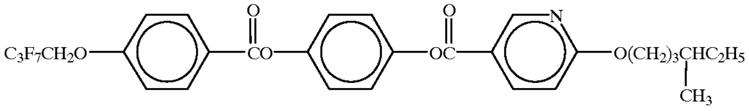
I-71
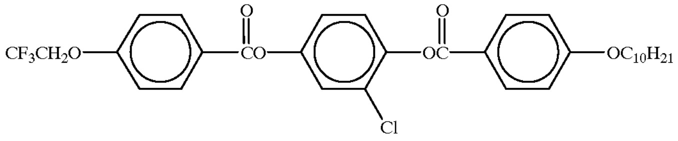
I-72
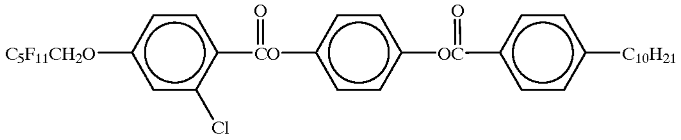
I-73
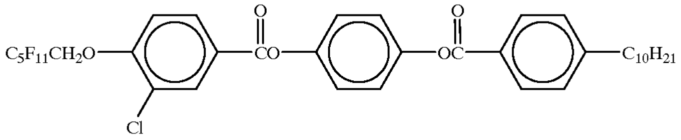

-continued
I-74
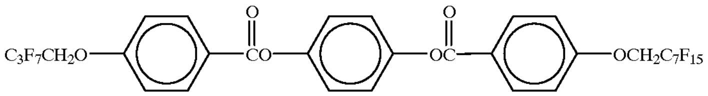
I-75
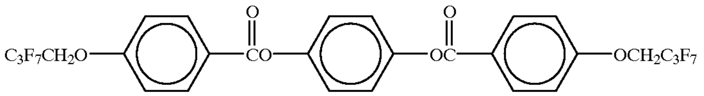
I-76
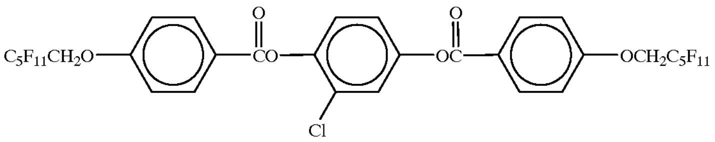
I-77
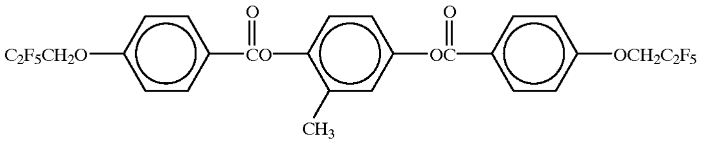
I-78
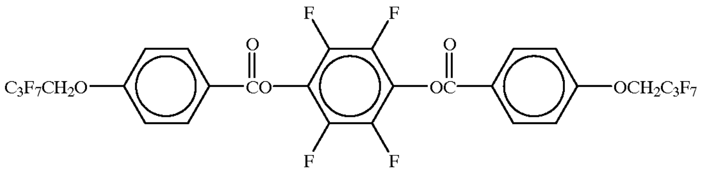
I-79
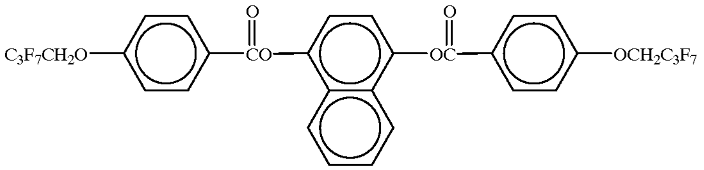
I-80
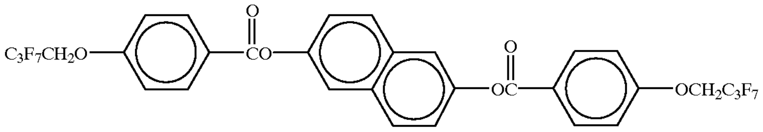
I-81
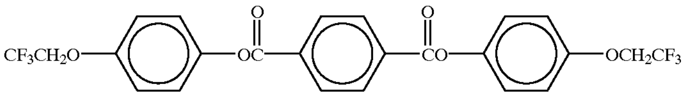
I-82
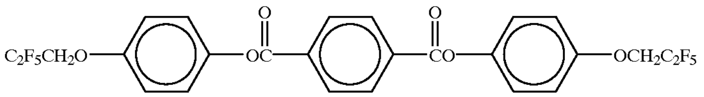
I-83
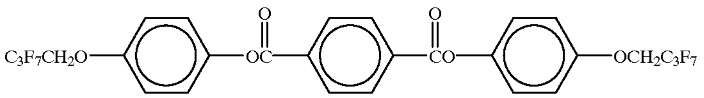
I-84
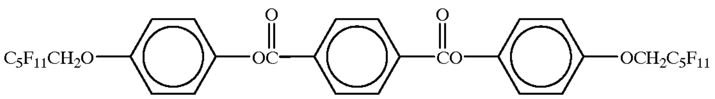

-continued
I-85
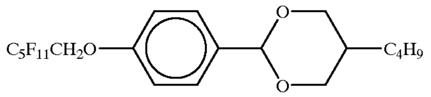
I-86
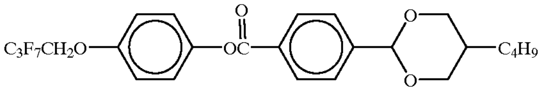
I-87
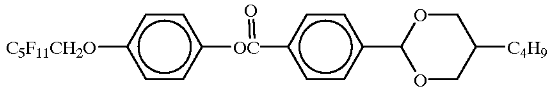
I-88
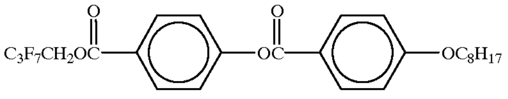
I-89
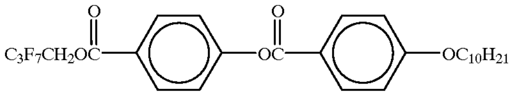
I-90
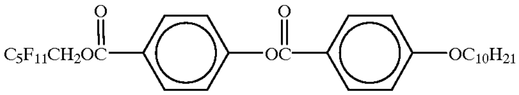
I-91
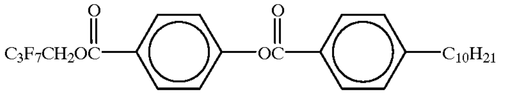
I-92
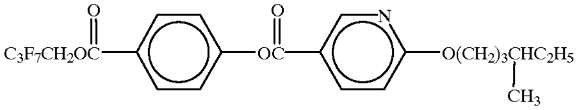
I-93
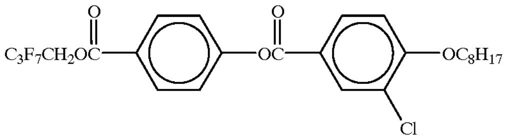
I-94
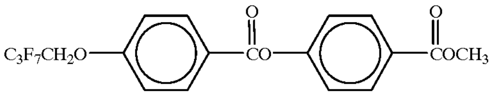
I-95
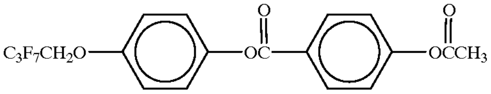
I-96
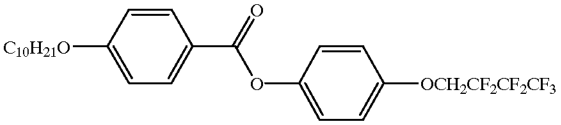
I-97
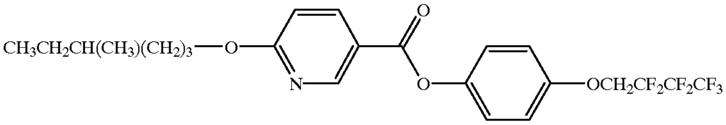
I-98
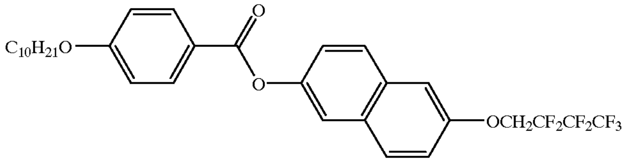
I-99
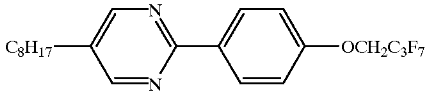
I-100
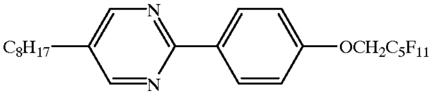
I-101
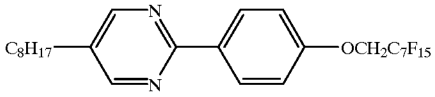
I-102
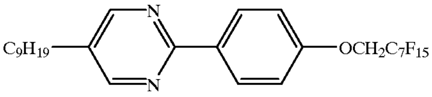
I-103
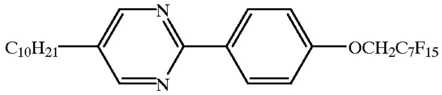
The liquid crystal composition may further contain another mesomorphic compound having no fluorocarbon terminal portion ("hydrocarbon-type mesomorphic compound") in an appropriate amount, preferably in an amount of at most 30 wt. %.

The liquid crystal composition may preferably contain at least one species of an optically active (chiral) compound which may have a fluorocarbon terminal portion.
Specific examples of the hydrocarbon-type mesomorphic compound (free from a perfluorocarbon chain) as another mesomorphic compound may include those shown below.
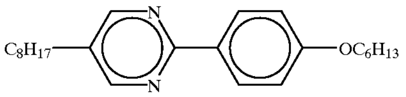
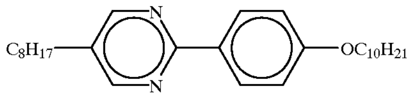
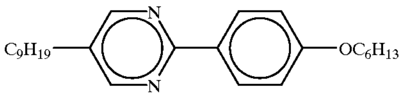
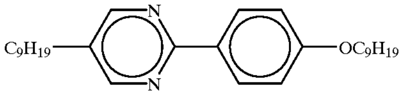
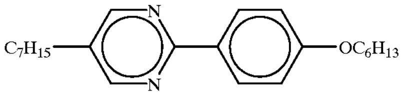
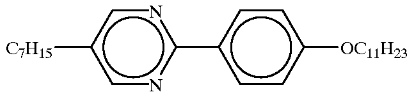
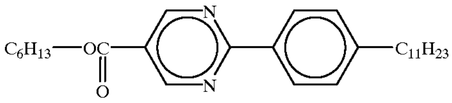
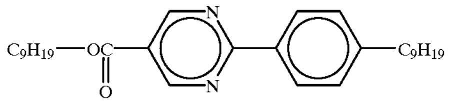
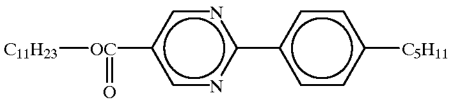
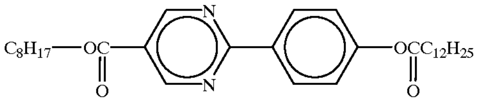
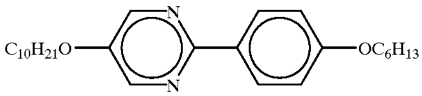
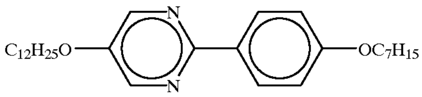
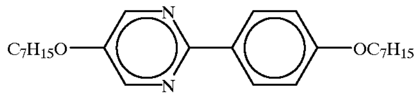
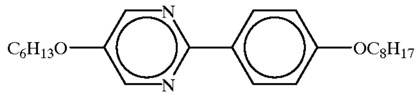
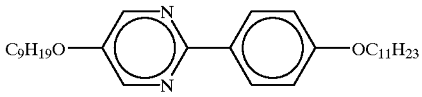
-continued
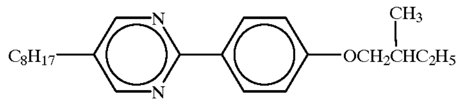
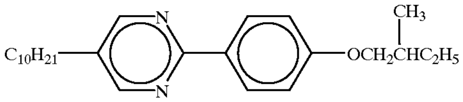
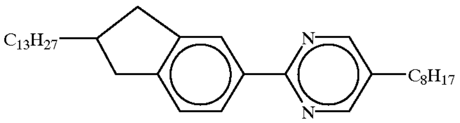
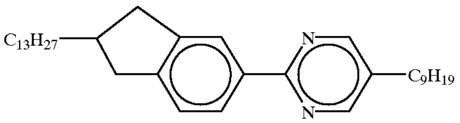
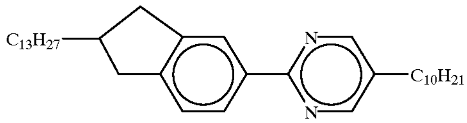
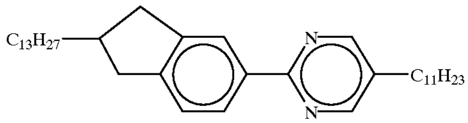
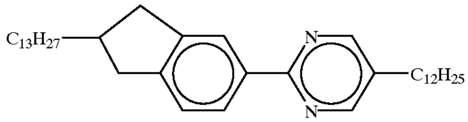
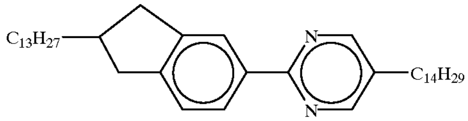
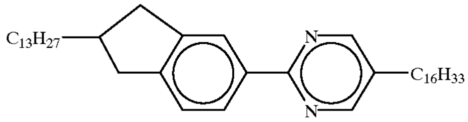
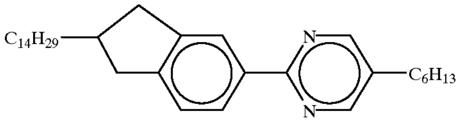
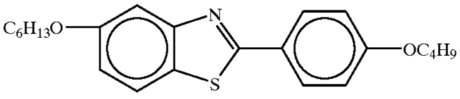
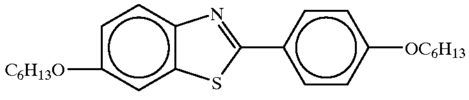
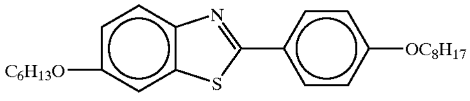
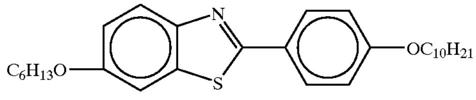

-continued
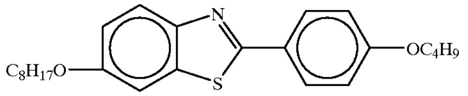
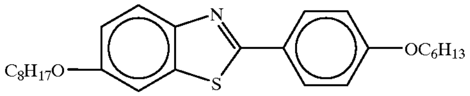
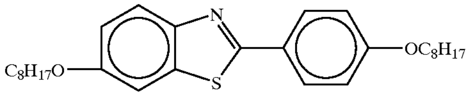
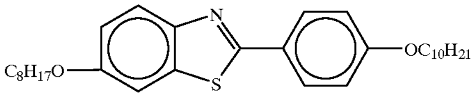
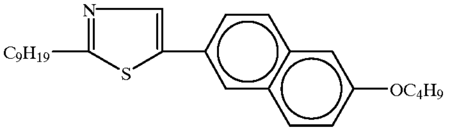
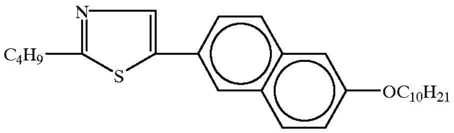
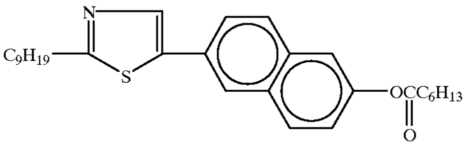
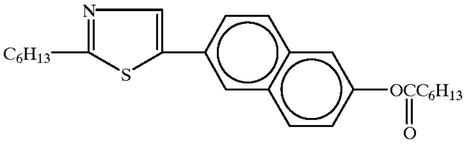
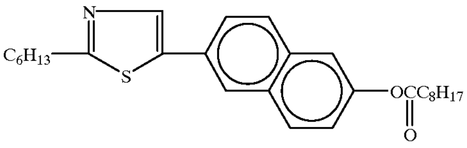
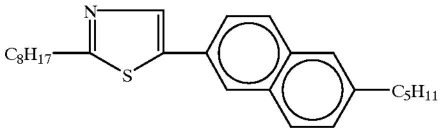
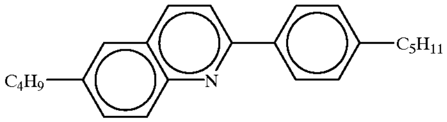
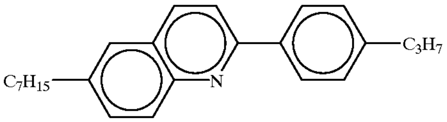
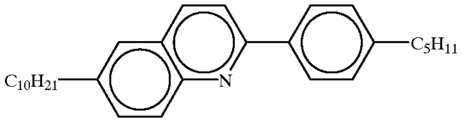
-continued
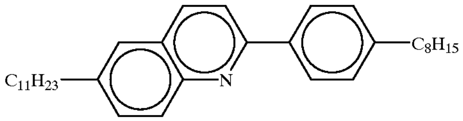
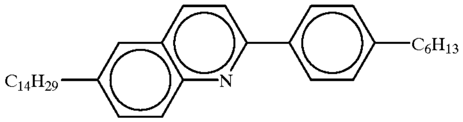
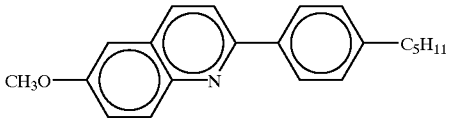
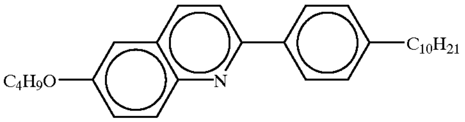
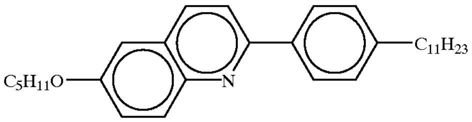
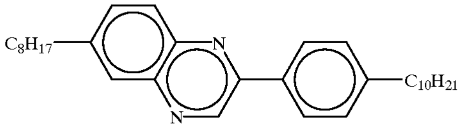
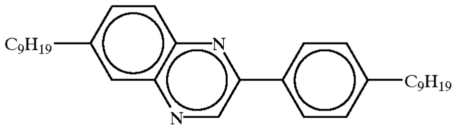
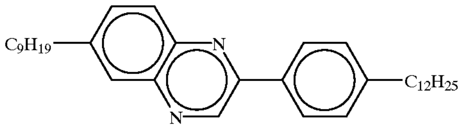
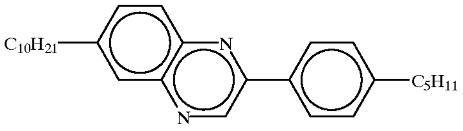
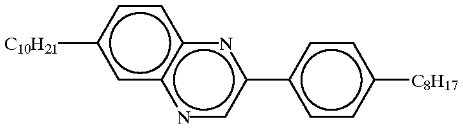
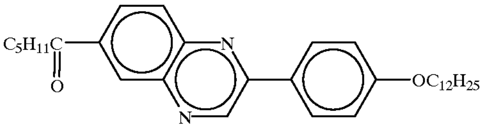
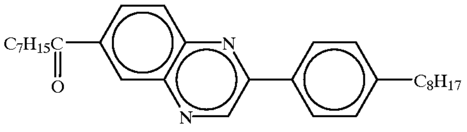
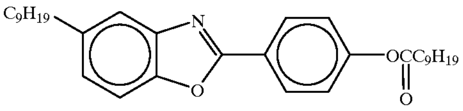

-continued
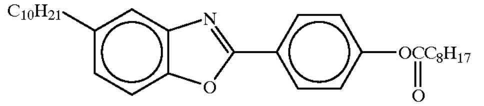
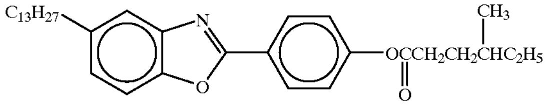
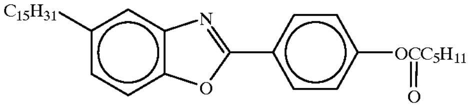
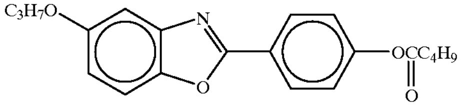
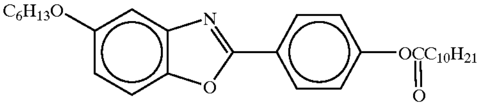
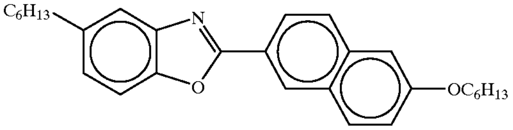
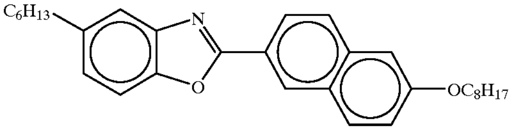
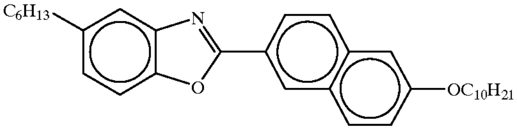
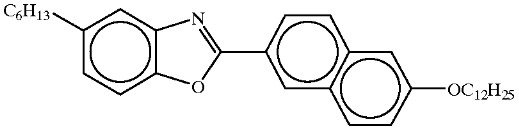
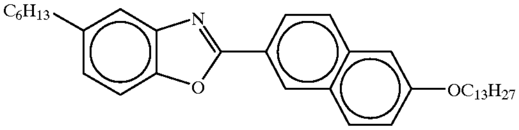
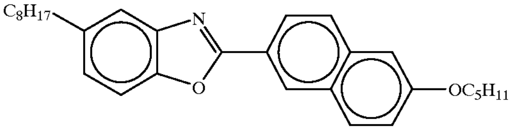
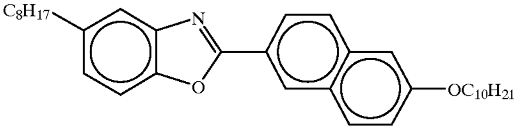
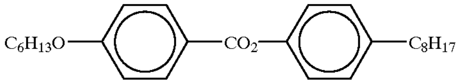
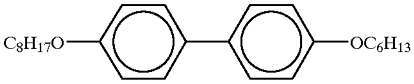
-continued
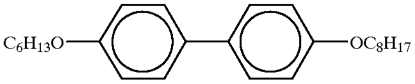
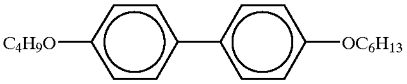
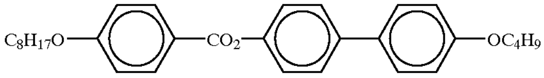
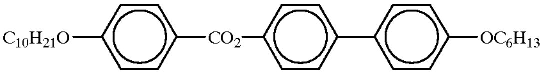
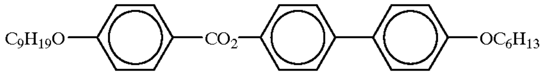
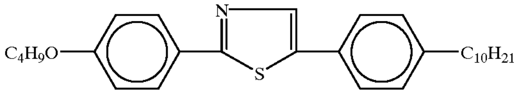
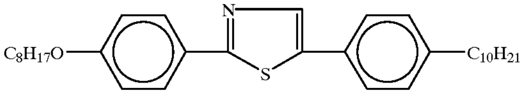
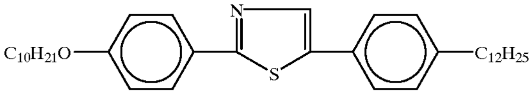
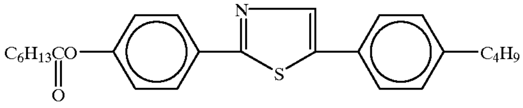
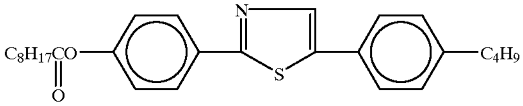
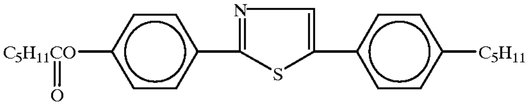
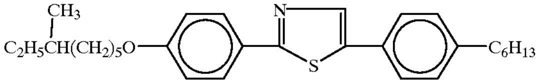
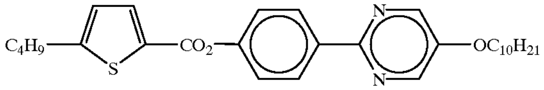
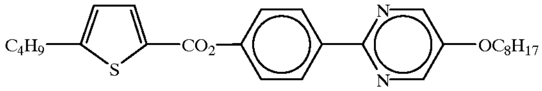
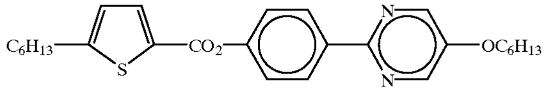
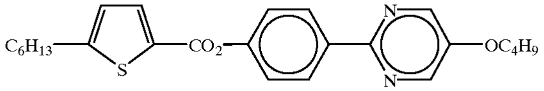
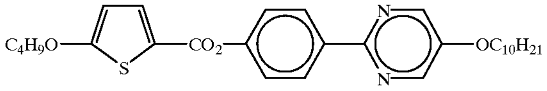

-continued
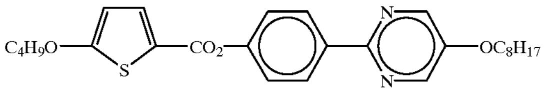
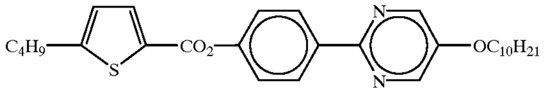
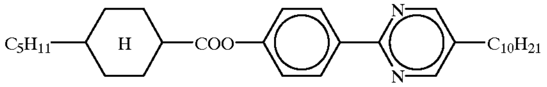
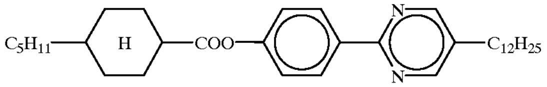
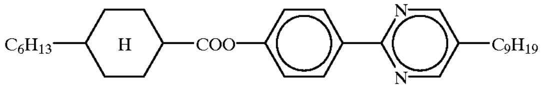
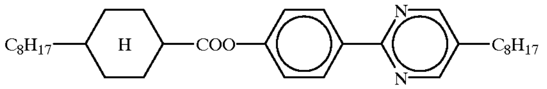
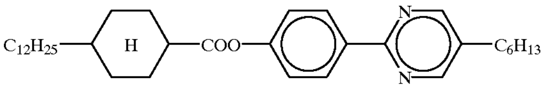
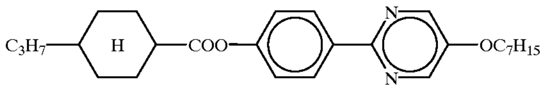
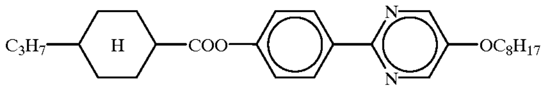
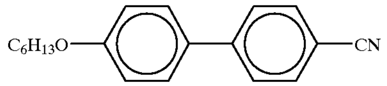
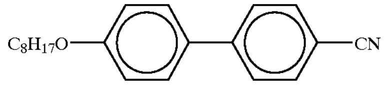
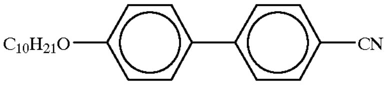
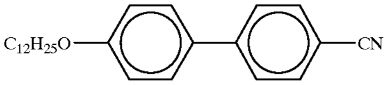
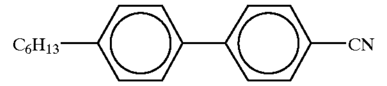
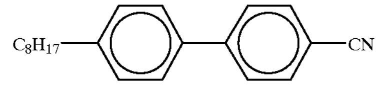
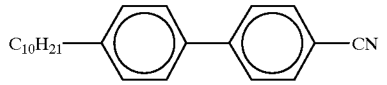
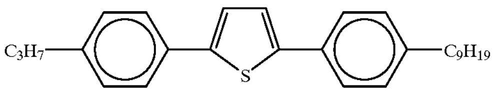
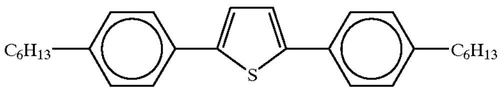
-continued
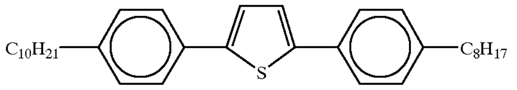
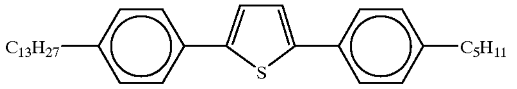
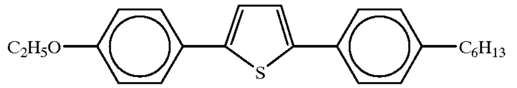
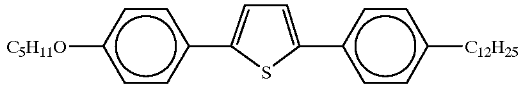
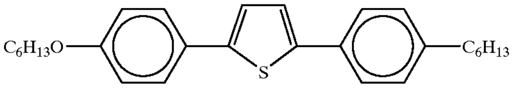
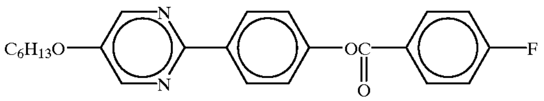
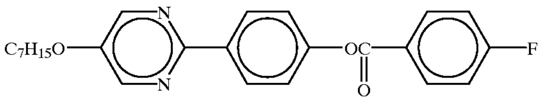
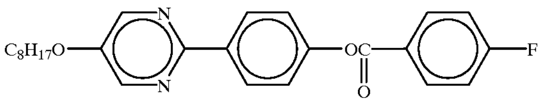
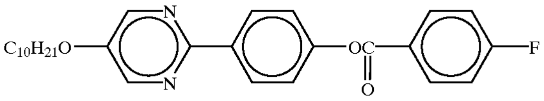
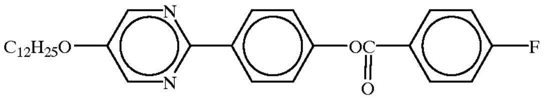
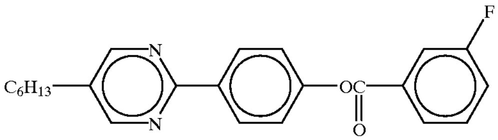
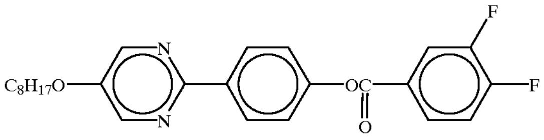
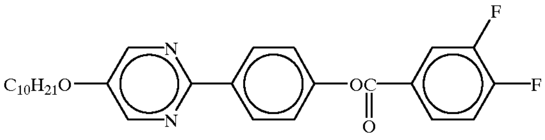
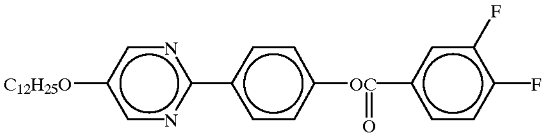
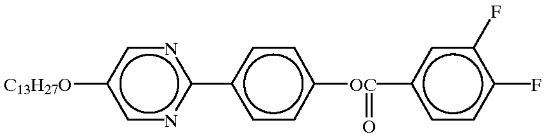

-continued

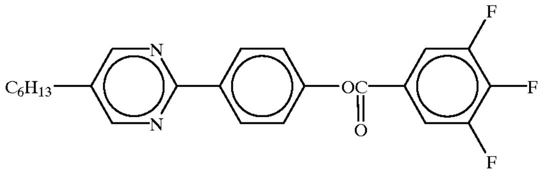

-continued

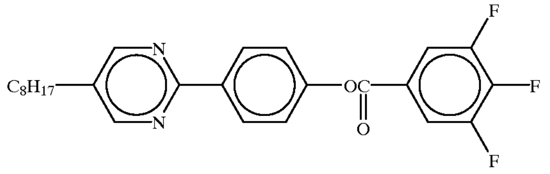

Specific examples of the optically active compound may preferably include those shown below.

TABLE A (for Compounds Nos. A-1 to A-105)
$R^{6"}$—$A^{6"}$—$X^{6"}$—$A^{7"}$—$A^{8"}$—$X^{7"}$—$R^{7"}$—E**-$R^{9"}$

| No. | $R^{6"}$ | $A^{6"}$ | $X^{6"}$ | A" | $A^{8"}$ | $X^{7"}$ | $R^{7"}$ | E** | $R^{8"}$ | $R^{9"}$ |
|---|---|---|---|---|---|---|---|---|---|---|
| 1 | $C_6H_{13}$ | — | — | Ph | Ph | — | M1 | E | H | $C_8H_{17}$ |
| 2 | $C_8H_{17}O$ | — | — | Ph | Ph | — | M1 | E | H | $C_{18}H_{37}$ |
| 3 | $C_5H_{11}O$ | — | — | Ph | Ph2F | — | M1 | E | H | $C_6H_{13}$ |
| 4 | $CH_3O$ | — | — | Ph | Ph | — | M1 | E | H | $C_6H_{13}$ |
| 5 | $C_6H_{13}CH(CH_3)(CH_2)_2O$ | — | — | Ph | Ph | — | M1 | E | H | $C_6H_{13}$ |
| 6 | $C_7H_{15}O$ | — | — | Ph | P23F | — | M1 | E | H | $C_6H_{13}$ |
| 7 | $C_6H_{13}$ | — | — | Ph | Ph | — | M1 | E | H | $C_9H_{19}$ |
| 8 | $C_7H_{15}O$ | — | — | Ph | Ph | — | M1 | E | H | $C_5H_{11}$ |
| 9 | $C_8H_{17}O$ | — | — | Ph | Ph | — | M1 | E | H | $C_6H_{13}$ |
| 10 | $C_8H_{17}$ | — | — | Pr1 | Ph | — | M1 | E | H | $C_8H_{17}$ |
| 11 | $C_{10}H_{21}$ | — | — | Pr2 | Ph | — | M1 | E | H | $C_4H_9$ |
| 12 | $C_{11}H_{23}$ | — | — | Pr2 | Ph | — | M1 | E | H | $C_6H_{13}$ |
| 13 | $C_{12}H_{25}$ | — | — | Pr2 | Ph | — | M1 | E | H | $C_8H_{17}$ |
| 14 | $C_4H_9O$ | — | — | Py1 | Ph | — | M1 | E | H | $C_{10}H_{21}$ |
| 15 | $C_{13}H_{27}$ | — | — | Py2 | Ph | — | M1 | E | H | $C_5H_{11}$ |
| 16 | $C_6H_{13}$ | — | — | Py2 | Ph | — | M1 | E | H | $C_8H_{17}$ |
| 17 | $C_6H_{13}CH(CH_3)CH_2O$ | — | — | Py2 | Ph | — | M1 | E | H | $C_9H_{19}$ |
| 18 | $C_6H_{11}O$ | — | — | Py2 | P23F | — | M1 | E | H | $C_4H_9$ |
| 19 | $C_{10}H_{21}$ | — | — | Py2 | Ph | — | M1 | E | H | $C_6H_{13}$ |
| 20 | $C_8H_{17}$ | — | — | Py2 | Ph3F | — | M1 | E | H | $C_8H_{17}$ |
| 21 | $C_6H_{13}$ | — | — | Cy | Ph | — | M1 | E | H | $C_4H_9$ |
| 22 | $C_3H_7$ | — | — | Cy | Ph | — | M1 | E | H | $C_5H_{11}$ |
| 23 | $C_5H_{11}$ | — | — | Cy | Ph | — | M1 | E | H | $C_{14}H_{29}$ |
| 24 | $C_{10}H_{21}$ | — | — | Cy | Ph | — | M1 | E | H | $C_{10}H_{21}$ |
| 25 | $C_6H_{13}$ | — | — | Pa | Ph | — | M1 | E | H | $C_{10}H_{21}$ |
| 26 | $C_7H_{15}OCO$ | — | — | Pd | Ph | — | M1 | E | H | $C_3H$ |
| 27 | $C_6H_{13}$ | — | — | Dt2 | Ph | — | M1 | E | H | $C_6H_{13}$ |
| 28 | $C_8H_{17}$ | — | — | Tn | Ph | — | M1 | E | H | $C_9H_{19}$ |
| 29 | $C_5H_{11}$ | — | — | Tz1 | Ph | — | M1 | E | H | $C_9H_{19}$ |
| 30 | $C_9H_{19}O$ | — | — | Tz2 | Ph | — | M1 | E | H | $C_6H_{13}$ |
| 31 | $C_2H_5$ | — | — | Td | Ph | — | M1 | E | H | $C_7H_{15}$ |
| 32 | $C_{10}H_{21}$ | — | — | Dx2 | Ph | — | M1 | E | H | $C_8H_{17}$ |
| 33 | $C_6H_{13}$ | — | — | Boa2 | Ph | — | M1 | E | H | $C_{10}H_{21}$ |
| 34 | $C_{15}H_{31}$ | — | — | Bob2 | Ph | — | M1 | E | H | $C_{10}H_{21}$ |
| 35 | $C_7H_{15}$ | — | — | Bta2 | Ph | — | M1 | E | H | $C_6H_{13}$ |
| 36 | $C_{16}H_{33}O$ | — | — | Btb2 | Ph | — | M1 | E | H | $C_9H_{19}$ |
| 37 | $C_6H_{13}$ | — | — | Np | Ph | — | M1 | E | H | $C_6H_{13}$ |
| 38 | $C_5H_{11}$ | — | — | Np | Ph | — | Cb | E | H | $C_4H_9$ |
| 39 | $C_8H_{17}CH(CH_3)CH_2O$ | — | — | Ep1 | Ph | — | Cb | E | H | $C_6H_{13}$ |
| 40 | $C_4H_9$ | — | — | Ep2 | Ph | — | M1 | E | H | $C_8H_{17}$ |
| 41 | $C_6H_{13}$ | — | — | Gp1 | Ph | — | M1 | E | H | $C_6H_{13}$ |
| 42 | $C_7H_{15}$ | — | — | Gp2 | Ph | — | M1 | E | H | $C_{12}H_{25}$ |
| 43 | $C_6H_{13}$ | — | — | Cm1 | Ph | — | M1 | E | H | $C_{10}H_{21}$ |
| 44 | $C_8H_{17}$ | — | — | Io1 | Ph | — | M1 | E | H | $C_{12}H_{25}$ |
| 45 | $C_{18}H_{37}$ | — | — | Id1 | Ph | M1 | M1 | E | H | $C_6H_{13}$ |
| 46 | $C_{11}H_{23}$ | — | — | Id1 | Ph | — | M1 | E | H | $C_5H_{11}$ |
| 47 | $C_8H_{17}$ | — | — | Id1 | Ph | — | M1 | E | H | $C_5H_{11}$ |
| 48 | $C_5H_{11}$ | — | — | Id1 | Ph2F | — | M1 | E | H | $C_6H_{13}$ |
| 49 | $C_6H_{13}$ | — | — | Tn | Ph | — | M1 | E | H | $C_6H_{13}$ |
| 50 | $C_4H_9O$ | — | — | Tz2 | Ph | — | M1 | E | H | $C_8H_{17}$ |
| 51 | $C_{12}H_{25}$ | — | — | Btb2 | Ph | — | M1 | E | H | $C_{10}H_{21}$ |
| 52 | $C_6H_{13}O$ | — | — | Btb2 | Ph | — | M1 | E | H | $C_6H_{13}$ |
| 53 | $CH_2{=}CH(CH_2)_3O$ | — | — | Ep2 | Ph | — | M1 | E | H | $C_5H_{11}$ |
| 54 | $C_9H_{19}$ | — | — | Gp2 | Ph | — | M1 | E | H | $C_6H_{13}$ |
| 55 | $C_5H_{11}$ | — | — | Np | Ph | — | M1 | E | H | $C_6H_{13}$ |
| 56 | $C_6H_{13}$ | Ph | — | Ph | Ph | Cb | M1 | E | H | $C_6H_{13}$ |
| 57 | $C_8H_{17}COO$ | Pr2 | — | Ph | Ph | — | M1 | E | H | $C_5H_{11}$ |
| 58 | $C_3H_7$ | Py2 | — | Ph | Ph | — | M1 | E | H | $C_4H_9$ |
| 59 | $C_5H_{11}$ | — | — | Ha2 | Ph | — | M1 | E | H | $C_4H_9$ |

TABLE A-continued (for Compounds Nos. A-1 to A-105)
$R^{6''}$—$A^{6''}$—$X^{6''}$—$A^{7''}$—$A^{8''}$—$X^{7''}$—$R^{7''}$—E**-$R^{9''}$

| No. | $R^{6''}$ | $A^{6''}$ | $X^{6''}$ | A" | $A^{8''}$ | $X^{7''}$ | $R^{7''}$ | E** | $R^{8''}$ | $R^{9''}$ |
|---|---|---|---|---|---|---|---|---|---|---|
| 60 | $C_6H_{13}$ | Ph | COO | Pr2 | Ph | — | M1 | E | H | $C_6H_{13}$ |
| 61 | $C_9H_{19}$ | Ph | — | Pr1 | Ph | — | Cb | E | H | $C_6H_{13}$ |
| 62 | $C_{13}H_{27}$ | Ph | — | Cy | P3Br | M1 | Cb | E | H | $C_5H_{11}$ |
| 63 | $C_{10}H_{21}O$ | Ph | OCO | Py1 | Ph | — | M1 | E | My | $C_6H_{13}$ |
| 64 | $C_7H_{15}$ | Ph | — | Py2 | Ph | — | M1 | E | H | $C_5H_{11}$ |
| 65 | $C_4H_9$ | Ph3TF | COO | Pa | Ph | — | M1 | E | H | $C_6H_{13}$ |
| 66 | $CH_3$ | — | — | Hb2 | Ph | — | M1 | E | H | $C_8H_{17}$ |
| 67 | $C_8H_{17}$ | Ph | — | Tn | Ph | — | M1 | E | H | $(CH_2)_3CH(CH_3)_2$ |
| 68 | $C_2H_5$ | Ph | — | Tz1 | Ph2M | — | M1 | E | H | $C_8H_{17}$ |
| 69 | $C_6H_{13}$ | Ph | — | Ph | Ph | — | M1 | E | H | $C_8H_{17}$ |
| 70 | $C_{10}H_{21}$ | Ph | — | Td | Ph | — | M1 | E | H | $(CH_2)_3CH(CH_3)_2$ |
| 71 | $C_{10}H_{21}$ | — | — | Ph | Py1 | — | M1 | E | H | $C_6H_{13}$ |
| 72 | $C_6H_{13}$ | — | — | Ph | Py1 | — | M1 | E | H | $C_4H_9$ |
| 73 | $C_6H_{13}OCO$ | — | — | Ph | Py1 | — | M1 | E | H | $C_6H_{13}$ |
| 74 | $C_7H_{15}$ | — | — | Ph | Pr2 | — | M1 | E | H | $C_5H_{11}$ |
| 75 | $C_9H_{19}$ | — | — | Ph | Pr2 | — | M1 | E | H | $(CH_2)_3CH(CH_3)_2$ |
| 76 | $C_7H_{15}$ | — | — | Ph | Pr2 | — | M1 | E | H | $C_6H_{13}$ |
| 77 | $C_5H_{11}O$ | — | — | Py2 | Cy | — | M1 | E | H | $C_{10}H_{21}$ |
| 78 | $C_4H_9$ | — | — | Ph | Cy | — | M1 | E | H | $C_{12}H_{25}$ |
| 79 | $C_{12}H_{25}$ | — | — | Ph | Cy | — | M1 | E | H | $C_5H_{11}$ |
| 80 | $C_6H_{13}C{\equiv}C$ | — | — | Ph | Pa | — | M1 | E | H | $C_{10}H_{21}$ |
| 81 | $C_8H_{17}O$ | — | — | Ph | Pd | — | M1 | E | My | $C_6H_{13}$ |
| 82 | $C_3H_7$ | — | — | P2Cl | Tn | — | M1 | E | H | $C_{10}H_{21}$ |
| 83 | $C_4H_9$ | — | — | Ph | Tn | — | M1 | E | H | $C_8H_{17}$ |
| 84 | $C_8H_{17}$ | — | — | Ph | Tz1 | — | M1 | E | H | $C_8H_{17}$ |
| 85 | $C_4H_9OCH(CH_3)COO$ | — | — | Ph | Tz1 | — | M1 | E | H | $C_7H_{15}$ |
| 86 | $C_6H_{13}$ | — | — | Ph2F | Td | — | M1 | E | My | $(CH_2)_3CH(CH_3)C_6H_{13}$ |
| 87 | $C_5H_{11}$ | — | — | Py2 | Np | — | M1 | E | H | $C_9H_{19}$ |
| 88 | $CH_3$ | — | — | Ph | Np | — | M1 | E | H | $C_{12}H_{25}$ |
| 89 | $C_{11}H_{23}$ | — | — | Ph | Np | — | M1 | E | H | $C_6H_{13}$ |
| 90 | $C_5H_{11}$ | — | — | Py1 | Ep1 | — | M1 | E | H | $C_5H_{11}$ |
| 91 | $C_8H_{17}OC_2H_4$ | — | — | Ph | Ep1 | — | M1 | E | H | $C_5H_{11}$ |
| 92 | $C_6H_{13}$ | — | — | Ph | Ep1 | — | M1 | E | H | $C_8H_{17}$ |
| 93 | $C_9H_{19}$ | — | — | Py1 | Gp1 | — | M1 | E | H | $C_5H_{11}$ |
| 94 | $C_8H_{17}$ | — | — | Ph | Gp1 | — | M1 | E | H | $C_6H_{13}$ |
| 95 | $C_3H_7COO$ | — | — | Ph | Gp1 | — | M1 | E | H | $C_8H_{17}$ |
| 96 | $C_4H_9$ | — | — | Ph | Id1 | — | M1 | E | H | $C_8H_{17}$ |
| 97 | $C_{12}H_{25}$ | — | — | Ph | Io1 | Cb | M1 | E | H | $C_6H_{13}$ |
| 98 | $C_{10}H_{21}$ | — | — | Ph | Cm1 | — | M1 | E | H | $C_8H_{17}$ |
| 99 | $C_6H_{13}$ | — | — | Ph | Ph | — | M1 | E | H | $C_8H_{17}$ |
| 100 | $C_4H_9$ | Ph | $OCH_2$ | Ph | Py1 | — | M1 | E | H | $C_{12}H_{25}$ |
| 101 | $C_4H_9$ | Ph2CN | — | Ph | Pr1 | — | M1 | E | H | $C_{10}H_{21}$ |
| 102 | $C_5H_{11}$ | Ph | $CH_2O$ | Ph3F | Tz1 | Cb | M1 | E | H | $C_6H_{13}$ |
| 103 | $C_6H_{13}$ | Ph | — | Ph | Tn | — | M1 | E | H | $C_8H_{17}$ |
| 104 | $C_7H_{15}$ | Tn | — | Ph | Py1 | — | M1 | E | H | $C_8H_{17}$ |
| 105 | $C_{10}H_{21}$ | Ph | — | Ph | Cy1 | — | M1 | E | H | $C_5H_{11}$ |

In Table A, the respective abbreviations (symbols) mean the following groups, respectively.

Ph: 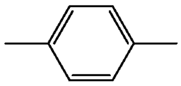

Ph2F: 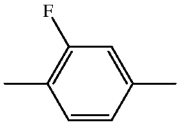

Ph3F: 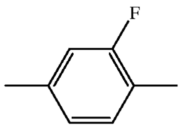

Ph23F: 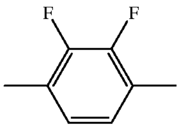

P2Cl: 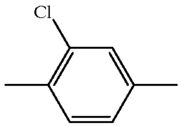

P3Br: 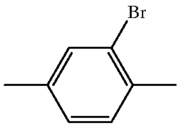

-continued

P3TF: 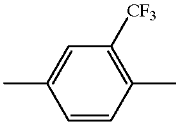

Ph2M: 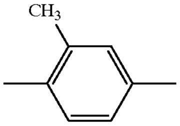

Ph2CN: 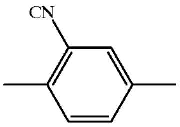

Pr1: 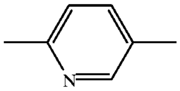

Pr2: 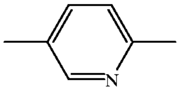

Cy: 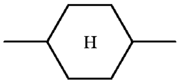

Py1: 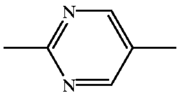

Py2: 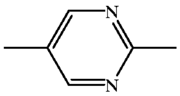

-continued
Pa: 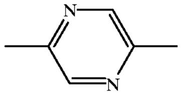
Pd: 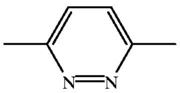
Dt2: 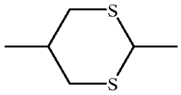
Tn: 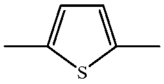
Tz1: 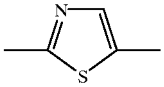
Tz2: 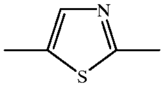
Td: 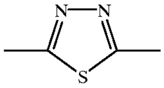
Dx2: 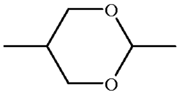
Boa2: 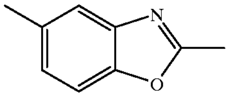
Bob2: 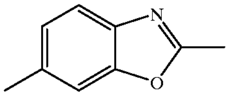
Bta2: 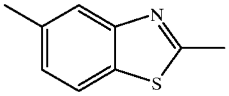
Btb2: 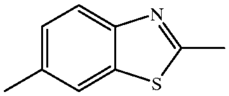
Np: 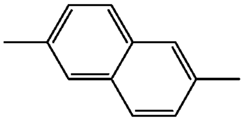
Ep1: 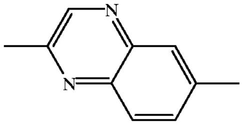
-continued
Ep2: 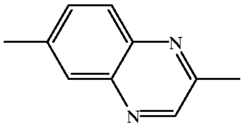
Gp1: 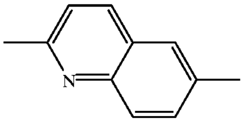
Gp2: 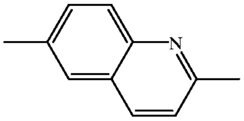
Id1: 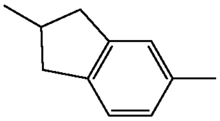
Io1: 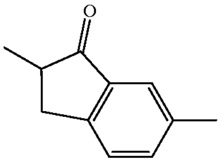
Cm1: 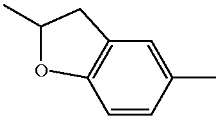
Ha2: 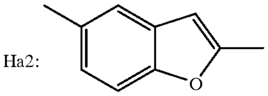
Hb2: 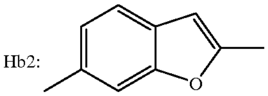
Ml: $-CH_2-$ ,
Cb: 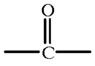 , Σ: 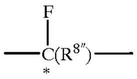 , My: $-CH_3$
TABLE B
for Compounds Nos. B-1 to B-105
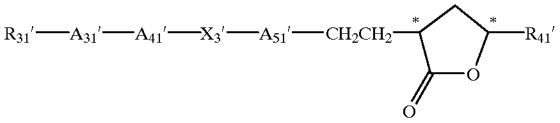
| No. | $R_{31}'$ | $A_{31}'$ | $A_{41}'$ | $X_3'$ | $A_{51}'$ | L | $R_{41}'$ |
|---|---|---|---|---|---|---|---|
| 1 | $C_6H_{13}$ | — | — | — | Ph | L | $C_8H_{17}$ |
| 2 | $C_8H_{17}$ O | — | — | — | Ph | L | $C_{18}H_{37}$ |
| 3 | $C_5H_{11}O$ | — | — | — | Ph2F | L | $C_6H_{13}$ |
| 4 | $CH_3O$ | — | Ph | — | Ph | L | $C_6H_{13}$ |
| 5 | $C_6H_{13}$*$CHF(CH_2)_2O$ | — | Ph | — | Ph | L | $C_6H_{13}$ |
| 6 | $C_7H_{15}O$ | — | Ph | — | Ph23F | L | $C_6H_{13}$ |
| 7 | $C_6H_{13}$ | — | Ph | $-OCH_2-$ | Ph | L | $C_9H_{19}$ |
| 8 | $C_6F_{13}CH_2O$ | — | Ph | $-C \equiv C-$ | Ph | L | $C_5H_{11}$ |
| 9 | $C_8H_{17}O$ | — | Ph | $-COO-$ | Ph | L | $C_6H_{13}$ |

TABLE B-continued for Compounds Nos. B-1 to B-105

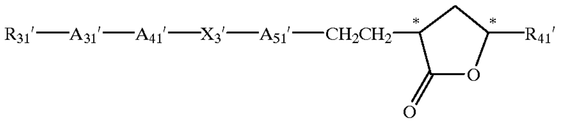

| No. | $R_{31}'$ | $A_{31}'$ | $A_{41}'$ | $X_3'$ | $A_{51}'$ | L | $R_{41}'$ |
|---|---|---|---|---|---|---|---|
| 10 | $C_8H_{17}$ | — | Pr1 | — | Ph | L | $C_8H_{17}$ |
| 11 | $C_{10}H_{21}$ | — | Pr2 | — | Ph | L | $C_4H_9$ |
| 12 | $C_{11}H_{23}$ | — | Pr2 | — | Ph | L | $C_6H_{13}$ |
| 13 | $C_{12}H_{25}$ | — | Pr2 | —COO— | Ph | L | $C_8H_{17}$ |
| 14 | $C_4H_9O$ | — | Py1 | — | Ph | L | $C_{10}H_{21}$ |
| 15 | $C_{13}H_{27}$ | — | Py2 | — | Ph | L | $C_5H_{11}$ |
| 16 | $C_6H_{13}O$ | — | Py2 | — | Ph | L | $C_8H_{17}$ |
| 17 | $C_6H_{13}$*$CHFCH_2O$ | — | Py2 | — | Ph | L | $C_9H_{19}$ |
| 18 | $C_5H_{11}O$ | — | Py2 | — | Ph23F | L | $C_4H_9$ |
| 19 | $C_{10}H_{21}$ | — | Py2 | — | Ph | L | $C_6H_{13}$ |
| 20 | $C_8H_{17}$ | — | Py2 | — | Ph3F | L | $C_7H_{15}$ |
| 21 | $C_6H_{13}$ | — | Cy | — | Ph | L | $C_4H_8OC_4H_8$ |
| 22 | $C_7H_{15}OCO$ | — | Cy | — | Ph | L | $C_{14}H_{29}$ |
| 23 | $C_6H_{13}$ | — | Cy | —CH=CH— | Ph | L | $C_{10}H_{21}$ |
| 24 | $C_3H_7$ | — | Cy | —COO— | Ph | L | $C_6H_{13}$ |
| 25 | $C_5H_{11}$ | — | Pa | — | Ph | L | $C_8H_{17}$ |
| 26 | $C_{10}H_{21}$ | — | Pd | — | Ph | L | $C_6H_{13}$ |
| 27 | $C_6H_{13}$ | — | Dt2 | — | Ph | L | $(CH_2)_7CH{=}CH_2$ |
| 28 | $C_8H_{17}$ | — | Tn | — | Ph | L | $C_9H_{19}$ |
| 30 | $C_5H_{11}$ | — | Tz1 | — | Ph | L | $C_8H_{17}$ |
| 31 | $C_9H_{19}O$ | — | Tz2 | — | Ph | L | $C_5H_{11}$ |
| 32 | $C_2H_5$ | — | Td | — | Ph | L | $C_8H_{17}$ |
| 33 | $C_{10}H_{21}$ | — | Dx2 | — | Ph | L | $C_7H_{15}$ |
| 34 | $C_6H_{13}$ | — | Boa2 | — | Ph | L | $C_{10}H_{21}$ |
| 35 | $C_7H_{15}$ | — | Bob2 | — | Ph | L | $C_6H_{13}$ |
| 36 | $C_{16}H_{33}O$ | — | Bta2 | — | Ph | L | $C_6H_{13}$ |
| 37 | $C_6H_{13}$ | — | Btb2 | — | Ph | L | $C_{14}H_{29}$ |
| 38 | $C_5H_{11}$ | — | Np | —COO— | Ph | L | $C_7H_{15}$ |
| 39 | $C_8H_{17}$*$CFHCH_2O$ | — | Ep1 | — | Ph | L | $C_{10}H_{21}$ |
| 40 | $C_4H_9$ | — | Ep2 | — | Ph | L | $C_6H_{13}$ |
| 41 | $C_6H_{13}$ | — | Gp1 | — | Ph | L | $C_{12}H_{25}$ |
| 42 | $C_7H_{15}$ | — | Gp2 | — | Ph | L | $C_6H_{13}$ |
| 43 | $C_6H_{13}$ | — | Cm1 | — | Ph | L | $C_8H_{17}$ |
| 44 | $C_8H_{17}$ | — | Io1 | — | Ph | L | $C_6H_{13}$ |
| 45 | $C_{20}H_{41}$ | — | Id1 | —COO— | Ph | L | $C_4H_9$ |
| 46 | $C_{11}H_{23}$ | — | Id1 | — | Ph | L | $C_8H_{17}$ |
| 47 | $C_8H_{17}$ | — | Id1 | — | Ph | L | $C_8H_{17}$ |
| 48 | $C_5H_{11}$ | — | Id1 | — | Ph2F | L | $C_6H_{13}$ |
| 49 | $C_6H_{13}$ | — | Tn | — | Ph | L | $C_7H_{15}$ |
| 50 | $C_4H_9O$ | — | Tz2 | — | Ph | L | $C_9H_{19}$ |
| 51 | $C_{12}H_{25}$ | — | Btb2 | — | Ph | L | $C_6H_{13}$ |
| 52 | $C_6H_{13}O$ | — | Btb2 | — | Ph | L | $C_9H_{19}$ |
| 53 | $CH_2{=}CH(CH_2)_3O$ | — | Ep2 | — | Ph | L | $C_6H_{13}$ |
| 54 | $C_9H_{19}$ | — | Gp2 | — | Ph | L | $C_5H_{11}$ |
| 55 | $C_5H_{11}O$ | — | Np | — | Ph | L | $C_{10}H_{21}$ |
| 56 | $C_6H_{13}$ | Ph | Ph | — | Ph | L | $C_3H_7$ |
| 57 | F | Pr2 | Ph | — | Ph | L | $C_6H_{13}$ |
| 58 | $C_3H_7$ | Py2 | Ph | — | Ph | L | $C_8H_{17}$ |
| 59 | $C_5H_{11}$ | — | Ha2 | — | Ph | L | $C_{11}H_{23}$ |
| 60 | $C_6H_{13}$ | Ph | Pr2 | — | Ph | L | $C_6H_{13}$ |
| 61 | $C_9H_{19}$ | Ph | Pr1 | — | Ph | L | $C_5H_{11}$ |
| 62 | $C_{13}H_{27}$ | Ph | Cy | — | Ph3Br | L | $C_7H_{15}$ |
| 63 | $C_{10}H_{21}O$ | Ph | Py1 | — | Ph | L | $C_6H_{13}$ |
| 64 | $C_7H_{15}$ | Ph | Py2 | — | Ph | L | $C_{10}H_{21}$ |
| 65 | $C_4H_9$ | Ph3TF | Pa | — | Ph | L | $(CH_2)_3CH(CH_3)_2$ |
| 66 | H | — | Hb2 | — | Ph | L | $C_6H_{17}$ |
| 67 | $C_8H_{17}$ | Ph | Tn | — | Ph | L | $C_5H_{11}$ |
| 68 | $C_2H_5$ | Ph | Tz1 | — | Ph2M | L | $C_3H_7$ |
| 69 | $C_6H_{13}$ | Ph | Tz2 | — | Ph | L | $C_6H_{13}$ |
| 70 | $C_{10}H_{21}$ | Ph | Td | — | Ph | L | $C_7H_{15}$ |
| 71 | $C_{10}H_{21}$ | — | Ph | — | Py1 | L | $C_6H_{13}$ |
| 72 | $C_6H_{13}$ | — | Ph | — | Py1 | L | $C_6H_{13}$ |
| 73 | $C_6H_{13}OCO$ | — | Ph | — | Py1 | L | $C_5H_{11}$ |
| 74 | $C_7H_{15}$ | — | — | — | Pr2 | L | $C_{10}H_{21}$ |
| 75 | $C_9H_{19}$ | — | Ph | — | Pr2 | L | $C_8H_{17}$ |
| 76 | $C_3H_7$ | — | Ph | — | Pr2 | L | $C_6H_{13}$ |

TABLE B-continued for Compounds Nos. B-1 to B-105

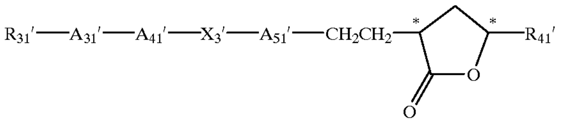

| No. | $R_{31}'$ | $A_{31}'$ | $A_{41}'$ | $X_3'$ | $A_{51}'$ | L | $R_{41}'$ |
|---|---|---|---|---|---|---|---|
| 77 | $C_5H_{11}O$ | — | — | — | Cy | L | $C_4H_9$ |
| 78 | $C_4H_9$ | — | Ph | —$CH_2O$— | Cy | L | $C_7H_{15}$ |
| 79 | $C_{12}H_{25}$ | — | Ph | — | Cy | L | $C_3H_7$ |
| 80 | $C_6H_{13}C{\equiv}C$ | — | Ph | — | Pa | L | $C_6H_{13}$ |
| 81 | $C_8H_{17}O$ | — | Ph | — | Pd | L | $C_5H_{11}$ |
| 82 | $C_3H_7$ | — | Ph2Cl | — | Tn | L | $C_{10}H_{21}$ |
| 83 | $C_4H_9$ | — | Ph | — | Tn | L | $C_7H_{15}$ |
| 84 | $C_8H_{17}$ | — | Ph | — | Tz1 | L | $C_{12}H_{25}$ |
| 85 | $C_4H_9OCH(CH_3)COO$ | — | Ph | — | Tz1 | L | $C_5H_{11}$ |
| 86 | $C_6H_{13}$ | — | Ph2F | — | Td | L | $(CH_2)_3CH(CH_3)C_6H_{13}$ |
| 87 | $C_5H_{11}$ | — | — | — | Np | L | $C_9H_{19}$ |
| 88 | $C_8H_{17}OCH_2CH_2$ | — | Ph | — | Np | L | $C_5H_{11}$ |
| 89 | $C_{11}H_{23}$ | — | Ph | — | Np | L | $C_6H_{13}$ |
| 90 | $C_5H_{11}$ | — | — | — | Ep1 | L | $C_4H_9$ |
| 91 | $CH_3$ | — | Ph | — | Ep1 | L | $C_7H_{15}$ |
| 92 | $C_6H_{13}$ | — | Ph | — | Ep1 | L | $C_6H_{13}$ |
| 93 | $C_9H_{19}O$ | — | — | — | Gp1 | L | $C_8H_{17}$ |
| 94 | $C_8H_{17}$ | — | Ph | — | Gp1 | L | $C_{10}H_{21}$ |
| 95 | $C_3H_7COO$ | — | Ph | — | Gp1 | L | $C_{11}H_{23}$ |
| 96 | $C_4H_9$ | — | Ph | — | Id1 | L | $C_7H_{15}$ |
| 97 | $C_{12}H_{25}$ | — | Ph | — | Io1 | L | $C_6H_{13}$ |
| 98 | $C_{10}H_{21}$ | — | Ph | — | Cm1 | L | $C_5H_{11}$ |
| 99 | $C_6H_{13}$ | — | Ph | — | Ph | L | $(CH_2)_4C_3F_7$ |
| 100 | $C_3H_7$ | Ph | Ph | — | Py1 | L | $C_7H_{15}$ |
| 101 | $C_4H_9$ | Ph2CN | Ph | — | Pr1 | L | $C_4H_9$ |
| 102 | $C_5H_{11}$ | Ph | Ph3F | — | Tz1 | L | $C_3H_7$ |
| 103 | CN | Ph | Ph | — | Tn | L | $CH_3$ |
| 104 | $C_7H_{15}$ | Tn | Ph | — | Py1 | L | $C_8H_{17}$ |
| 105 | $C_{10}H_{21}$ | Ph | Ph | — | Cy | L | $C_6H_{13}$ |

In Table B, the respective abbreviations mean the following groups, respectively.

Ph: 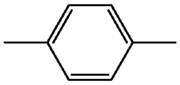

Ph2F: 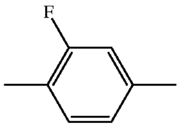

Ph3F: 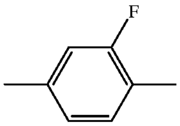

Ph3Br: 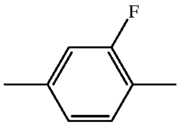

Ph23F: 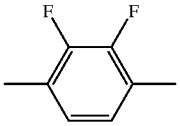

Ph2Cl: 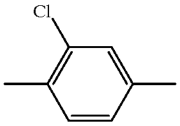

Ph3Br: 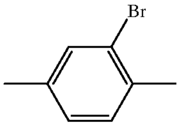

Ph3TF: 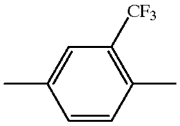

-continued

Ph2M: 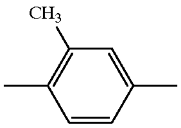

Ph2CN: 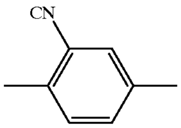

Pr1: 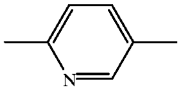

Pr2: 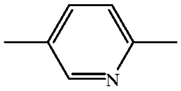

Cy: 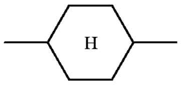

Py1: 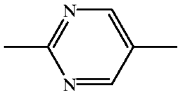

Py2: 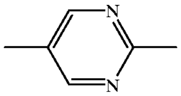

Pa: 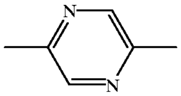

Pd: 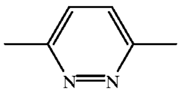

Dt2: 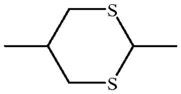

Tn: 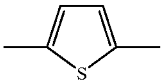

Tz1: 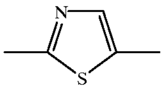

-continued
Tz2: 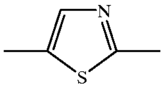 Td: 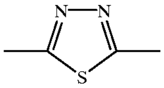
Dx2: 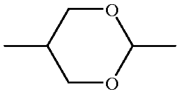 Boa2: 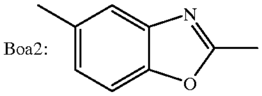
Bob2: 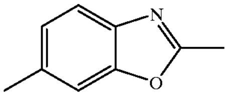
Bta2: 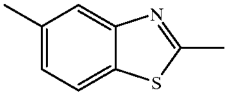
Btb2: 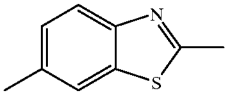
Np: 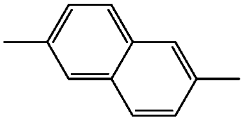
Ep1: 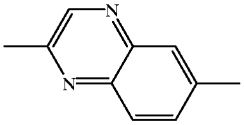
Ep2: 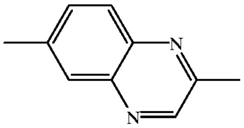
-continued
Gp1: 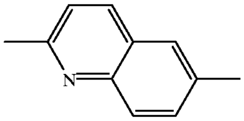
Gp2: 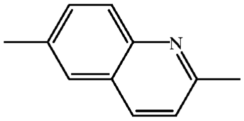
Id1: 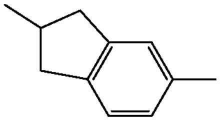 Io1: 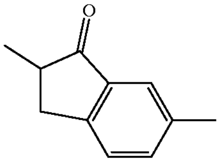
Cm1: 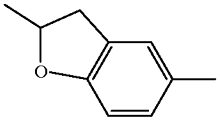 Ha2: 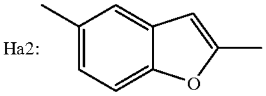
Hb2: 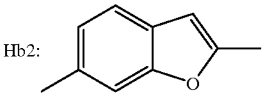 L: 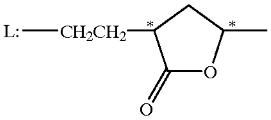
C-1
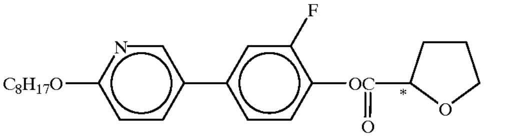
C-2
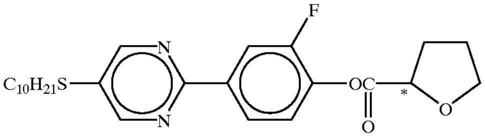
C-3
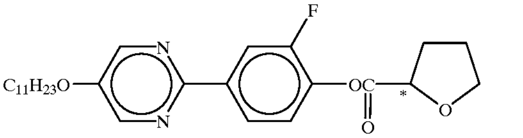
C-4
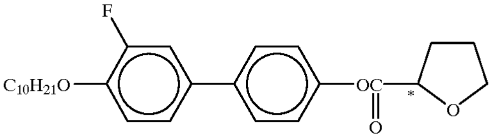
C-5
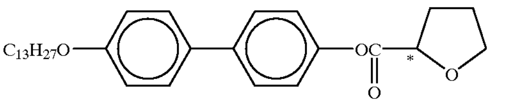
C-6
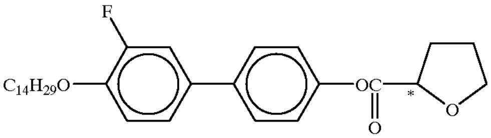
C-7
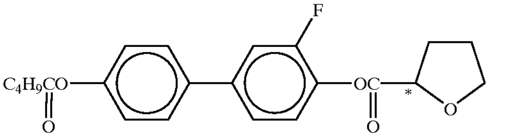
C-8
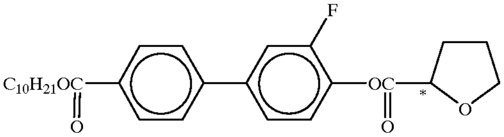

-continued
C-9
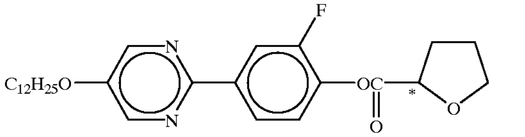
C-10
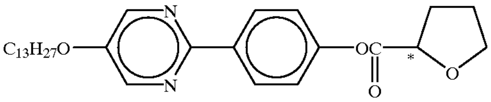
C-11
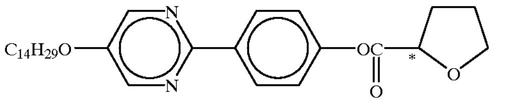
C-12
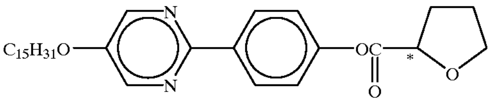
C-13
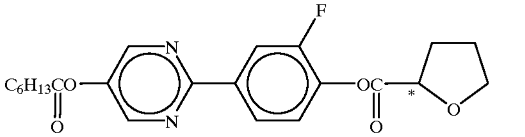
C-14
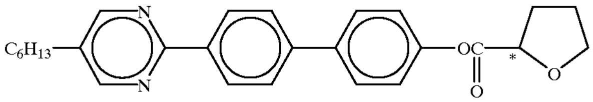
C-15
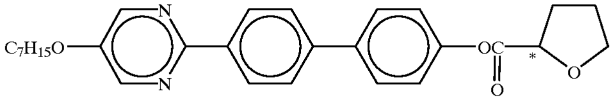
C-16
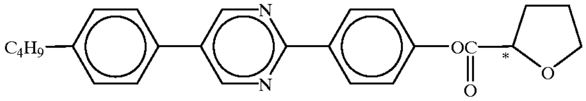
C-17
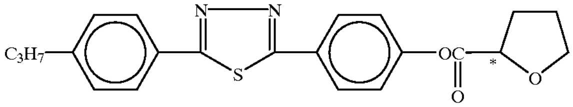
C-18
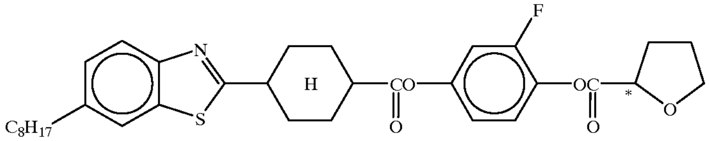
C-19
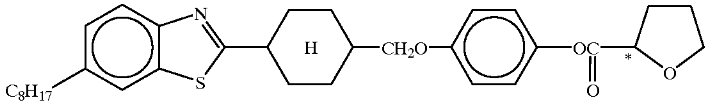
C-20
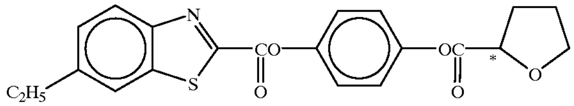

-continued
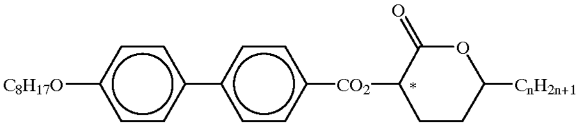
D-1: n = 6, 2R, 5R
D-2: n = 6, 2S, 5R
D-3: n = 4, 2R, 5R
D-4: n = 4, 2S, 5R
D-5: n = 3, 2R, 5R
D-6: n = 2, 2S, 5R
D-7: n = 2, 2R, 5R
D-8: n = 1, 2S, 5R
D-9: n = 1, 2R, 5R
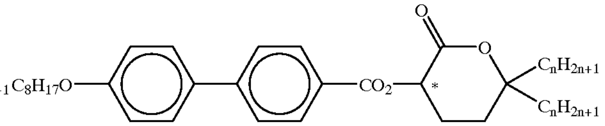
D-10: n = 1
D-11: n = 2
D-12: n = 3
D-13: n = 4
D-14: n = 5
D-15: n = 10
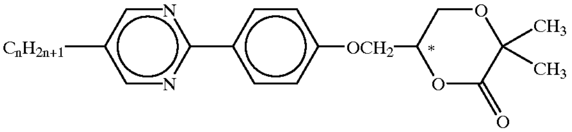
D-16: n = 8
D-17: n = 10
E-1: (2,5-cis)
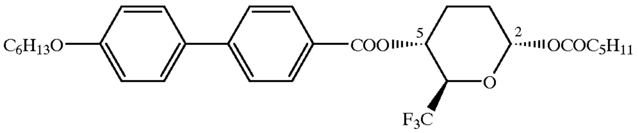
E-2: (2,5-cis)
E-3: (2,5-trans)
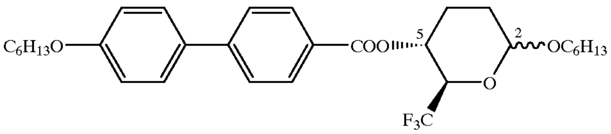
E-4: (2,5-cis)
E-5: (2,5-trans)
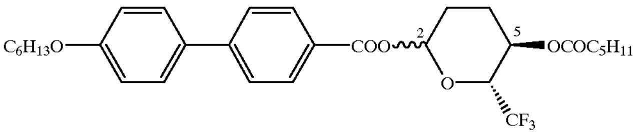
E-6: (2,5-cis)
E-7: (2,5-trans)
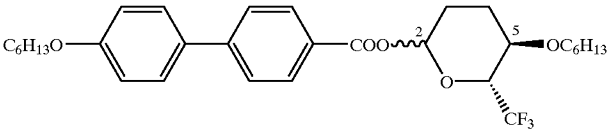
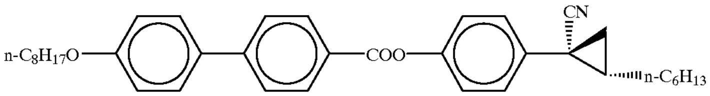
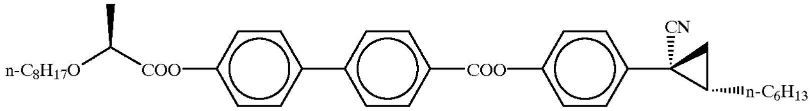
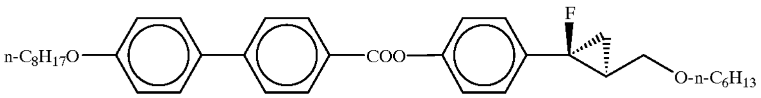
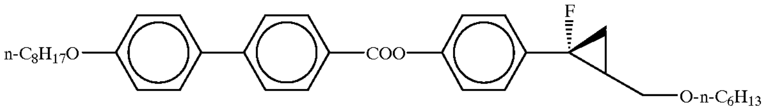

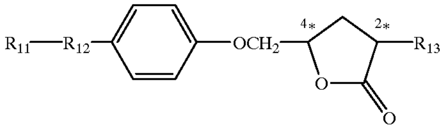

| $R_{11}$ | $R_{12}$ | $R_{13}$ | Configuration |
|---|---|---|---|
| 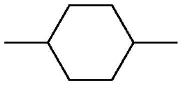 | $C_5H_{11}$ | $C_4H_9$ | 2S, 4S (cis) |
| 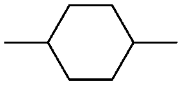 | $C_5H_{11}$ | $C_4H_9$ | 2R, 4S (trans) |
|  | $C_8H_{17}$ | $C_3H_7$ | 2S, 4S (cis) |
| 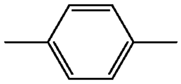 | $C_8H_{17}$ | $C_3H_7$ | 2R, 4S (trans) |
| 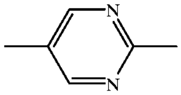 | $C_8H_{17}O$ | $C_4H_9$ | 2S, 4S (cis) |
| 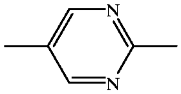 | $C_8H_{17}O$ | $C_4H_9$ | 2R, 4S (trans) |

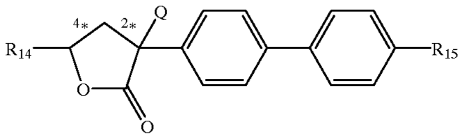

| $R_{14}$ | $R_{15}$ | Q | Configuration |
|---|---|---|---|
| $C_5H_{11}$ | $C_7H_{15}$ | H | 2R, 4S (cis) |
| $C_5H_{11}$ | $C_7H_{15}$ | H | 2S, 4S (trans) |
| $C_7H_{15}$ | $OC_9H_{19}$ | H | 2R, 4S (cis) |
| $C_7H_{15}$ | $OC_9H_{19}$ | H | 2S, 4S (trans) |
| $C_6H_{13}OCH_2$ | $C_7H_{15}$ | H | 2R, 4S (cis) |
| $C_6H_{13}OCH_2$ | $C_7H_{15}$ | H | 2S, 4S (trans) |
| $C_6H_{13}OCH_2$ | $OC_9H_{19}$ | H | 2R, 4S (cis) |
| $C_6H_{13}OCH_2$ | $OC_9H_{19}$ | H | 2S, 4S (trans) |
| $C_7H_{15}$ | $OC_9H_{19}$ | $CH_3$ | 2R, 4S (cis) |
| $C_7H_{15}$ | $OC_9H_{19}$ | $CH_3$ | 2S, 4S (trans) |

F-1

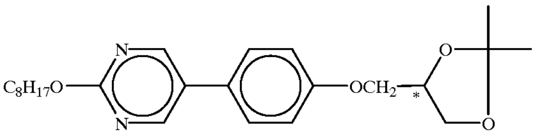

-continued

F-2

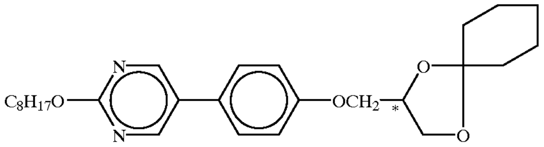

F-3

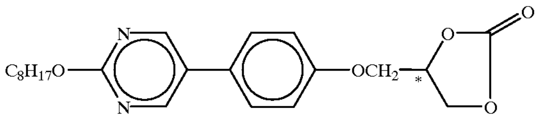

F-4

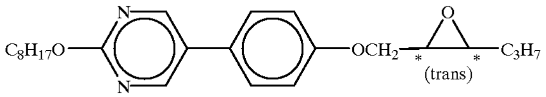

F-5

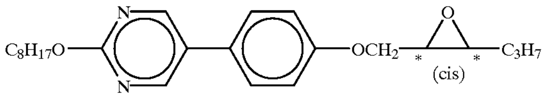

F-6

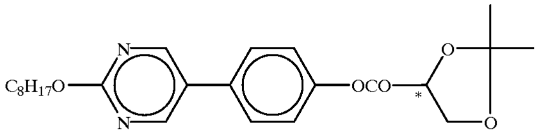

F-7

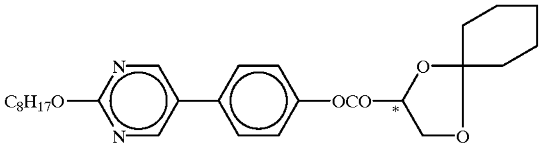

F-8

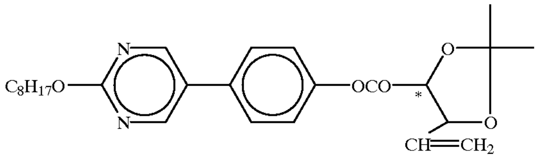

F-9

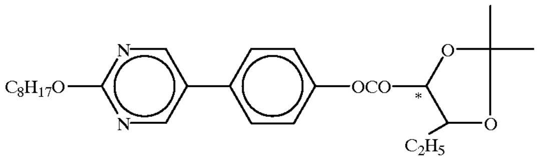

F-10

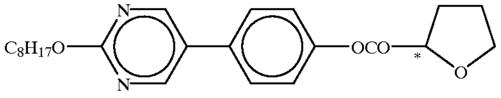

F-11

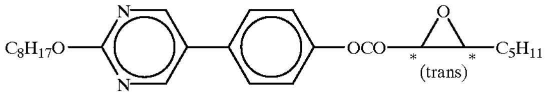

-continued

F-12

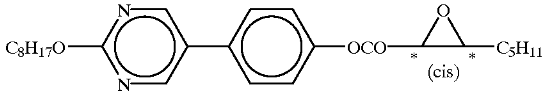

The (chiral smectic) liquid crystal composition used in the invention may further contain additives such as an antioxidant, an ultraviolet ray-absorbing agent, dyes and pigments.

The liquid crystal device according to the present invention is used as a display element (medium), for various liquid crystal apparatus, one embodiment of which is described below.

Figure 2:
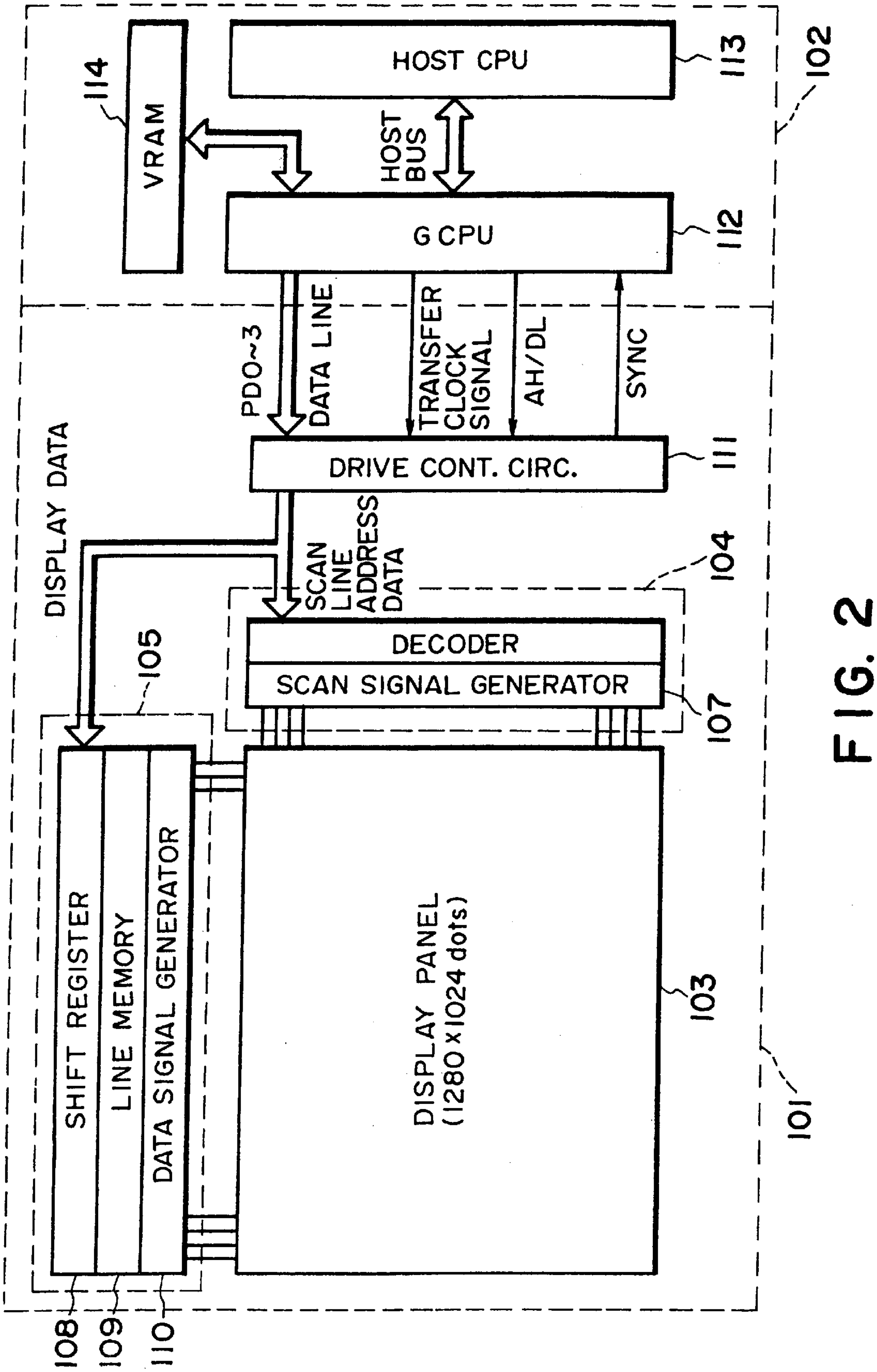
FIG. 2 is a block diagram showing a display apparatus comprising a liquid crystal device of the present invention and a graphic controller.
Figure 3:
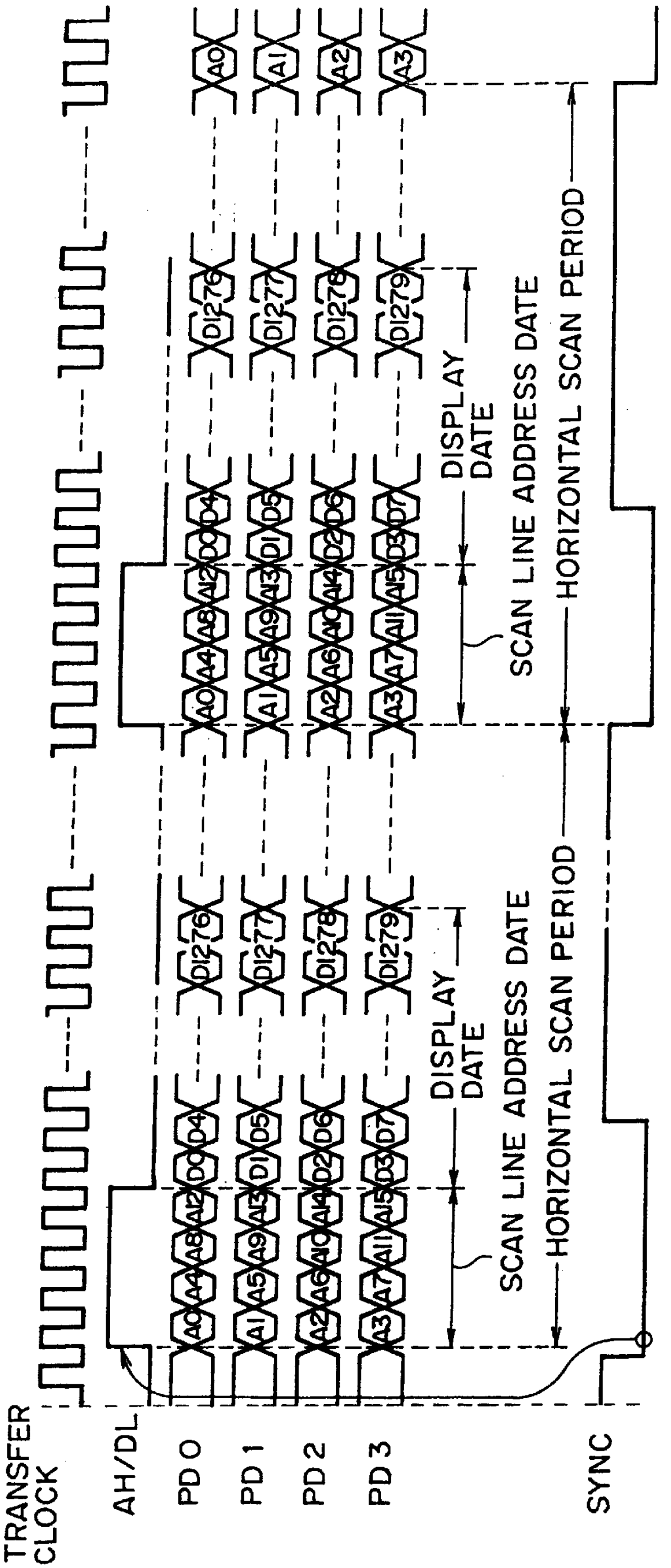
FIG. 3 is a time chart of image data communication showing time correlation between signal transfer and driving with respect to a liquid crystal display apparatus and a graphic controller.

Based on an arrangement appearing hereinbelow and data format comprising image data accompanied with scanning line address data and by adopting communication synchronization using a SYNC signal as shown in FIGS. 2 and 3, there is provided a liquid crystal display apparatus of the present invention which uses the liquid crystal device according to the present invention as a display panel portion.

Referring to FIG. 2, a chiral smectic liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means. The graphic controller 102 principally comprises a CPU (central processing unit, hereinafter referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally performed by the graphic controller 102. A light source (not shown) is disposed at the back of the display panel 103.

The liquid crystal display apparatus of the present invention employs the above-described liquid crystal device showing a good switching characteristic as a display panel (medium), so that the display apparatus exhibits excellent drive characteristics and reliability and provides high-definition and large-area display images at high speed.

The liquid crystal device using the chiral smectic liquid crystal composition according to the present invention may be driven by driving methods as disclosed in, e.g., JP-A 59-193426, JP-A 59-193427, JP-A 60-156046 and JP-A 60-156047.

Figure 5:
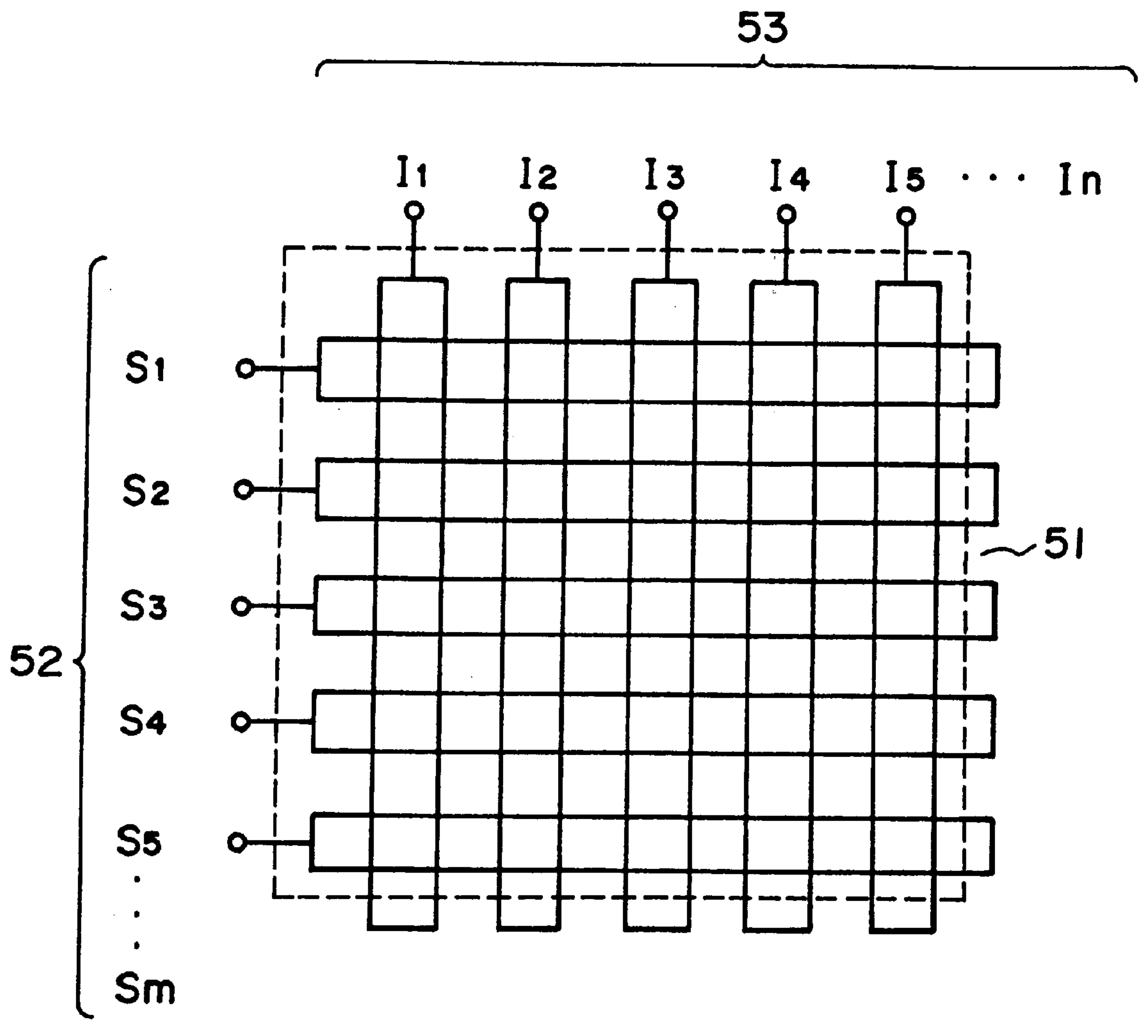
FIG. 5 is a plan view of an electrode matrix.
Figure 6A:
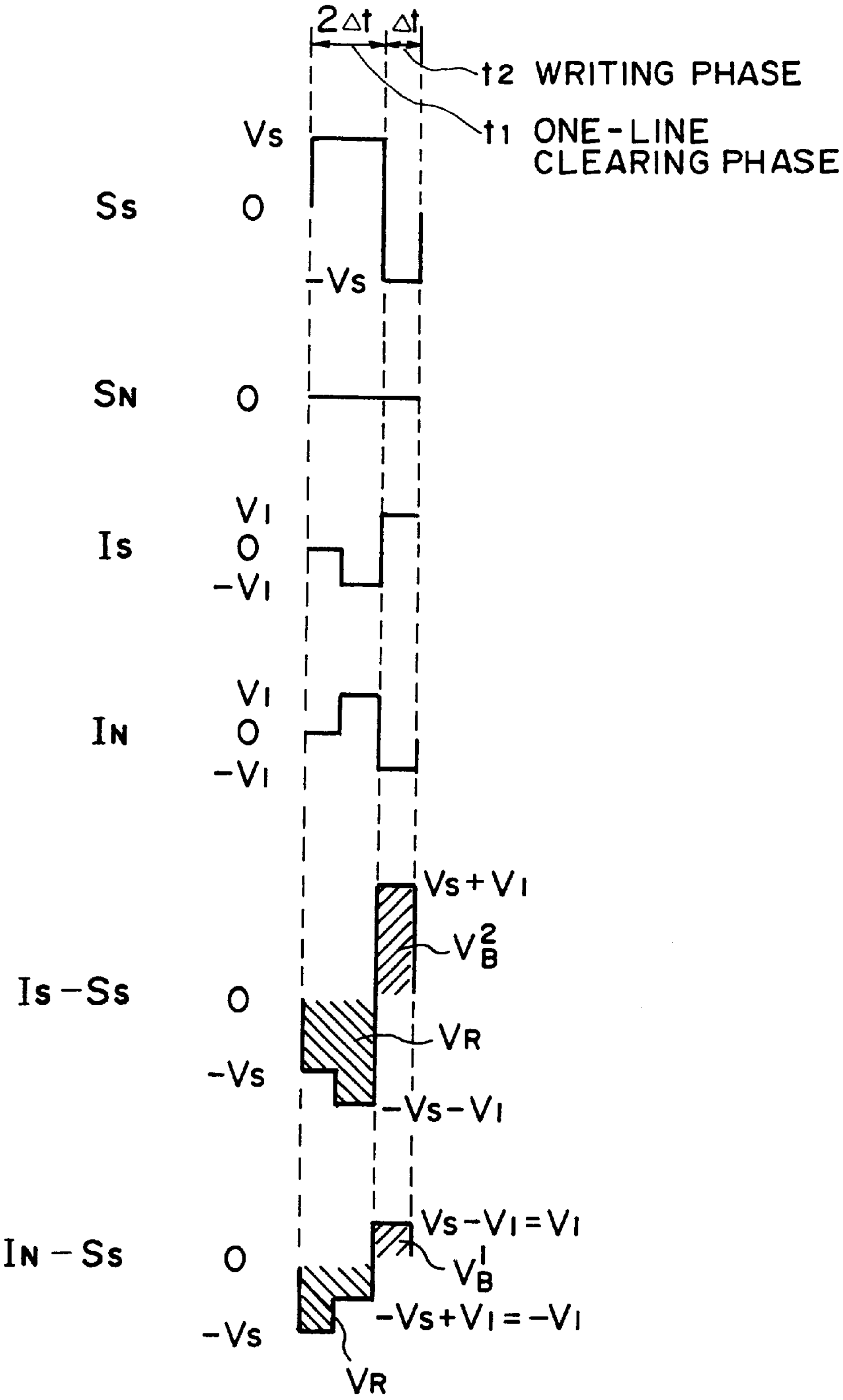
FIG. 6A shows an embodiment of unit driving waveforms and FIG. 6B is time-serial waveforms comprising a succession of such unit waveforms.
Figure 6B:
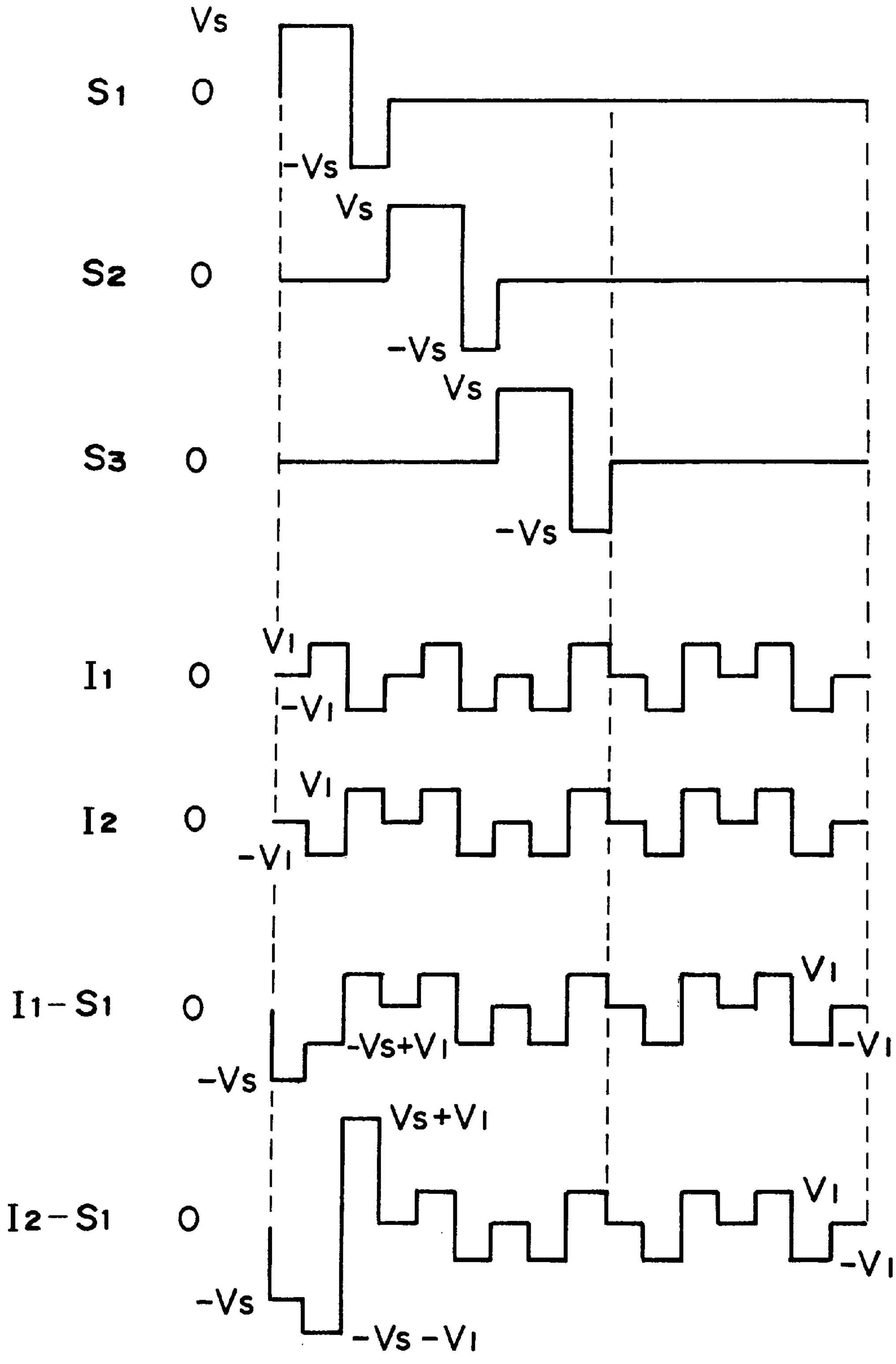

FIGS. 6A and 6B are waveform diagrams showing an example set of driving waveforms used in such a driving method. FIG. 5 is a plan view showing an electrode matrix used in a chiral smectic liquid crystal panel 51 of a simple matrix-type. The liquid crystal panel 51 shown in FIG. 5 includes scanning electrodes 52 ($S_1$, $S_2$, $S_3$, . . . $S_m$) and data electrodes 53 ($I_1$, $I_2$, $I_3$, . . . $I_n$) intersecting each other so as to constitute a pixel at each intersection together with a chiral smectic liquid crystal disposed between the scanning electrodes 52 and data electrodes 53.

Figure 4:
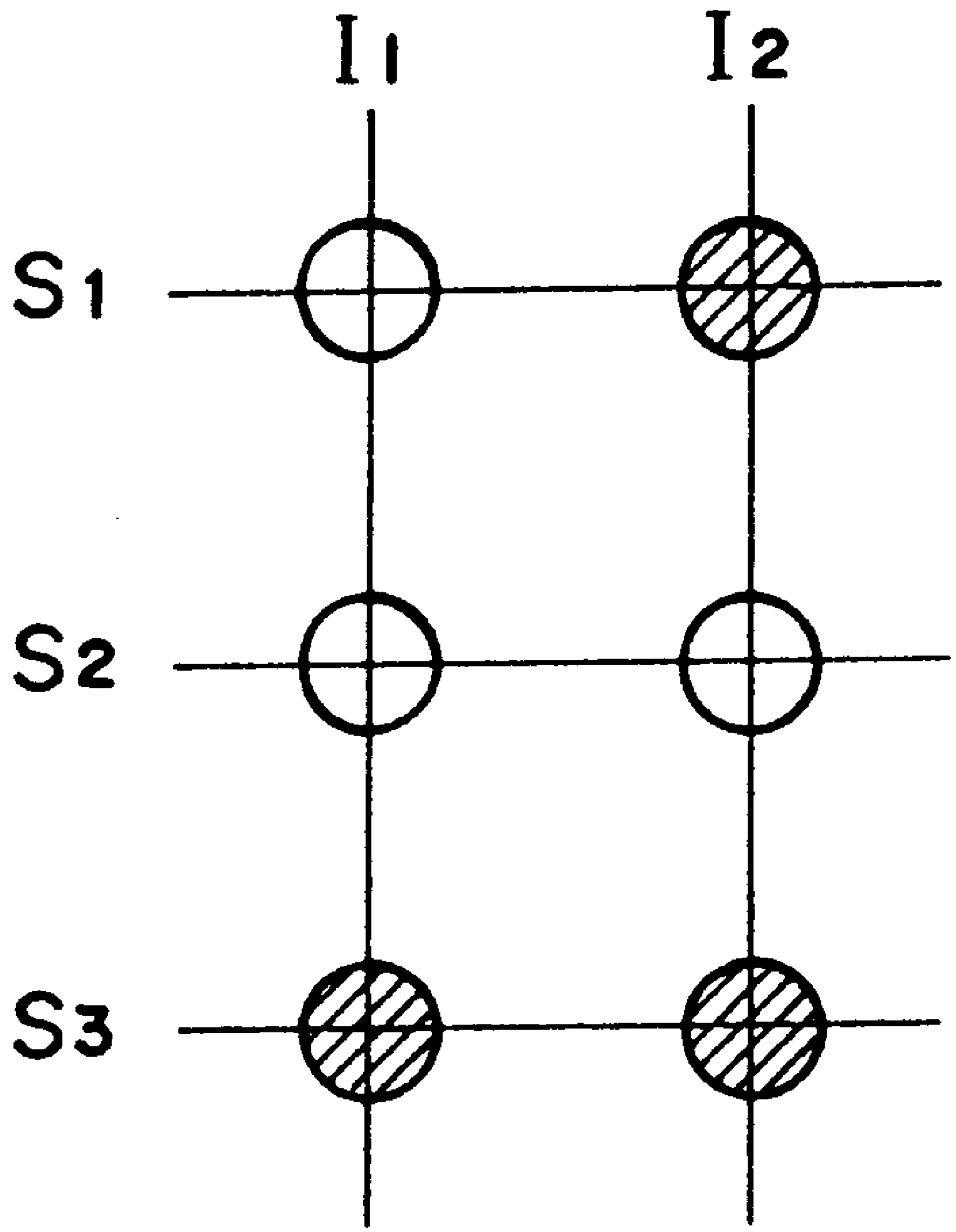
FIG. 4 is an illustration of a display pattern obtained by an actual drive using the time-serial waveforms shown in FIG. 6B.

Referring to FIG. 6A, at $S_S$ is shown a selection scanning signal waveform applied to a selected scanning line, at $S_N$ is shown a non-selection scanning signal waveform applied to a non-selected scanning line, at $I_S$ is shown a selection data signal waveform (providing a black display state) applied to a selected data line, and at $I_N$ is shown a non-selection data signal waveform applied to a non-selected data line. Further, at $I_S$–$S_S$ and $I_N$–$S_S$ in the figure are shown voltage waveforms applied to pixels on a selected scanning line, whereby a pixel supplied with the voltage $I_S$–$S_S$ assumes a black display state and a pixel supplied with the voltage $I_N$–$S_S$ assumes a white display state. FIG. 6B shows a time-serial waveform used for providing a display state as shown in FIG. 4.

In the driving embodiment shown in FIGS. 6A and 6B, a minimum duration (application time) $\Delta t$ of a single polarity voltage applied to a pixel on a selected scanning line corresponds to the period of a writing phase $t_2$, and the period of a one-line clearing phase $t_1$ is set to $2\Delta t$.

The parameters $V_S$, $V_I$ and $\Delta t$ in the driving waveforms shown in FIGS. 6A and 6B are determined depending on switching characteristics of a liquid crystal material used.

Figure 7:
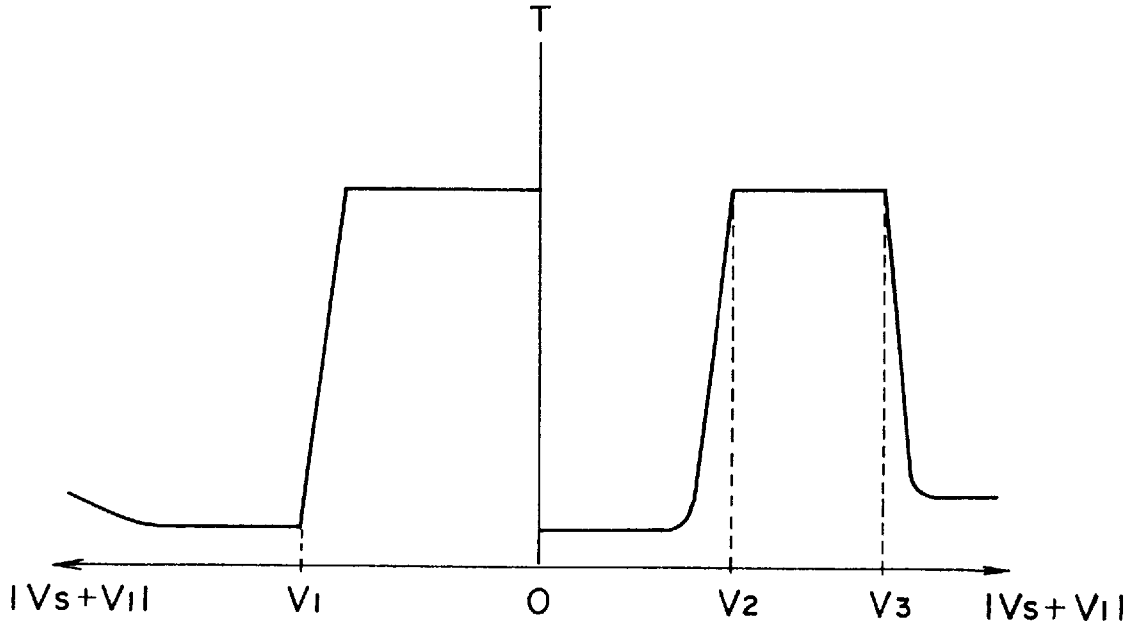
FIG. 7 is a V-T characteristic chart showing a change in transmittance under application of different drive voltages.

FIG. 7 shows a V-T characteristic, i.e., a change in transmittance T when a driving voltage denoted by $(V_S+V_I)$ is changed while a bias ratio as mentioned hereinbelow is kept constant. In this embodiment, the parameters are fixed at constant values of $\Delta t$=50 μs and a bias ratio $V_I/(V_I+V_S)$=1/3. On the right side of FIG. 7 is shown a result when the voltage $(I_N–S_S)$ shown in FIG. 6A is applied to a pixel concerned, and on the left side of FIG. 8 is shown a result when the voltage $(I_S–S_S)$ is applied to a pixel concerned, respectively while increasing the voltage $(V_S+V_I)$. On both sides of the ordinate, the absolute value of the voltage $(V_S+V_I)$ is separately indicated. At $(I_N–S_S)$ and $(I_S–S_S)$, a previous (display) state is cleared by applying a voltage $V_R$ and a subsequent (display) state is determined by voltages $V_B^1$ and $V_B^2$, respectively. Referring to FIG. 8, a relationship of $V_2<V_1<V_3$ holds. At this time, $(V_3-V_1)/(V_3+V_1)$ is referred to as a voltage margin parameter M2 (V) as to a voltage range allowing a matrix drive. The voltage $V_1$ may be referred to as a threshold voltage in actual drive and the voltage $V_3$ may be referred to as a crosstalk voltage. More specifically, as shown in FIG. 6A, a voltage $V_1$ denotes a voltage value causing switching by applying a voltage signal $V_B^2$ and a voltage $V_3$ denotes a voltage value causing switching by applying a voltage signal $V_B^1$. Further, a voltage $V_2$ denotes a voltage value required for clearing the previous state by applying a voltage signal $V_R$. The crosstalk voltage $V_3$ is generally present in actual matrix drive of a ferroelectric liquid crystal device. It is of course possible to increase the value of $V_3$ by increasing the bias ratio (i.e., by causing the bias ratio to approach a unity). However, a large bias ratio corresponds to a large amplitude of a data signal and leads to an increase in flickering and a lower contrast, thus being undesirable in respect of image quality. According to our study, a bias ratio of about 1/3–1/4 was practical. On the other hand, when the bias ratio is fixed, the voltage margin parameter M2 (V) strongly depends on the switching characteristics of a liquid crystal material and the cell (device) structure, and it is needless to say that a liquid crystal device providing a large M2 (V) is very advantageous for matrix drive.

Further, it is also possible to drive the liquid crystal device by changing a voltage application time (duration) t while keeping the driving voltage $(V_I+V_S)$ so as to provide a certain (constant) value. In this case, the drive characteristic of the liquid crystal device can be evaluated in terms of a duration margin parameter (voltage application time margin parameter) M2 $(\Delta T)=(\Delta t_2-\Delta t_1)/(\Delta t_2+\Delta t_1)$ wherein $\Delta t_1$ denotes a threshold duration and $t_2$ denotes a crosstalk duration.

The upper and lower limits of application voltages or durations and a difference therebetween (driving voltage margin $\Delta V=V_3-V_1$ or duration margin $\Delta T=\Delta t_2-\Delta t_2$) by which selected pixels are written in two states of "black" and "white" and non-selected pixels can retain the written "black" and "white" states at a constant temperature as described above, vary depending on and are intrinsic to a liquid crystal material used and a cell structure employed. Further, the driving margin (voltage or duration margin) is fluctuated according to a change in environmental temperature, so that optimum driving conditions should be required of an actual display apparatus in view of a liquid crystal material used, a cell (device) structure and an environmental temperature.

Hereinbelow, the present invention will be described more specifically based on Examples. It is however to be understood that the present invention is not restricted to these Examples.

In the following examples, chiral smectic liquid crystal compositions were prepared by mixing the following mesomorphic compounds indicated proportions (shown in respective examples).

<Perfluoroalkyl-Type Mesomorphic Compound>

| Compound | Structural formula |
|---|---|
| (1) | 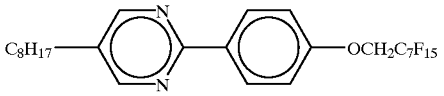 |
| (2) | 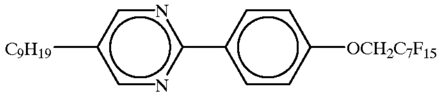 |
| (3) | 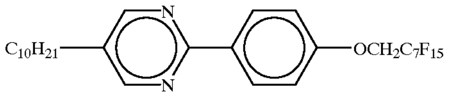 |
| (4) | 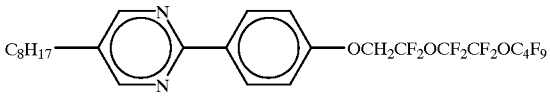 |
| (5) | 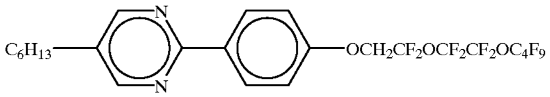 |
| (6) | 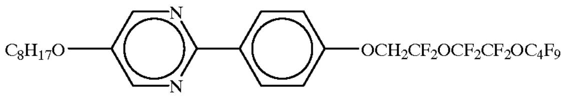 |
| (7) | 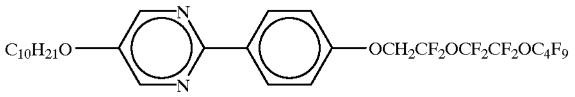 |

| Optically active compound | Structural formula |
|---|---|
| (a) | 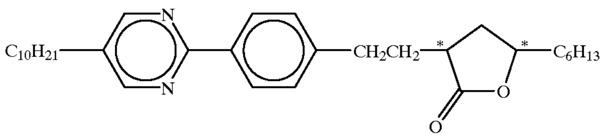 |
| (b) | 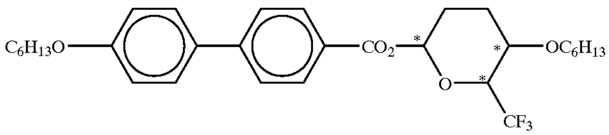 |

-continued (c)

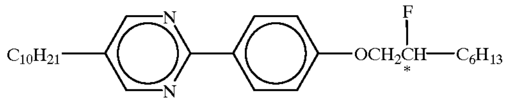

In the above compounds, compounds falling under the category of the fluorine-containing mesomorphic compound (B) and/or the compound (C) are the compounds (4)–(7).

In order to identify the compound (C) providing a tilt angle θ of at least 30 degrees at a temperature T(T=Tc−15° C., Tc: upper limit temperature of smectic C phase-providing temperature), each of the compounds (4)–(7) was subjected to measurement of tilt angle θ in the following manner.

Three liquid crystal compositions were prepared by mixing one of the compounds (4)–(7) with an optically active compound of the formula (i):

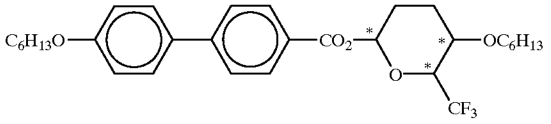

in a mixing ratio of 99:1, 98:2 and 97:3 (by weight), respectively.

Each of these compositions was injected into a spacing (about 1 μm) of a blank cell including a pair of substrates provided with ITO electrodes to prepare a liquid crystal cell (device).

Then, each of the liquid crystal compositions contained in the respective liquid crystal devices was controlled to have a temperature below its upper limit temperature of smectic C phase by 15° C.

Each of the liquid crystal device was sandwiched between right angle-cross nicol polarizers and rotated horizontally relative to the polarizers under application of an AC voltage of ±30 V to ±50 V and 1 to 100 Hz between the upper and lower substrates of the device while measuring a transmittance through the device by a photomultiplier (available from Hamamatsu Photonics K.K.) to find a first extinction position (a position providing the lowest transmittance) and a second extinction position. A tilt angle θ was measured as a half of the angle between the first and second extinction positions.

With respect to each of the compounds (4)–(7), a tilt angle θ of the compound alone was obtained from three measured data of the respective three liquid crystal compositions (optically active compound content: 1 wt. %, 2 wt. %, 3 wt. %) by extrapolation.

The thus-obtained tilt angles of the compounds (4)–(7) per se are shown in Table 1.

TABLE 1

| Compound | Tilt angle Θ (at Tc-T = 15° C.) |
|---|---|
| (4) | 24 |
| (5) | 15 |
| (6) | 30.5 |
| (7) | 35 |

Accordingly, the compounds (6) and (7) correspond to the compound (c) described above.

EXAMPLE 1

Each of three blank cells was prepared as follows.

To one of 1.1 mm-thick glass plates provided with an ITO film having a prescribed pattern, a solution of 6,6-nylon in formic acid was applied by spin coating, followed by drying and subjecting the resultant nylon film to rubbing treatment to form a 50 Å-thick alignment control layer.

To the other glass plate provided with an ITO film having a prescribed pattern, a solution of a silane coupling agent comprising octadecyltriethoxysilane was applied by spin coating, followed by hot curing to form a 20 Å-thick alignment control layer.

After silica beads (average particle size: about 2 μm) as a spacer were dispersed on the other glass plates, the two glass plates were applied to each other so that the alignment control layers constituted inner (opposite) surfaces to prepare a blank cell having a cell gap of 1.8 μm.

Chiral smectic liquid crystal compositions A to C were prepared by mixing the above-mentioned mesomorphic compounds and optically active compounds in the indicated proportions (wt. parts) shown in Table 2 below, respectively.

TABLE 2

| Compo- | Compounds (wt. parts) | | | | | | | | | |
|---|---|---|---|---|---|---|---|---|---|---|
| sition | (1) | (2) | (3) | (4) | (5) | (6) | (7) | (a) | (b) | (c) |
| A | 10 | 10 | 10 | 30 | 30 | 5 | — | 3 | 2 | — |
| B | 6 | 10 | 7 | 30 | 30 | — | 10 | — | 7 | — |
| C | 5 | 10 | 10 | 30 | 30 | 10 | — | 3 | 2 | — |

Each of the thus prepared liquid crystal compositions A to C was injected in the blank cell in isotropic liquid phase and gradually at a rate of 0.5° C./min cooled to a temperature at which chiral smectic phase was assumed, thus preparing liquid crystal devices 1-1, 1-2 and 1-3, respectively.

Each of the liquid crystal devices 1-1, 1-2 and 1-3 was evaluated with respect to the following items.

Alignment Characteristic

The liquid crystal device after cooling (at a rate of 0.5° C./min for isotropic phase) was subjected to observation of an alignment state of liquid crystal molecules at 25° C.

"Good": A random alignment region was not observed.

"Inferior": A random alignment region was observed.

Bookshelf (BS) Characteristic

A bookshelf (BS) characteristic was evaluated as a degree of a layer inclination angle (angle formed between the smectic layer and a normal to the substrate).

The layer inclination angle was measured by using a method by Clark and Lagerwall (Japanese Display '86, Sep. 30–Oct. 2, 1986, p.p. 456–458) or the method of Ohuchi et al (J.J.A.P., 27 (5) (1988), p.p. 725–728). Specifically, the measurement was performed by using a rotary cathode-type X-ray diffraction apparatus (available from MAC Science), and 80 μm-thick microsheets (glass sheet) (available from Corning Glass Works) were instead of the 1.1 mm-thick glass plates.

"Good": an inclination angle of at most 8 degrees.

"Inferior": an inclination angle of above 8 degrees.

Transmittance (T %)

The liquid crystal device was sandwiched between cross nicol polarizers. By using a light source (backlight) disposed behind the liquid crystal device, a transmittance (transmitted light quantity) $T_1$ through the device with the polarizers was measured by a photomultiplier (available from Hamamatsu Photonics K.K.). Similarly, a transmittance $T_2$ through the polarizers (not through the device per se) was measured.

A transmittance (T) was evaluated as a ratio of $T_1/T_2$ (i)

Contrast Ratio (C/R)

The liquid crystal device wa sandwiched between cross nicol polarizers arranged so as to provide one of extinction positions (where a minimum transmittance was attained) under no voltage (electric field) application. The liquid crystal device was driven at 25° C. by using a drive waveform as shown in FIGS. 6A and 6B (bias ratio=1/3.0, drive voltage ($V_S$+$V_1$)=10 volts) and a light source providing a certain light quantity source providing a certain light quantity to effect a display of "white" and "black" states while measuring a transmittance in the states to obtain a contrast ratio (C/R) between those in the "white" and "black" states.

Contrast Keeping Temperature Range (CK Range)

After measuring a contrast ratio $(C/R)_1$ at 25° C. according to the above method, the liquid crystal device was cooled to a prescribed temperature ($T_1$) at a rate of 1° C./min and left standing for 1 hour at $T_1$ and then was restored to 25° C. Thereafter, the liquid crystal device was again subjected to measurement of a contrast ratio $(C/R)_2$. When the contrast ratio $(C/R)_2$ was within ±20% of the contrast ratio $(C/R)_1$, a temperature range from $T_1$ to a phase transition temperature $T_{CA}$ (smectic C phase/smectic A phase) was evaluated as a contrast-keeping temperature range (CK range) allowing a substantially stable contrast ratio without being adversely affected by temperature decrease and temperature increase (temperature history).

The results are shown in Table 3.

TABLE 3

| Device | Composition | Alignment | BS characteristic | T (%) | C/R | CK range (° C.) |
|---|---|---|---|---|---|---|
| 1-1 | A | Good | Good | 85 | 65 | 40 |
| 1-2 | B | Good | Good | 85 | 57 | 50 |
| 1-3 | C | Good | Good | 88 | 55 | 50 |

EXAMPLE 2

Each of three blank cells was prepared as follows.

To one of 1.1 mm-thick glass plates provided with an ITO film having a prescribed pattern, a solution of a polyimide precursor (providing a polyimide having a recurring unit of the formula (III) shown below in a mixture solvent (n-methylpyrrolidone (NMP)/n-butylcellosolve (nBC)=2/1) was applied by spin coating. The thus coated glass plate was subjected to hot curing treatment and a rubbing treatment to form a 100 Å-thick polyimide alignment control layer.

Formula (III')

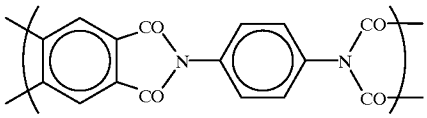

To the other glass plate provided with an ITO film, a solution of a silane coupling agent comprising octadecyltriethoxysilane was applied by spin coating, followed by hot curing to form a 20 Å-thick alignment control layer.

After silica beads (average particle size: about 2 μm) as a spacer were dispersed on the other glass plate, the two glass plates were applied to each other so that the alignment control layers constituted inner surfaces to prepare a blank cell having a cell gap of 1.8 μm.

Into the thus prepared blank cells, the liquid crystal compositions A to C prepared in Example 1 were injected in a similar manner to prepare three liquid crystal devices 2-1, 2-2 and 2-3, respectively.

Each of the thus prepared liquid crystal devices 2-1, 2-2 and 2-3 was evaluated in the same manner as in Example 1.

The results are shown in Table 4.

TABLE 4

| Device | Composition | Alignment | BS characteristic | T (%) | C/R | CK range (° C.) |
|---|---|---|---|---|---|---|
| 2-1 | A | Good | Good | 90 | 75 | 40 |
| 2-2 | B | Good | Good | 90 | 68 | 50 |
| 2-3 | C | Good | Good | 85 | 60 | 50 |

Further, three liquid crystal devices were prepared and evaluated in the same manner as in this example (Example 2) except that the thickness of the polyimide film was changed to 50 Å. Evaluation results were similar to those shown in Table 4.

Reference Example 1

Three liquid crystal devices 1-4, 1-5 and 1-6 were prepared and evaluated in the same manner as in Example 1 except that three liquid crystal compositions C, D and E shown in Table 5 below were used, respectively.

TABLE 5

| Composition | Compounds (wt. parts) | | | | | | | | | |
|---|---|---|---|---|---|---|---|---|---|---|
| | (1) | (2) | (3) | (4) | (5) | (6) | (7) | (a) | (b) | (c) |
| D | 3 | 3 | 4 | 80 | — | — | — | 5 | — | — |
| E | 20 | 25 | 25 | 10 | 13 | — | — | 2 | 5 | — |
| F | 15 | 10 | 15 | 50 | — | — | — | 5 | — | — |

The results are shown in Table 6.

TABLE 6

| Device | Composition | Alignment | BS characteristic | T (%) | C/R | CK range (° C.) |
|---|---|---|---|---|---|---|
| 1-4 | D | Good | Good | 50 | 27 | 25 |
| 1-5 | E | Good | Inferior | 60 | 10 | 40 |
| 1-6 | F | Good | Inferior | 55 | 10 | 40 |

Reference Example 2

Liquid crystal devices 1-7 and 1-8 using liquid crystal compositions A and B, respectively, were prepared and evaluated in the same manner as in Example 1 except that the nylon alignment control layer was changed to a 250 Å-thick polyvinyl alcohol alignment control film (polyvinyl alcohol, available from Aldrich Co.).

Both of the liquid crystal devices 1-7 and 1-8 provided a remarkably inferior alignment characteristic, so that a meaningful evaluation could not be effected with respect to other evaluation items.

Reference Example 3

A liquid crystal device 2-4 was prepared and evaluated in the same manner as in Example 2 except that a 50 Å-thick rubbing-treated polyimide alignment control layer was provided to both of the glass plates and the liquid crystal composition C was used.

The results are shown in Table 7.

TABLE 7

| Device | Composition | Alignment | BS characteristic | T (%) | C/R | CK range (° C.) |
|---|---|---|---|---|---|---|
| 2-4 | C | Inferior | Inferior | 75 | 50 | 50 |

Reference Example 4

Liquid crystal device 2-5 and 2-6 were prepared and evaluated in the same manner as in Example 2 except that the 100 Å-thick polyimide alignment control layer was changed to a 300 Å-thick polyimide alignment control layer and the liquid crystal compositions A and B were used, respectively.

Both of the liquid crystal devices 2-5 and 2-6 provided a poor bistability and a contrast ratio (C/R) of at most 5.

EXAMPLE 3

Liquid crystal device 3-1 and 3-2 were prepared and evaluated in the same manner as in Example 2 except that a 100 Å-thick polyimide alignment control layer was formed by using a polyimide having the following recurring unit:

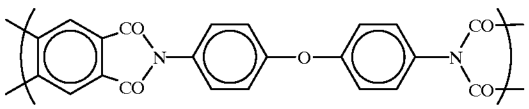

and that the liquid crystal compositions A and B were used.

The results are shown in Table 8.

TABLE 8

| Device | Composition | Alignment | BS characteristic | T (%) | C/R | CK range (° C.) |
|---|---|---|---|---|---|---|
| 3-1 | A | Good | Good | 85 | 55 | 40 |
| 3-2 | B | Good | Good | 85 | 45 | 50 |

Reference Example 5

Liquid crystal device 2-7, 2-8 and 2-9 were prepared and evaluated in the same manner as in Example 2 except that the liquid crystal compositions D, E and F prepared in Reference Example 1 were used, respectively.

The results are shown in Table 9.

TABLE 9

| Device | Composition | Alignment | BS characteristic | T (%) | C/R | CK range (° C.) |
|---|---|---|---|---|---|---|
| 2-7 | D | Good | Good | 50 | 30 | 25 |
| 2-8 | E | Good | Inferior | 60 | 20 | 40 |
| 2-9 | F | Good | Inferior | 60 | 20 | 40 |

As described hereinabove, according to the present invention, there is provided a liquid crystal device using a specific cell structure and a specific liquid crystal composition capable of exhibiting a bookshelf structure or a structure closer thereto having a small layer inclination angle, so that it is possible to provide improved display characteristics including a high brightness (high transmittance) and a high contrast ratio. In the liquid crystal device, the cell structure includes at least one thin (at most 200 Å) alignment control film or at least one polyimide film and preferably includes a pair of substrates (electrode plates) provided with alignment control layers subjected to different aligning treatments (e.g., only one of the alignment control layers is subjected to rubbing), thereby allowing a high reliability and a temperature stability with respect to the display characteristics and the layer structure.

What is claimed is:

1. A liquid crystal device, comprising: a pair of substrates each having thereon at least an electrode, and a liquid crystal composition disposed between the substrates, wherein at least one of the substrates is provided with an alignment control layer having a thickness of at most 200 Å and having been subjected to a rubbing uniaxial aligning treatment, and the liquid crystal composition comprises:

(i) at least one species of a fluorine-containing mesomorphic compound (B) represented by a formula (II) comprising at least one catenary oxygen atom, a fluorocarbon terminal portion and a hydrocarbon terminal portion, the terminal portions being connected with a central core, said compound (B) having smectic C phase and providing a tilt angle below 30 degrees at a temperature 15° C. below an upper limit temperature of said smectic C phase; and (ii) at least one species of compound (C) in an amount at least 5 wt. % represented by the formula (II) comprising at least one catenary oxygen atom, a fluorocarbon terminal portion and a hydrocarbon terminal portion, the terminal portions being connected with a central core and having a smectic C phase and which provides a tilt angle of at least 30 degrees at a temperature 15° C. below an upper limit temperature of said smectic C phase;

the liquid crystal composition containing said compounds (B) and (C) in a total amount of at least 30 wt. %;

Formula (II):

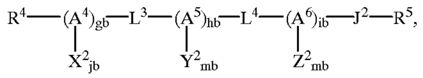

where $A^4$, $A^5$ and $A^6$ are each independently denote

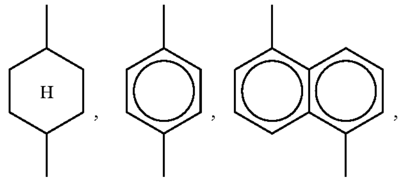

, , ,

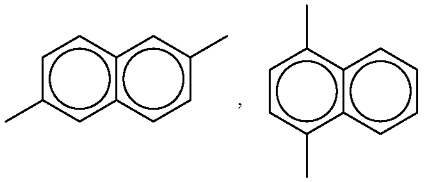

,

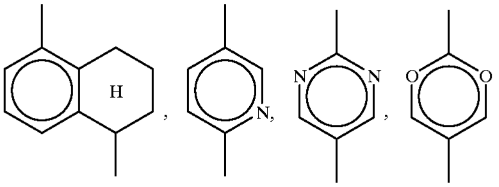

, , , or

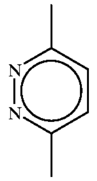

gb, hb and ib are each independently an integer of 0–3 with the proviso that the sum of gb+hb+ib be at least 2;

each $L^3$ and $L^4$ are independently a single bond, —CO—O—, —O—CO—, —CO—S—, —S—CO—, —CO—Se—, Se—CO——CO—Te—, —Te—CO—, $—(CH_2CH_2)_{ka}—$(ka is 1–4), —CH═CH—, —C≡C, —CH═N—, —N═CH—, $—CH_2—O—$, $—O—CH_2—$, —CO—or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, $—OCH_3$, $—CH_3$, $—CF_3$, $—O—CF_3$, —CN or $—NO_2$; each jb, mb and nb are independently an integer of 0–4;

$J^2$ is $—CO—O—C_{rc}H_{2rc}—$, $—O—C_{rc}H_{2rc}—$, $—C_{rc}H_{2rc}—$, $—O—(C_{sa}H_{2sa}—O)_{ta}—C_{rd}H_{2rd}—$, $—O—SO_2—$, $—SO_2—$, $—SO_2—C_{rc}H_{2rc}—$, $—C_{rc}H_{2rc}—N(C_{pb}H_{2pb+1})—SO_2—$ or $—C_{rc}H_{2rc}—N(C_{pb}H_{2pb+1})—CO—$where rc and rd are independently 1–0; sa is independently 1–10 for each $(C_{sa}H_{2sa}—O)$, ta is 1–6; pb is 0–4;—

$R^4$ is $—O—(C_{qc}H_{2qc}—O)_{wa}—C_{qd}H_{2qd+1}$, $—(C_{qc}H_{2qc}—O)_{wa}—C_{qd}H_{2qd+1}$, $—C_{qc}H_{2qc}—R^6$, $—O—C_{qc}H_{2qc}—R^6$, $—CO—O—C_{qc}H_{2qc}—R^6$, or $O—CO—C_{qc}H_{2qc}—R^6$ which may either be straight chain or branched where $R^6$ is $—O—CO—C_{qd}H_{2qd+1}$; $—CO—O—C_{qd}H_{2qd+1}$, —Cl, —F, $—CF_3$, $—NO_2$, —CN or —H, qc and qd are independently 1–20; wa is 1–10; and $R^5$ is $(C_{xb}F_{2xb}—O)_{za}—C_{ya}F_{2ya+1}$, where xb is independently 1–10 for each $(C_{xb}F_{2xb}—O)$; ya is 1–10; and za is 1–10.

2. The liquid crystal device according to claim 1, wherein said liquid crystal composition further comprises (iii) at least one species of a fluorine containing mesomorphic compound (A) represented by formula (I) or said formula (II) comprising a fluorocarbon terminal portion and a hydrocarbon terminal portion, the terminal portions being connected with a central core, and having smectic mesophase or latent smectic mesophase Formula (I):

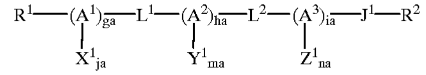

wherein $A^1$, $A^2$ and $A^3$ are each independently

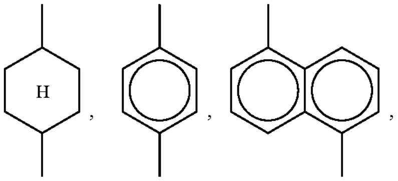

, , ,

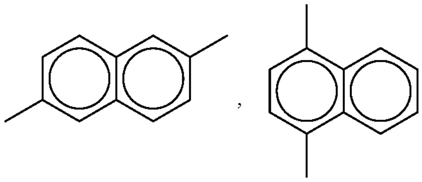

,

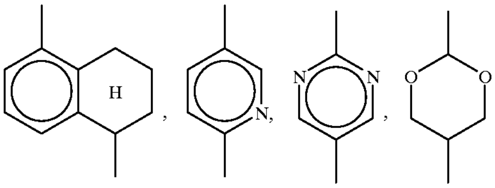

, , , or

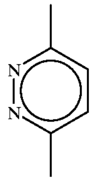

;

ga, ha and ia are independently an integer of 0–3 with the proviso that the sum of ga+ha+ia be at least 2;

$L^1$ and $L^2$ are independently a covalent bond, —CO—O—, —O—CO—, —COS—, —S—CO—, —CO—Se—, —Se—CO—, —CO—Te—, —Te—CO—, $—CH_2CH_2—$, —CH═CH—, —CE≡C—, —CH═N—, —N═CH—, $—CH_2—O—$, $—O—CH_2—$, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, $—OCH_3$, $—CH_3$, —CN or $—NO_2$;

each ja, ma and na are independently an integer of 0–4;

$J^1$ is $—CO—O—(CH_2)_{ra}—$, $—O—(CH_2)_{ra}$, $—(CH_2)_{ra}$, $—O—SO_2—$, $—SO_2—$, $—SO_2—(CH_2)_{ra}$, $—O—(CH_2)_{ra}$, $—O—(CH_2)_{rb}—$, $—(CH_2)ra—N(C_{pa}H_{2pa+1})—SO_2—$ or $—(CH_2)_{ra}—N(C_{pa}H_{2pa+1})—CO—$ where ra and rb are independently 1–20, and pa is 0–4;

$R_1$ is $—O—C_{qa}H_{2qa}—O—C_{qb}H_{2qb+1}$, $—C_{qa}H_{2qa}—O—$, $C_{qb}H_{2qb+1}$, $—C_{qa}H_{2qa}—R^3$, $—O—C_{qa}H_{2qa}—R^3$, $—CO—C_{qa}H_{2qa}—R^3$, or $—O—CO—C_{qa}H_{2qa}$, $—R_3$ which may be either straight chain or branched where $R_3$ is $—O—O—C_{qb}H_{2qb+1}$, $—CO—O—C_{qb}H_{2qb+1}$, —H, —C1, —F, —CF3, —$NO_2$ or —CN; and qa and qb are independently 1–20; and $R_2$ is $C_{xa}F_{2xa}$—X, wherein x is —H or —F, xa is an integer of 1–20.

3. A device according to claim 1 or 2, wherein the pair of substrates have been subjected to different aligning treatments.

4. A device according to claim 1 or 2, wherein $R^4$ in the formula (II) for compound (C) is —C—$(C_{qc}H_{2qc}$—$O)_{wa}$—$C_{qd}H_{2qd+1}$, —O—$C_{qc}H_{2qc}$—$R^6$, or O—CO—$C_{qc}H_{2qc}$—$R^6$ wherein qc, qd, wa and $R^6$ have the meanings defined above.

5. A device according to claim 1 or 2, wherein the fluorine-containing mesomorphic compound (A) of the formula (I) or (II) has a central core containing benzene ring and pyrimidine ring.

6. A device according to claim 1 or 2, wherein the compound (B) of the formula (II) has a central core containing benzene ring and pyrimidine ring.

7. A device according to claim 1 or 2, wherein the liquid crystal composition comprises at least 50 wt. % of the compound (B).

8. A device according to claim 1 or 2, wherein the liquid crystal composition comprises at least 10 wt. % of the compound (C).

9. A device according to claim 1 or 2, wherein said tilt angle provided by the compound (C) is at least 35 degrees.

10. A device according to claim 1 or 2, wherein said alignment control layer has a thickness of at least 100 Å.

11. A device according to claim 1 or 2, wherein said alignment control layer has a thickness of at most 50 Å.

12. A device according to claim 1 or 2, wherein said alignment control layer comprises a polyimide film.

13. A liquid crystal device, comprising: a pair of substrates each having thereon at least an electrode, and a liquid crystal composition disposed between the substrates, wherein at least one of the substrates is provided with an alignment control layer comprising a polyimide film, and the liquid crystal composition comprises:

(i) at least one species of a fluorine-containing mesomorphic compound (B) represented by a formula (II) comprising at least one catenary oxygen atom, a fluorocarbon terminal portion and a hydrocarbon terminal portion, the terminal portions being connected with a central core, said compound (B) having smectic C phase and providing a tilt angle below 30 degrees at a temperature 15° C. below an upper limit temperature of said smectic C phase; and (ii) at least one species of compound (C) in an amount at least 5 wt. % represented by the formula (II) comprising at least one catenary oxygen atom, a fluorocarbon terminal portion and a hydrocarbon terminal portion, the terminal portions being connected with a central core and having a smectic C phase and which provides a tilt angle of at least 30 degrees at a temperature 15° C. below an upper limit temperature of said smectic C phase;

the liquid crystal composition containing said compounds (B) and (C) in a total amount of at least 30 wt. %.

Formula (II):

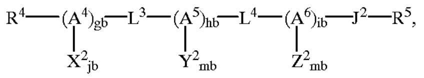

where $A^4$, $A^5$ and $A^6$ are each independently denote

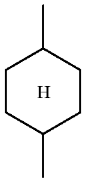, 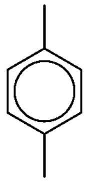, 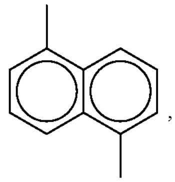,

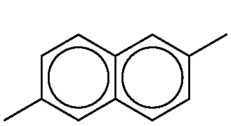, 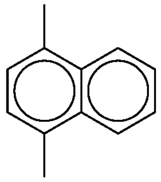

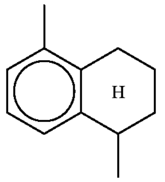, 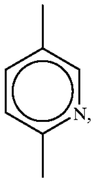, 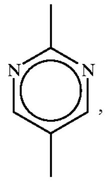, 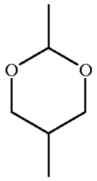 or

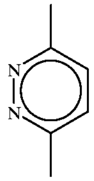

gb, hb and ib are each independently an integer of 0–3 with the proviso that the sum of gb+hb+ib be at least 2;

each $L^3$ and $L^4$ are independently a single bond, —CO—O—, —O—CO—, —CO—S—, —S—CO—, —CO—Se—, Se—CO— —CO—Te—, —Te—CO—, —$(CH_2CH_2)_{ka}$—(ka is 1–4), —CH═CH—, —C≡C, —CH═N—, —N═CH—, —$CH_2$—O—, —O—$CH_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —C1, —F, —Br, —I, —OH, —$OCH_3$, —$CH_3$, —$CF_3$, —O—$CF_3$, —CN or —$NO_2$; each jb, mb and nb are independently an integer of 0–4;

$J^2$ is —CO—O—$C_{rc}H_{2rc}$—, —O—$C_{rc}H_{2rc}$—, —$C_{rc}H_{2rc}$—, —O—$(C_{sa}H_{2sa}$—$O)_{ta}$—$C_{rd}H_{2rd}$—, —O—$SO_2$—, —$SO_2$—, —$SO_2$—$C_{rc}H_{2rc}$—, —$C_{rc}H_{2rc}$—N$(C_{pb}H_{2pb+1})$—$SO_2$— or —$C_{rc}H_{2rc}$—N$(C_{pb}H_{2pb+1})$—CO— where rc and rd are independently 1–0; sa is independently 1–10 for each $(C_{sa}H_{2sa}$—O), ta is 1–6; pb is 0–4;—

$R^4$ is —O—$(C_{qc}H_{2qc}$—$O)_{wa}$—$C_{qd}H_{2qd+1}$, —$(C_{qc}H_{2qc}$—$O)_{wa}$—$C_{qd}H_{2qd+1}$, —$C_{qc}H_{2qc}$—$R^6$, —O—$C_{qc}H_{2qc}$—$R^6$, —CO—O—$C_{qc}H_{2qc}$—$R^6$, or O—CO—$C_{qc}H_{2qc}$—$R^6$ which may either be straight chain or branched where $R^6$ is —O—CO—$C_{qd}H_{2qd+1}$, —CO—O—$C_{qd}H_{2qd+1}$, —C1, —F, —$CF_3$, —$NO_2$, —CN or —H, qc and qd are independently 1–20; wa is 1–10; and $R^5$ is $(C_{xb}F_{2xb}$—$O))_{za}$—$C_{ya}F_{2ya+1}$, where xb is independently 1–10 for each $(C_{xbF2xb}$—O); ya is 1–10; and za is 1–10.

14. The liquid crystal device according to claim 13, wherein said liquid crystal composition further comprises (iii) at least one species of a fluorine containing mesomorphic compound (A) represented by formula (I) or said formula (II) comprising a fluorocarbon terminal portion and a hydrocarbon terminal portion, the terminal portions being connected with a central core, and having smectic mesophase or latent smectic mesophase Formula (I):

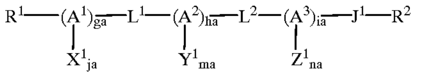

wherein $A^1$, $A^2$ and $A^3$ are each independently

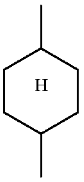 ,  , 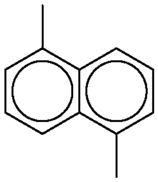 ,

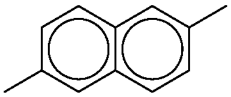 , 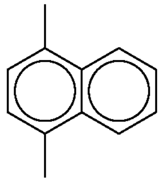

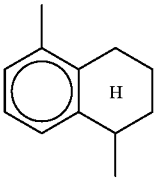 , 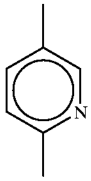 , 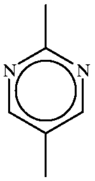 ,

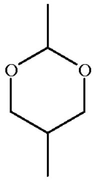 or 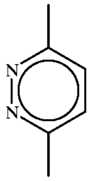 ;

ga, ha and ia are independently an integer of 0–3 with the proviso that the sum of ga+ha+ia be at least 2;

$L^1$ and $L^2$ are independently a covalent bond, —CO—O—, —O—CO—, —COS—, —S—CO—, —CO—Se—, —Se—CO—, —CO—Te—, —Te—CO—, $—CH_2CH_2—$, —CH=CH—, —C≡C—, —CH=N—, —N=CH—, $—CH_2—O—$, $—O—CH_2—$, —CO—or —O—;

$X^1$, $Y^1$ and $Z^1$ are each a substituent of $A^1$, $A^2$ and $A^3$, respectively, and each $X^1$, $Y^1$ and $Z^1$ are independently —H, —C1, —F, —Br, —I, —OH, $—OCH_3$, $—CH_3$, —CN or $—NO_2$;

each ja, ma and na are independently an integer of 0–4;

$J^1$ is $—CO—O—(CH_2)_{ra}—$, $—O—(CH_2)_{ra}—$, $—(CH_2)_{ra}—$, $—O—SO_2—$, $—SO_2—$, $—SO_2—(CH_2)_{ra}—$, $—O—(CH_2)_{ra}$, $—O—(CH_2)_{rb}—$, $—(CH_2)$ ra—N $(C_{pa}H_{2pa+1})—SO_2—$ or $—(CH_2)_{ra}—N(C_{pa}H_{2pa+1})—CO—$ where ra and rb are independently 1–20, and pa is 0–4;

$R_1$ is $—O—C_{qa}H_{2qa}—O—C_{qb}H_{2qb+1}$, $—C_{qa}H_{2qa}—O—C_{qb}H_{2qb+1}$, $—C_{qa}H_{2qa}$, $—R^3$, $—O—C_{qa}H_{2qa}—R^3$, $—CO—C_{qa}H_{2qa}—R^3$, or $—O—CO—C_{qa}H_{2qa}—R_3$ which may be either straight chain or branched where $R_3$ is $—O—CO—C_{qb}H_{2qb+1}$, $—CO—O—C_{qb}H_{2qb+1}$, —H, —C1, —F, —CF3, $—NO_2$ or —CN; and qa and qb are independently 1–20; and $R^2$ is $C_{xa}F_{2xa}—X$, wherein X is —H or —F, xa is an integer of 1–20.

15. A device according to claim 13 or 14, wherein said polyimide has a recurring unit represented by the following formula (III):

(III)

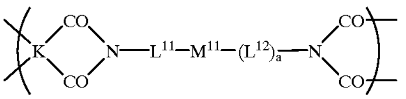 , in which

K is

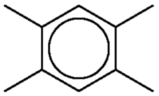 , 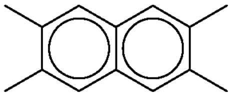 or

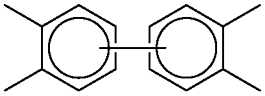 ;

$L^{11}$ and $L^{12}$ independently denote

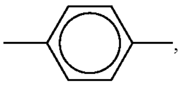 ,

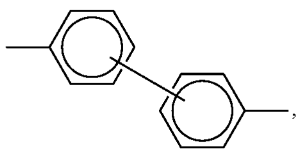 , 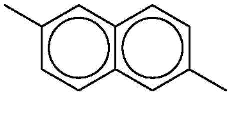

or an alkylene group having 1–20 carbon atoms;

$M^{11}$is a single bond or —O—; and a is 0, 1 or 2.

16. A device according to claim 13 or 14, wherein the pair of substrates have been subjected to different aligning treatments.

17. A device according to claim 13 or 14, wherein $R^4$ in the formula (II) for compound (C) is $—O—(C_{qc}H_{2qc}—O)_{wa}—C_{qd}H_{2qd+1}$, $—O—C_{qc}H_{2qc}—R^6$, or $O—CO—C_{qc}H_{2qc}—R^6$ wherein qc, qd, wa and $R^6$ have the meanings defined above.

18. A device according to claim 13 or 14, wherein the compound (B) of the formula (II) has a central core containing benzene ring and pyrimidine ring.

19. A device according to claim 13 or 14, wherein the liquid crystal composition comprises at least 50 wt. % of the compound (B).

20. A device according to claim 13 or 14, wherein the liquid crystal composition comprises at least 10 wt. % of the compound (C).

21. A device according to claim 13 or 14, wherein said tilt angle provided by the compound (C) is at least 35 degrees.

22. A liquid crystal apparatus, including a liquid crystal device according to any one of claims 1, 2, 13 or 14.

* * * * *

UNITED STATES PATENT AND TRADEMARK OFFICE
CERTIFICATE OF CORRECTION

PATENT NO. : 6,177,152 B1
DATED : January 23, 2001
INVENTOR(S) : Masahiro Terada et al.

It is certified that error appears in the above-identified patent and that said Letters Patent is hereby corrected as shown below:

Title page,
Item [56] References Cited,
FOREIGN PATENT DOCUMENTS,
"02142753" should read -- 2-142753" --; and
"60156046" should read -- 60-156046 --.

OTHER PUBLICATIONS,
After "A. Fukuda" "is" should read -- its --.

Item [57] ABSTRACT,
Line 11, "phase" should read -- phase: --.
5th line from the bottom, "(II)" should read -- and (ii) --.

Column 2,
Line 20, "hand" should read -- hand, --.

Column 5,
Line 66, "comprise" should read -- comprises --.

Column 7,
Line 2, "molecule" should read -- molecules --;
Line 14, "an" should be deleted; and
Line 16, "an" should be deleted.

Column 9,
Line 52, "The" should read -- the --.

Column 12,
Line 11, "$Z_2$" should read -- $Z_2$ are --; and
Line 37, "descried" should read -- described --.

Column 17,
Line 38, "compound" should read -- compounds --.

Column 18,
Line 26, "—O—O" should read -- —O— --; and
Line 37, "connected" should read -- be connected --.

UNITED STATES PATENT AND TRADEMARK OFFICE

CERTIFICATE OF CORRECTION

PATENT NO. : 6,177,152 B1
DATED : January 23, 2001
INVENTOR(S) : Masahiro Terada et al.

It is certified that error appears in the above-identified patent and that said Letters Patent is hereby corrected as shown below:

Column 40,
Table A, "E" (both occurrences) should read -- Σ --; and "E" (all occurrences) should read -- Σ --.

Column 42,
Table A, "E" (both occurrences) should read -- Σ --; and "E" (all occurrences) should read -- Σ --.

Column 47,
Line 50,

Ph3Br: 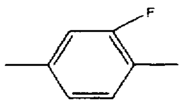 should read -- Ph3Br: 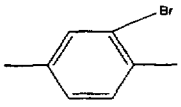 --

Column 63,
Line 12, "(i)" should read -- (%) --; and
Line 15, "wa" should read -- was --.

Column 65,
Line 28, "device" should read -- devices --;
Line 40, "device" should read -- devices --;
Line 64, "device" should read -- devices --;

Column 69,
Line 9, "—C—" should read -- —O— --.

Column 70,
Line 61, "—O))$_{Za}$" should read -- —O)$_{2a}$— --

UNITED STATES PATENT AND TRADEMARK OFFICE
CERTIFICATE OF CORRECTION

PATENT NO. : 6,177,152 B1
DATED : January 23, 2001
INVENTOR(S) : Masahiro Terada et al.

It is certified that error appears in the above-identified patent and that said Letters Patent is hereby corrected as shown below:

Column 71,
Line 6, "—$R^{2}$" should read -- —$R^2$, --; and
Line 63, "$R_1$" should read -- $R^1$ --.

Signed and Sealed this

Nineteenth Day of March, 2002

*Attest:*

JAMES E. ROGAN

*Attesting Officer* *Director of the United States Patent and Trademark Office*